(12) United States Patent
D'Oracio De Almeida et al.

(10) Patent No.: US 12,383,995 B2
(45) Date of Patent: Aug. 12, 2025

(54) LIGHT-PROJECTING OF INSTALLATION-LOCATION PATTERNS ONTO INSTALLATION SURFACES

(71) Applicant: Brand Shared Services LLC, Atlanta, GA (US)

(72) Inventors: Eduardo Fernando D'Oracio De Almeida, League City, TX (US); James Egger, Houston, TX (US); Amrith Singh Thakur, Houston, TX (US); Lance Edward Zier, Houston, TX (US); Diego Arturo Edwards Sordo, Houston, TX (US)

(73) Assignee: Brand Shared Services LLC, Atlanta, GA (US)

( * ) Notice: Subject to any disclaimer, the term of this patent is extended or adjusted under 35 U.S.C. 154(b) by 0 days.

(21) Appl. No.: 18/770,429

(22) Filed: Jul. 11, 2024

(65) Prior Publication Data
US 2024/0359278 A1    Oct. 31, 2024

Related U.S. Application Data

(62) Division of application No. 17/980,114, filed on Nov. 3, 2022, now Pat. No. 12,064,842.
(Continued)

(51) Int. Cl.
*B23P 19/10*    (2006.01)
*F21V 33/00*    (2006.01)

(52) U.S. Cl.
CPC .......... *B23P 19/10* (2013.01); *F21V 33/0084* (2013.01)

(58) Field of Classification Search
CPC .. B23P 19/10; F21V 33/0084; B23K 11/0053; B23K 2101/12; B23K 9/20; B25H 1/0092
See application file for complete search history.

(56) References Cited

U.S. PATENT DOCUMENTS 6,878,954 B2 *   4/2005   Butler ................. B25F 5/003
                                              356/399
7,170,076 B2 *   1/2007   Butler ................. B25C 7/00
                                              83/72
(Continued)

FOREIGN PATENT DOCUMENTS

DE   10 2012 011 518 B3   10/2013
EP      3 670 057 A1       6/2020

OTHER PUBLICATIONS

Brand Industrial Services Inc., Brand Tech Precision Welding, Published 2020, 2 pages.
(Continued)

*Primary Examiner* — Lawrence Averick
(74) *Attorney, Agent, or Firm* — Foley & Lardner LLP

(57) ABSTRACT

A light module projects multiple light beams onto an installation surface to form multiple light indicia spaced apart in a pattern on the installation surface, with the light indicia identifying installation locations on the installation surface where construction mounts are then installed. Embodiments include systems in which the light module includes a light emitter that projects a source light beam and a diffractor that diffuses the source light beam into the multiple light beams, systems in which the light module is adjustably mounted to and movable with a handheld tool used to install the construction mounts, systems in which the light module is adjustably mounted to a static-use support, and methods of using these systems to install the construction mounts.

9 Claims, 38 Drawing Sheets

Related U.S. Application Data

(60) Provisional application No. 63/318,500, filed on Mar. 10, 2022, provisional application No. 63/275,380, filed on Nov. 3, 2021.

(56) References Cited

U.S. PATENT DOCUMENTS

| | | | | |
|---|---|---|---|---|
| 7,433,796 | B2* | 10/2008 | Behan | B23G 9/00 |
| | | | | 356/610 |
| 8,036,852 | B2* | 10/2011 | Behan | B21J 15/14 |
| | | | | 702/150 |
| 8,364,438 | B2* | 1/2013 | Behan | B23P 19/06 |
| | | | | 702/150 |
| 9,527,149 | B2* | 12/2016 | Behan | B25B 23/14 |
| 2002/0162978 | A1* | 11/2002 | Butler | B25H 1/0078 |
| | | | | 250/559.33 |
| 2005/0132589 | A1* | 6/2005 | Johnson | B25H 1/0092 |
| | | | | 33/286 |
| 2006/0106483 | A1* | 5/2006 | Behan | B23P 19/10 |
| | | | | 700/95 |
| 2021/0116180 | A1 | 4/2021 | D'Oracio De Almeida et al. | |

OTHER PUBLICATIONS

International Search Report and Written Opinion on PCT/US2022/048827 dated Mar. 6, 2023 (10 pages).

Prophotonix, "Laser Modules—Configurable Laser Diode Modules ProPhotonix", retrieved Jan. 28, 2023, <https://www.prophotonix.com/led-and-laser-products/laser-modules/all-laser-modules/>, 15 pages.

\* cited by examiner

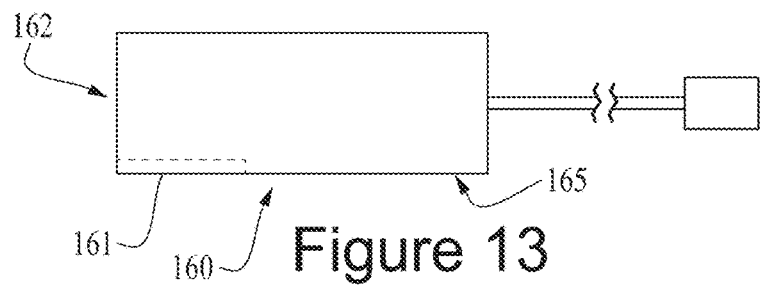
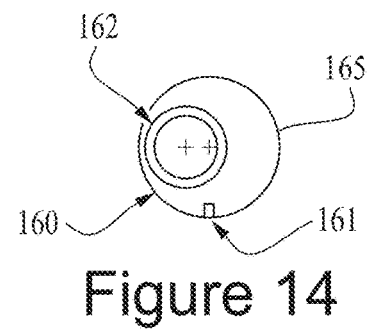
Figure 13    Figure 14
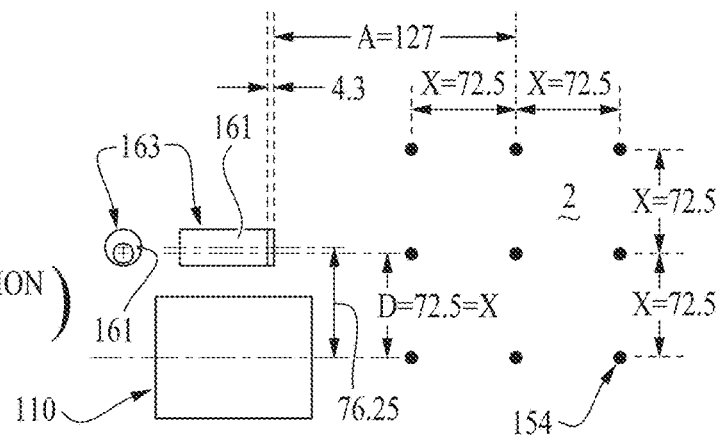
Figure 15
(THIRD ANGLE PROJECTION)
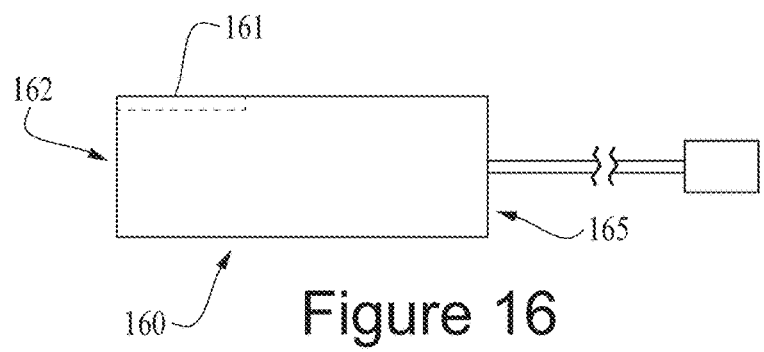
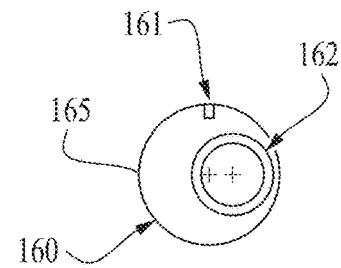
Figure 16    Figure 17
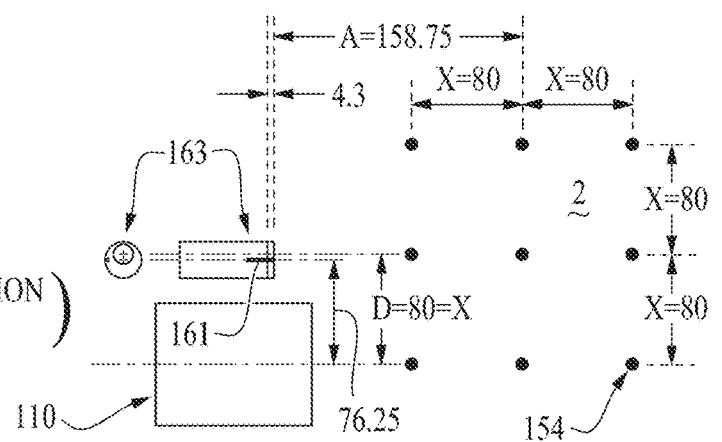
Figure 18
(THIRD ANGLE PROJECTION)

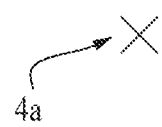
Figure 20
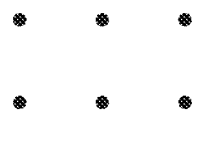
Figure 21
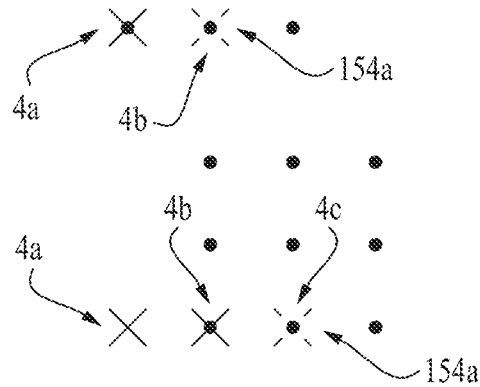
Figure 22
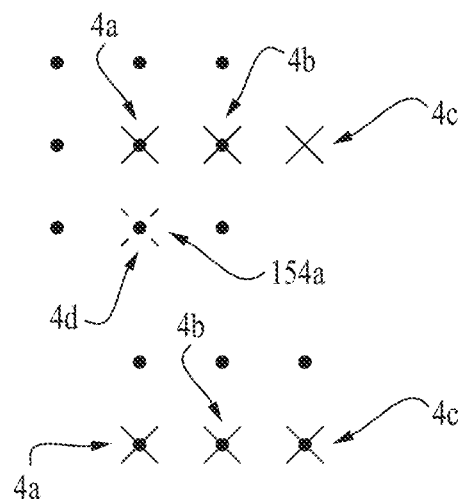
Figure 23
Figure 24
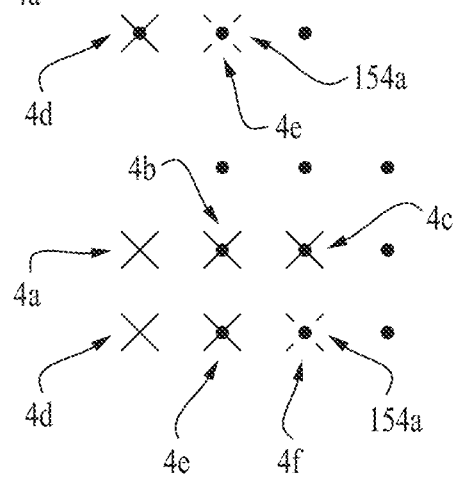
Figure 25

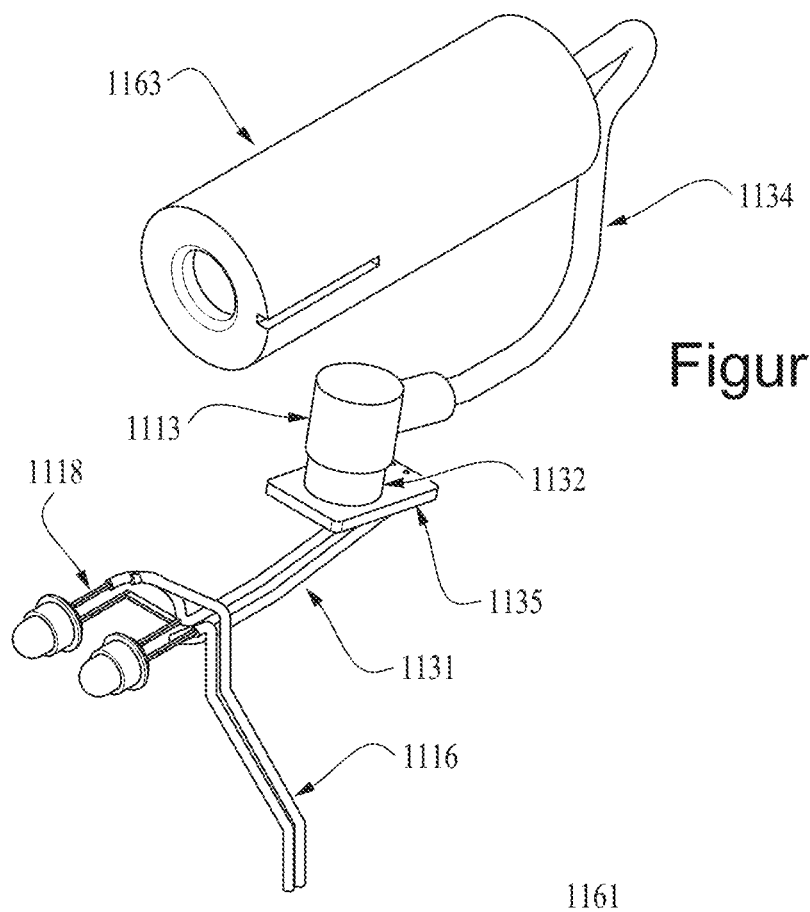
Figure 40
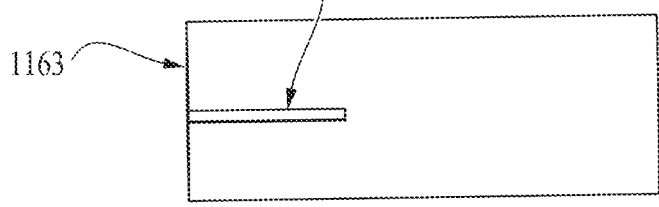
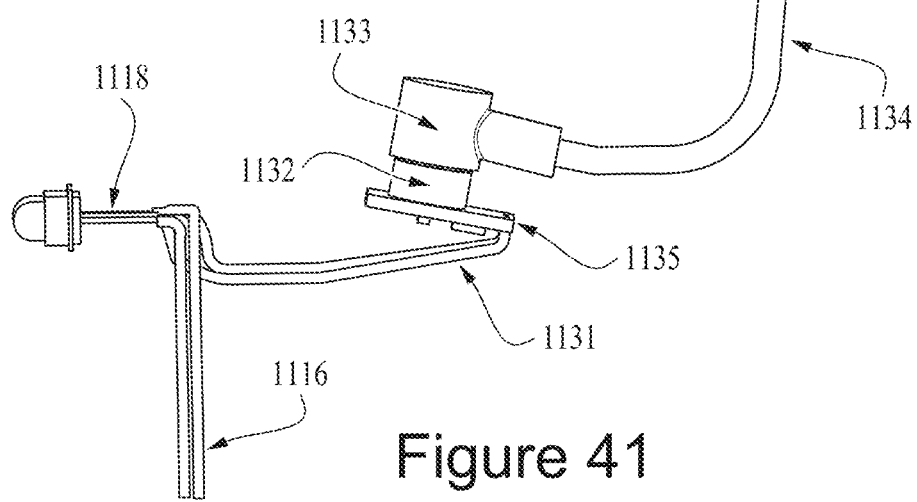
Figure 41

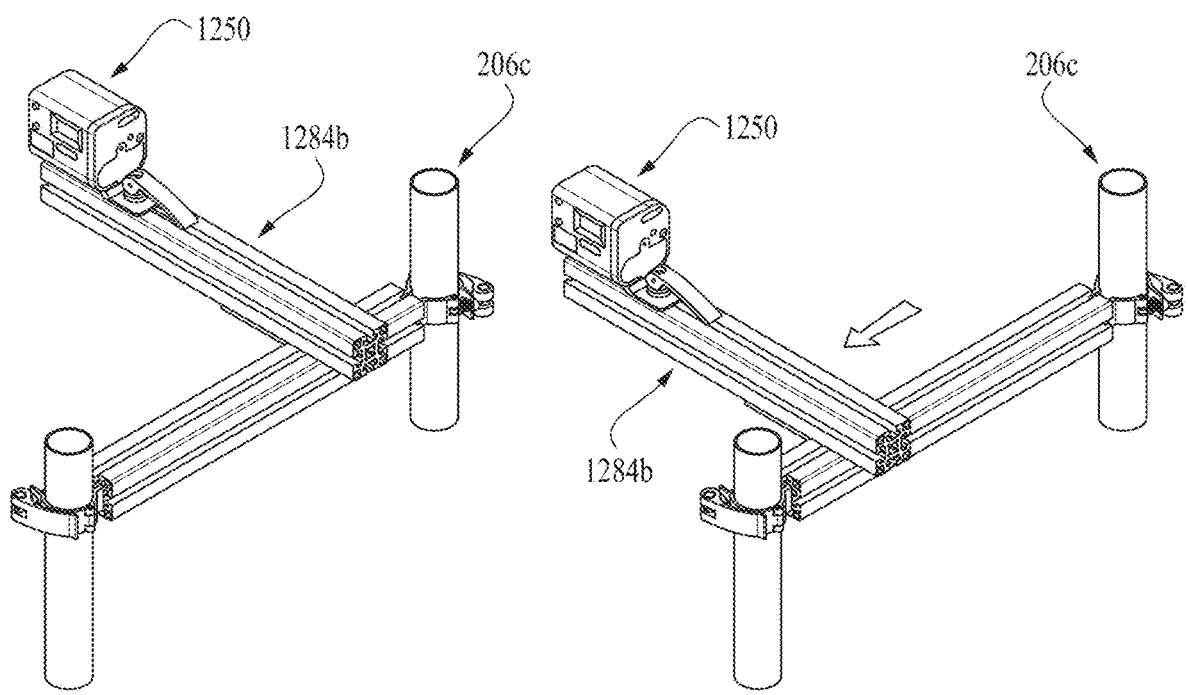
Figure 65
Figure 66
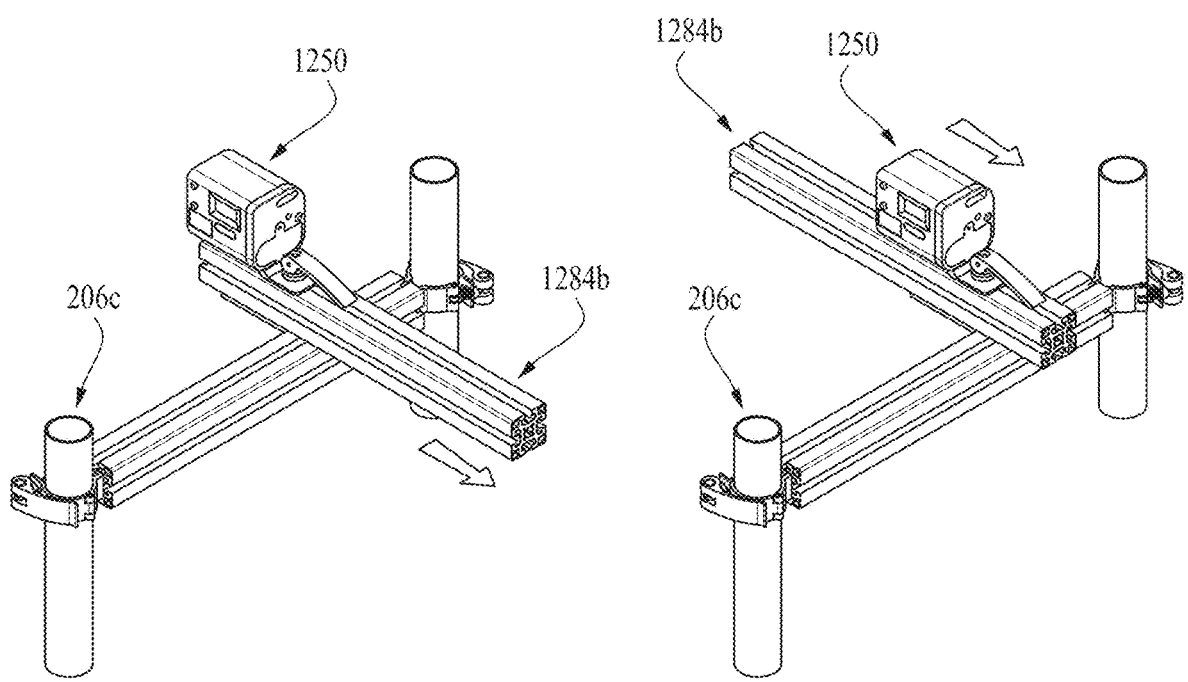
Figure 67
Figure 68

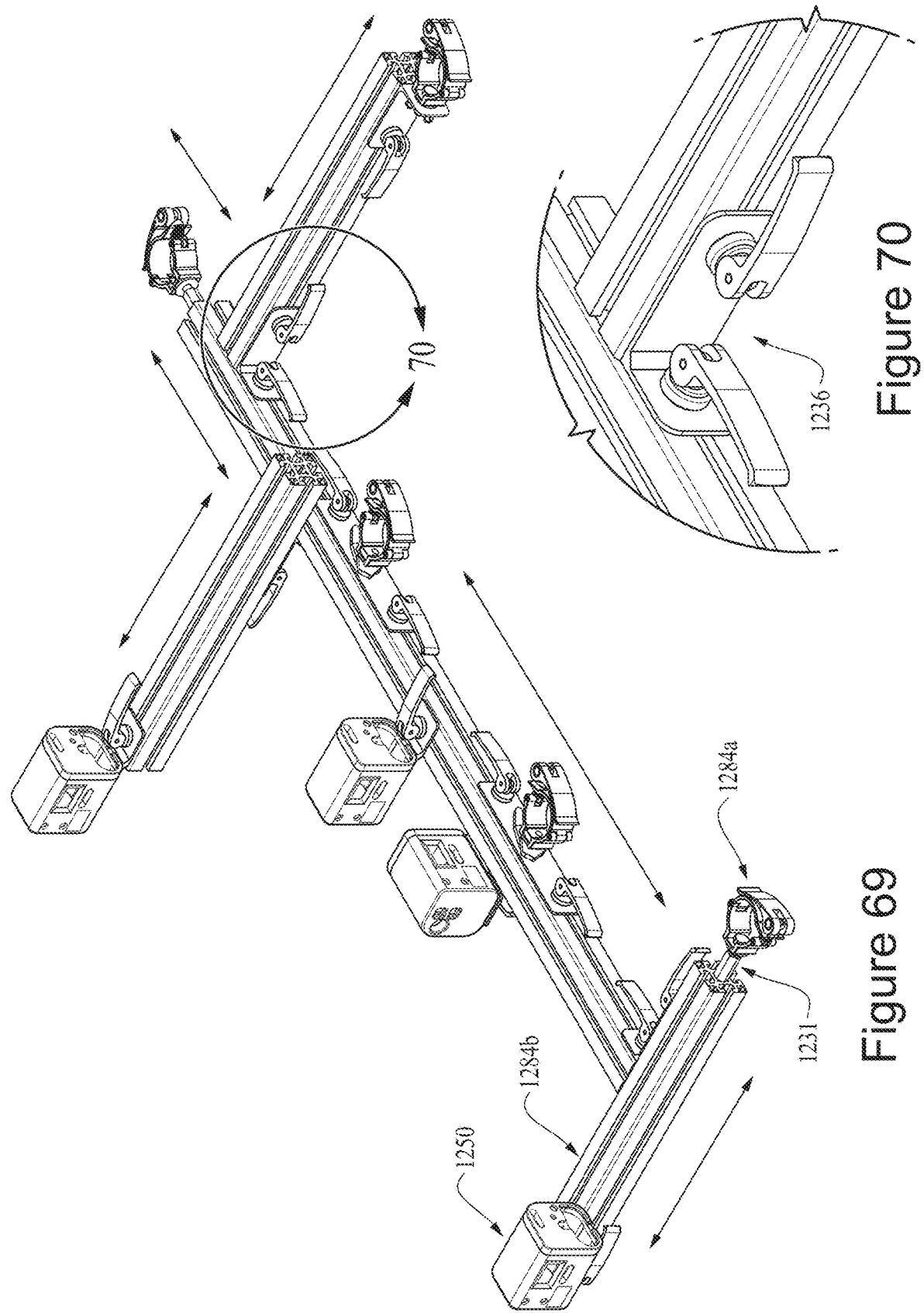

LIGHT-PROJECTING OF INSTALLATION-LOCATION PATTERNS ONTO INSTALLATION SURFACES

CROSS-REFERENCE TO RELATED APPLICATIONS

This application is a divisional of U.S. patent application Ser. No. 17/980,114, filed on Nov. 3, 2022, which claims the benefit of and priority to U.S. Provisional Patent Application No. 63/318,500, filed on Mar. 10, 2022, and U.S. Provisional Patent Application No. 63/275,380, filed on Nov. 3, 2021, all of which are hereby incorporated herein by reference.

TECHNICAL FIELD

The present invention relates generally to the field of construction and industrial services, and more particularly to installing devices such as refractory anchors in arrays or patterns on installation surfaces systems such as of high-temperature vessels used in industrial and chemical processes.

BACKGROUND

Thermal-process vessels used in oil refineries and other petrochemical- and chemical-process facilities have highly abrasive and high-temperature internal environments. To protect the mechanical and structural integrity of the vessel shells (e.g., sidewalls), their inner surface is typically lined with a refractory material (e.g., a thin layer of concrete). To secure the refractory material in place, refractory anchors are installed (e.g., welded) onto the inner walls of the thermal vessel and then the refractory material is applied around the anchors to form the refractory lining.

Due to the highly caustic environment, the refractory lining, and thus the refractory anchors, must be replaced periodically. As an example, a representative thermal vessel at a typical facility has about 20,000 anchors, and the refractory lining replacement job (i.e., removing the existing refractory and anchors and installing new anchors and refractory) typically takes about 30 days, with the replacement done every about 2-4 years, with the thermal vessel shut down during the replacement job, and with that shut-down time costing the owner for example about $3-5 M per day. So there is significant expense involved, not just for the replacement job itself, but also for the shut-down time required for the replacement job. The same applies to new facility start-up delays for refractory installations in new construction applications.

Laying out the locations to install the refractory anchors is a time-consuming part of the overall replacement job. This is done using measuring and chalk-line tools to mark horizontal and vertical chalk lines on the installation surface, with the line intersections identifying the locations to install the anchors. This layout task can take as long as the anchor installation task itself, for example when using modern welding systems to install the anchors. In addition, the layout task must be carefully done to ensure that the anchors are installed with intended spacings to avoid premature failure, and so this is best done by a skilled craftsperson with an advanced technical understanding of layout patterns, measures, anchor selection, and technical drawings.

Accordingly, it can be seen that needs exist for improvements in identifying installation locations for objects such as refractory anchors. It is to the provision of solutions to this and other problems that the present invention is primarily directed.

SUMMARY

Generally described, the present invention relates to light-projecting of installation-location patterns onto installation surfaces. A light module projects multiple light beams onto an installation surface to form multiple light indicia spaced apart in a pattern (e.g., grid) on the installation surface, with the light indicia identifying installation locations on the installation surface (e.g., a thermal vessel wall) where construction mounts (e.g., refractory anchors) are then installed.

Some embodiments include systems in which the light module includes a light emitter (e.g., a laser or other point light source) that projects a source light beam and a diffractor (e.g., a diffractive optical element) that diffuses the source light beam into the multiple light beams. In some of these embodiments, the diffractor is selected to diffuse the source light beam into multiple light beams that diverge from each other, and linear adjustment mechanisms (e.g., telescopically sliding parts, track and guide sliding parts, etc.) are included for linearly repositioning the light module to obtain the projected-light distance (from the light module to the installation surface) for the divergent light beams to thereby produce the desired indicia spacing needed for the construction mounts to be installed.

In addition, some embodiments use or include distancing devices that identify (set or measure) the distance from the light module to the installation surface. These distancing devices can include footplates of handheld welding guns (for embodiments in which the light module is mounted to the welding gun), other distance-setting devices (for embodiments in which the light module is mounted to another handheld tool or other movable support), and/or IR or LIDAR sensors (for embodiments in which the light module is mounted to a static-use support such as scaffolding or a tripod). In this way, the distancing device can be used to identify a position of the light module needed to obtain the projected-light distance for the divergent light beams needed to produce the desired indicia spacing for the construction mounts to be installed, and the light module can then be positioned accordingly (and adjustments can then be made for example in embodiments including a linear adjustment mechanism).

Other embodiments include systems in which the light module is adjustably mounted to and movable with a handheld tool (e.g., a welding gun) used to install the construction mounts. Such embodiments can include linear adjustment mechanisms (e.g., telescopically sliding parts) operable to linearly reposition the light module to obtain the projected-light distance for the divergent light beams to produce the desired indicia spacing needed for the construction mounts to be installed.

Yet other embodiments include systems in which the light module is adjustably mounted to a static-use support (e.g., scaffolding or a tripod) spaced away from but nearby (close enough to achieve the projected light indicia patterns for the purposes described herein) the installation surface. Such embodiments can include linear adjustment mechanisms (e.g., track and guide sliding parts, etc.) operable to linearly reposition the light module to obtain the projected-light distance for the divergent light beams to produce the desired indicia spacing needed for the construction mounts to be installed.

Still other embodiments include methods of using these systems to install construction mounts onto installation surfaces. These methods include positioning the light module in place on a support (e.g., movable or static) with the light module directed at the installation surface, operating the light module to project a pattern of lighted indicia (e.g., dots) onto the installation surface, and installing the construction mounts at the lighted indicia on the installation surface. These methods can include linearly adjusting the position of the light module to obtain the projected-light distance for the divergent light beams to produce the desired indicia spacing needed for the construction mounts to be installed. These methods can include identifying (setting or measuring) the distance from the light module to the installation surface to identify a position of the light module needed to obtain the projected-light distance for the divergent light beams needed to produce the desired indicia spacing for the construction mounts to be installed.

These methods can further include repositioning the light module. For example, this can include repositioning a handheld tool and a light module mounted to it so that at least one reference lighted indicia in the pattern of lighted indicia coincides with an installed construction mount and a target lighted indicia (installation location) in the pattern identifies where the next construction mount is to be installed. Also, this can include repositioning a light module transversely so that at least two reference lighted indicia in the pattern of lighted indicia coincide with an installed construction mounts and a target lighted indicia in the pattern identifies where the next construction mount is to be installed.

These and other aspects, features, and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

BRIEF DESCRIPTION OF THE DRAWINGS

FIGS. 13-15 are side, end, and third-angle projection views, respectively, of a light module of the light-projecting system of FIG. 4, showing the light module producing a light-indicia pattern with light-indicia spacings.

FIGS. 16-18 show the light module of FIGS. 13-15 angularly repositioned by 180 degrees to produce the same light-indicia pattern but with different light-indicia spacings.

FIGS. 20-25 show a sequence of steps of an example method of projecting light indicia onto installation surfaces to identify installation locations for example using the light-projecting system of FIG. 4.

FIGS. 40-41 are perspective views of the light module of FIGS. 36-39 electrically connected to the handheld tool.

FIGS. 65-68 are perspective views showing the frame/slide light mount of FIG. 64 used to adjustably reposition a light-projecting system in multiple locations.

FIG. 69 is perspective views showing multiple of the frame/slide light mounts of FIG. 64 used to adjustably reposition a light-projecting system in multiple locations, and FIG. 70 is a detail view of the indicated portion of FIG. 69.

DETAILED DESCRIPTION

Figure 1:
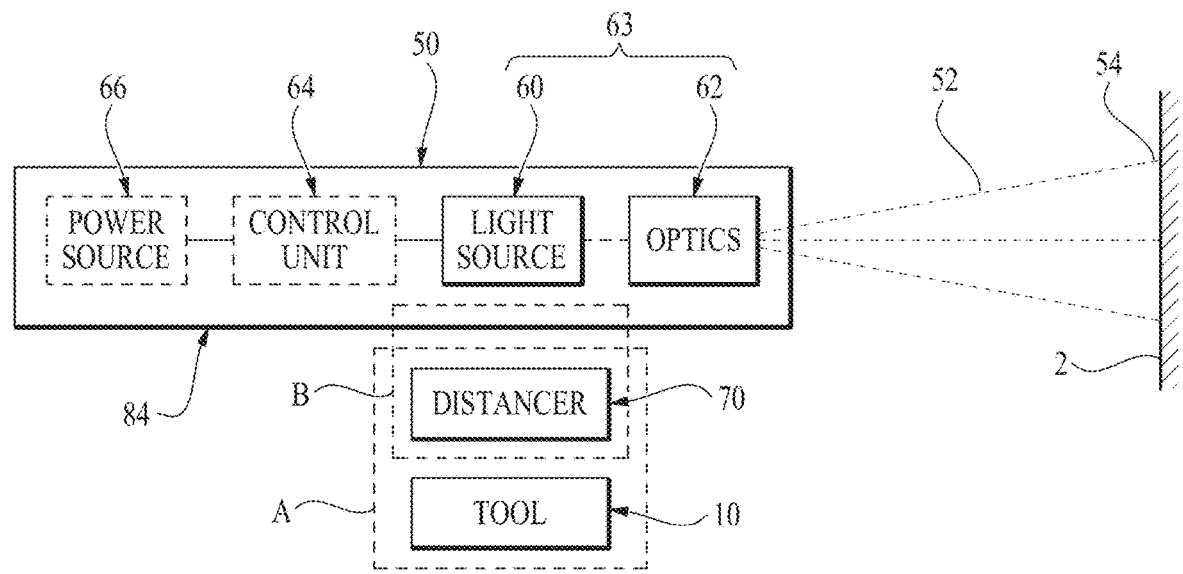
FIG. 1 is a functional schematic diagram of a system for projecting light indicia onto installation surfaces to identify installation locations according to a top-level example embodiment.

Generally described, the present invention relates to systems and methods for projecting light indicia onto installation surfaces to identify installation locations. Such systems and methods are described herein with respect to projecting light indicia onto the inner surface of the shell/wall of thermal-process vessels to identify locations for installing refractory anchors in an array/system of anchors for retaining refractory materials. Example embodiments of these systems and methods include embodiments designed for mounting to and portable/movable use with tools/equipment such as handheld welding guns for installing refractory anchors and embodiments designed for mounting in place (apart from such handheld tools) to and for static use on separate supports such as scaffolding, tripods, specialty frameworks, high beams, and other conventional or specialty structures.

As such, the light-projecting systems and methods can be used for installing anchors for refractory linings to protect thermal vessels such as high-temperature cyclone separators (e.g., fluid catalytic crackers aka FCCs), reformers, hydrocrackers, crude units, thermal reactors, sulfur recovery units, boilers, burners, furnaces, columns, and tanks, piping for these, and other high-temperature industrial-process containers (i.e., operating temperatures of about 250 C to about 1800 C). The light-projecting systems and methods can be used for installing anchors for refractory linings for protecting such thermal vessels in oil refineries, other petrochemical-process facilities, chemical-process facilities, chemical-manufacturing plants, cement plants, fertilizer plants, steel mills, and other facilities and industries using such high-temperature vessels. And the light-projecting systems and methods can be used for installing anchors for holding and anchoring refractory materials such as concrete and/or other monolithic materials typically applied in a viscous state and cured on site, but in some applications precast or otherwise pre-formed.

In other embodiments, the light-projecting systems and methods can be readily adapted for other applications and industries, for example for identifying installation locations on installation surfaces for other types of construction mounts used in the construction and/or industrial industry. Such other types of construction mounts can include other anchors (e.g., concrete anchors, insulation anchors, pin/stud anchors, wedge anchors, etc.), fasteners (e.g., screws, rivets, bolts and bolt holes, steel structure fasteners, etc.), mounting hardware (e.g., mounting brackets, hooks, eyebolts, and other mounting supports), and other mounted fixtures (e.g., cable trays, pipe trays, suspended flooring, cable tie mounts, cabinets, steel elbows, and/or devices and/or equipment) in the construction and/or industrial industry. These embodiments can be used in applications and industries such as building construction (e.g., for steel erection and steel decking), roadway construction (e.g., of bridges), other heavy construction (e.g., of parkades), shipbuilding, and fabrication shops that require placement of fasteners.

Furthermore, other embodiments include construction and industrial methods using these light-projecting systems and methods, for example refractory lining installation methods and other construction and industrial installation methods including the placement/installation of other types of construction mounts. Yet other embodiments include embodiments designed for mounting to and portable/movable use with tools/equipment other than handheld welding guns, for example handheld power nail guns and drills, and other electric-powered tools, pneumatic-powered tools, hydraulic-powered tools, and powder-activated tools (i.e., Hilti guns).

Moreover, other embodiments include methods of fitting tools such as handheld welding guns with the light-projecting systems so that they can then be used to perform methods for identifying installation locations (e.g., retrofit or new installations on separately provided weld guns), and still other embodiments include the resulting handheld tools fitted with the light-projecting systems for identifying installation locations.

Turning now to the drawings, FIG. 1 shows a system 50 for projecting light 52 onto installation surfaces 2 to form projected-light indicia that identify (define) installation locations 54 according to a top-level embodiment. (The "light indicia" and the "installation locations" are herein referred to synonymously as the same elements.) The light-projecting system 50 includes a light emitter 60 and optics 62 aligned with and downstream from the light emitter 60 (collectively, the light module 63). Typically, the light emitter 60 and the optics 62 are integrally provided together in a housing, and a light-to-support mount 84 is provided to securely mount the light emitter 60 and the optics 62 to a support (e.g., movable (during use) support such as a handheld tool or a static (during use) support such as scaffolding or a tripod). The light-to-support mount is sometimes referred to herein as the light mount (for all embodiments) and sometimes referred to herein as the light-to-tool mount (specifically for movable-use tool-mounted embodiments). In some embodiments, a control unit 64 is integrally included in the system 50 for controlling the operation of the light emitter 60, though in some embodiments the control unit is not needed (e.g., the light emitter 60 can be structurally and operably connected to a handheld tool for operation together). In some embodiments, a power source 66 such as a rechargeable battery is integrally included in the system 50 for powering the operation of the light emitter 60 (e.g., directly or via the control unit 64), though in some embodiments the system includes a power cord for connecting to a separate power source. And in some embodiments, the optics 162 is not included in the light module 63 and its functionality is provided by another element.

The light-projecting system 50 is coordinated with (configuration A) or includes (configuration B) a distancer (a distancing device) 70 that is used to identify (set for configuration A, or measure for configuration B) the projected-light distance the multiple light beams travel (e.g., from the optics 62) to the installation surface 2. The light-projecting system 50 can be mounted to the handheld tool 10 for portable/movable handheld use together with the distancer 70 integrated into the tool 10 (configuration A), or mounted statically in place separate and apart from the tool 10 with the distancer 70 integrated into the system 50 (configuration B).

The light-projecting system 50 of the embodiments described herein is used with a handheld tool 10 that is operable for performing installations at the indicated installation locations 54. In the embodiments described herein, the handheld tool 10 is a stud-welding gun such as the BRANDTECH precision welding equipment (Brand Industrial Services, Inc. d/b/a BRANDSAFWAY, Kennesaw, Georgia). In other embodiments, the handheld tool can be another type of tool such as another type of welding equipment or another type of conventional tool for example as described herein (with or without accessories/attachments) for use to install other construction mounts in/to other installation surfaces for example as described herein.

In typical embodiments, the light-projecting system 50 includes an adjustment mechanism that is adapted to enable repositioning (adjusting) the light module 63 relative to the movable support (e.g., the handheld tool) or static-use support (e.g., a separate static-use structure) it's mounted to and thus relative to the installation surface 2, so that the light module 63 can be moved between (and locked in) at least two different positions. The adjustment mechanism is operable so that, when the support is in a given position relative to the installation surface 2, the light module 163 can be adjustably positioned relative to the support to obtain different indicia spacings X of the installation locations 54 on the installation surface 2. The adjustment mechanism includes two parts that move relative to each other, with the first portion fixed in place relative to the support (and the light mount, e.g., fixed to and formed by a part of the light mount) and with the second portion movable relative to the support (and the light mount, e.g., formed by a part of the light mount and/or the light module) and having the light module 63 securely mounted to it.

For example, in the depicted embodiment, the light mount 84 includes a linear adjustment mechanism that is adapted to enable linearly repositioning (adjusting) the light module 63 along the light axis forward and rearward relative to the support (e.g., the handheld tool or a separate static-use structure) it's mounted to and thus relative to the installation surface 2. The adjustment mechanism is operable so that, when the support structure is repositioned (adjusted) rearward to be farther away from the installation surface 2, the light module 63 can be adjustably repositioned forward relative to the support to obtain the same desired light-projecting distance to the installation surface 2. And when the support is repositioned (adjusted) forward to closer to the installation surface 2, the light module 63 can be adjustably repositioned rearward relative to the support to obtain the same desired light-projecting distance to the installation surface 2. Thus, the adjustment mechanism is operable so that, when the support is in a given position relative to the installation surface 2, the light module 63 can be adjustably positioned linearly forward or rearward relative to the support to obtain different indicia spacings X of the installation locations 54 on the installation surface 2. The adjustment mechanism includes two parts that move linearly (parallel to the light axis) forward (closer to the installation surface 2) and rearward (opposite direction) relative to each other, with the first portion fixed in place relative to the support and with the second portion linearly movable relative to the support and having the light module 63 securely mounted to it either directly (i.e., direct contact/attachment; see, e.g., second embodiment below) or indirectly (i.e., via an intermediate element such as a holder for the light module 63; see, e.g., fourth embodiment below).

Figure 2:
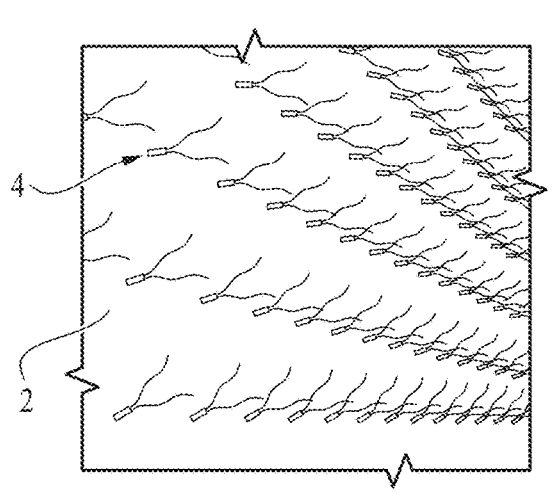
FIGS. 2-3 are perspective views of portions of prior-art thermal vessels with refractory anchors installed on them, with the thermal vessel of FIG. 2 having a generally flat installation surface and the thermal vessel of FIG. 3 having a curved installation surface.
Figure 3:
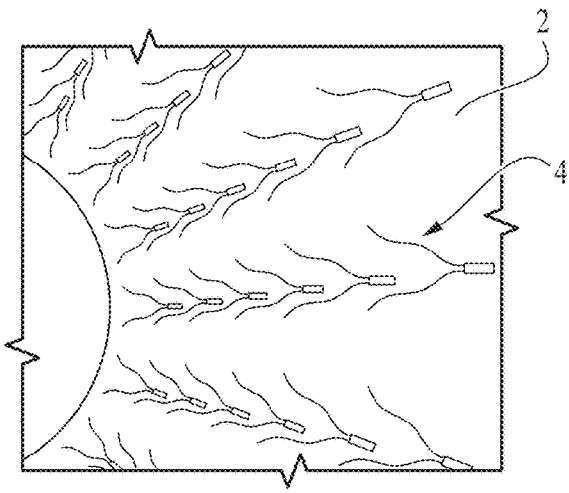

Referring to FIGS. 2-3, the light-projecting system 50 of the embodiments described herein is used to identify installation locations for mounting (e.g., by stud welding) refractory anchors 4 in place, with the installation surface 2 being the inner surface of the sidewall/shell of a thermal-process vessel. In some applications, the thermal-vessel installation surface 2 is substantially planar (FIG. 2), and in other applications, the thermal vessel is cylindrical (e.g., a cyclone separator) with a relatively large-radius curved installation surface 2 (FIG. 3). The light-projecting system 50 of the embodiments described herein can be used for substantially planar installation surfaces 2 (and on curved installation surfaces if the curvature and/or projected-light distance is relatively small), and light-projecting systems of other embodiments include an adjustment system for accounting for curvatures of installation surfaces 2.

FIGS. 4-25 show a system 150 for projecting light indicia 152 onto installation surfaces 2 to identify (define) installation locations 154 according to a first example embodiment. The light-projecting system 150 is mounted to a handheld power tool 110 (a movable-use support) by a light mount (aka a light-to-tool mount) 184 so that a worker can hold and portably (movably) use the handheld tool 10 and the light-projecting system 150 together on a job site. In this embodiment, the light module 163 can be directly mounted to the support/tool (as depicted) or it can be indirectly mounted to the support/tool (e.g., the light module can be incorporated into a multi-component housing that is mounted to the tool). The light-projecting system 150 of this embodiment is well-suited for uses in thermal vessels having confined spaces such as cyclone separators.

The light-projecting system 150 shown in the figures is a prototype embodiment disclosed to provide details of basic components and their arrangement, and it can include the same or similar components as in the light-projecting systems described elsewhere herein, except as expressly detailed herein. As such, details of the common components, features, and uses of the light-projecting systems 150, 1150, 250, and 1250 are not repeated for brevity. Conversely, for such common components, features, and uses, details disclosed for this embodiment also apply to the other disclosed embodiments.

The handheld tool 110 in this embodiment is a stud-welding gun system including a welding mechanism 114, a control unit (e.g., a conventional processor-based controller)

116 for controlling the operation of the welding mechanism 114, and the distancer (distancing device) 170. In the depicted embodiment, the light-projecting system 150 is provided separately from the handheld tool 110 and then installed onto it (e.g., retrofit or OEM installations). In other embodiments, the light-projecting system 150 is integrated into and manufactured together with the handheld tool 110

Figure 10:
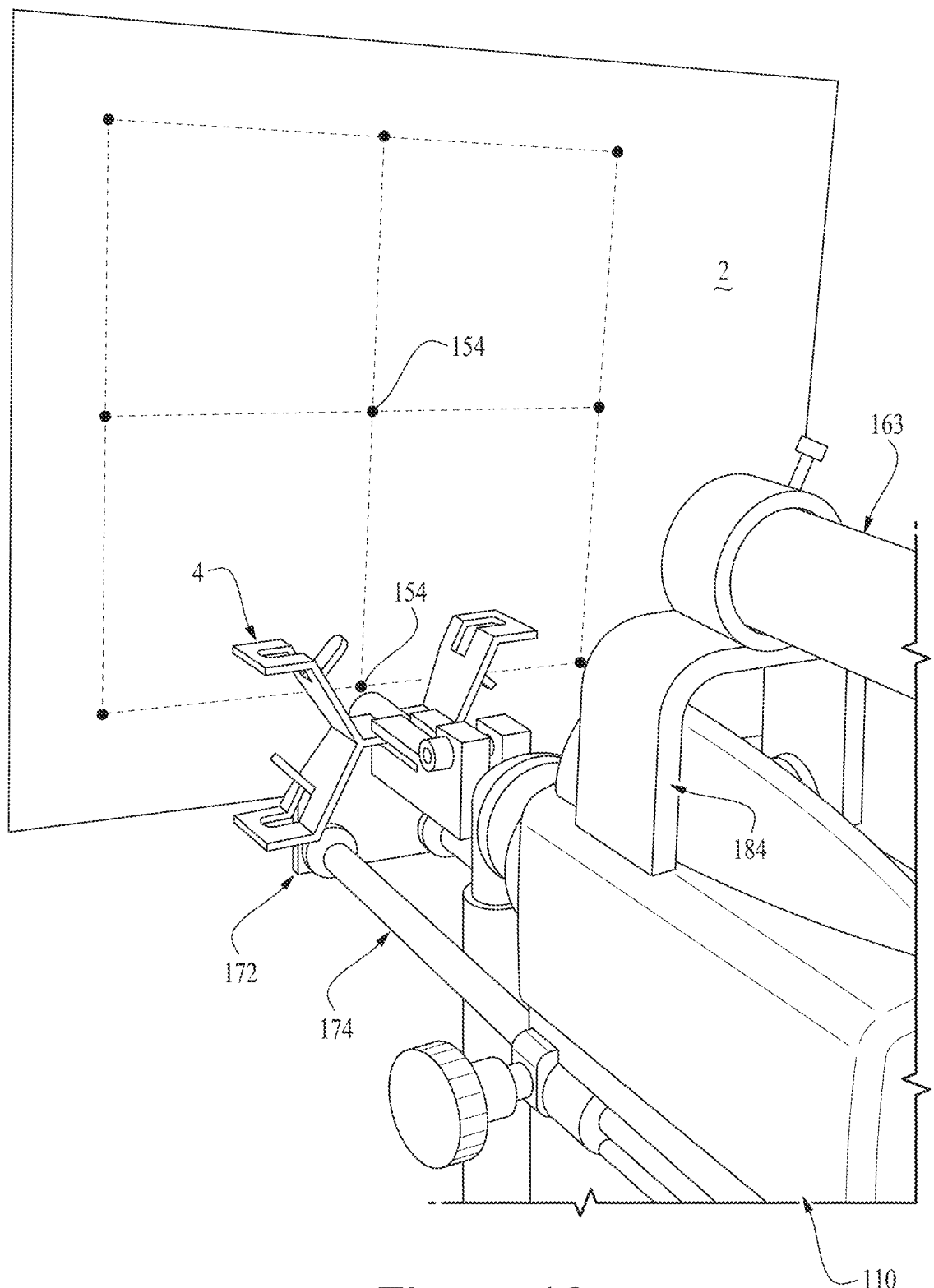

The stud-welding gun system 110 can be of a conventional type, such as BRANDTECH model BTPW-G17, BTPW-MG17, or BTPW-MG23, so for brevity technical details of most if its components are not included. Details of the distancer 170 are provided below with respect to FIGS. 6-7. The light (aka light-to-tool) mount 184 includes a bracket or other mounting elements that removably but securely affix the light-projecting system 150 onto the handheld tool 110 so there is no movement between them during their use together (FIGS. 7-8 and 10 show two different example mounts).

Figure 4:
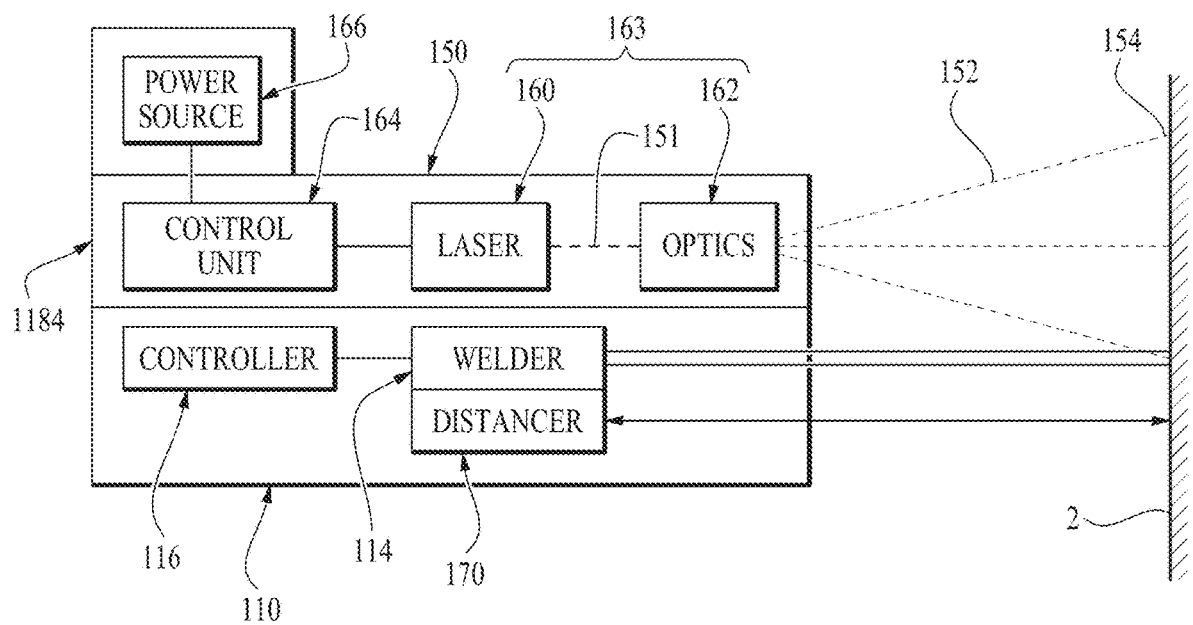
FIG. 4 is a functional schematic diagram of a system for projecting light indicia onto installation surfaces to identify installation locations according to a first example embodiment, showing the light-projecting system mounted to a handheld tool for use together.
Figure 5:
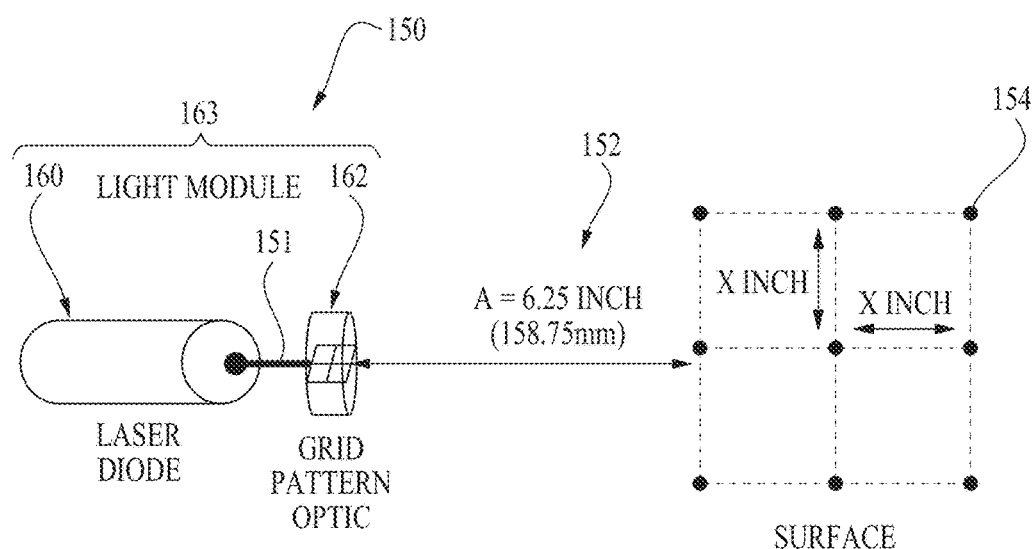
FIG. 5 is another functional schematic diagram of the light-projecting system of FIG. 4, showing a pattern of the light indicia.

Referring particularly to FIGS. 4-5, the light-projecting system 150 includes a light emitter 160 and optics 162 aligned with and downstream from the light emitter 160. The light emitter 160 and the optics 162 can be provided separately or together as a unit, regardless, they are sometimes referred to herein collectively as the "light module" for brevity. Details of an example light module 163 are provided below with respect to FIGS. 12-17.

The light emitter 160 and the optics 162 are selected to provide the functionality described herein. The light emitter 160 can be a laser diode or another light source such as a conventional LED or other coherent or focused-intensity "point" light emitter selected for providing visibility to the naked human eye in the intended operating conditions and environment. For example, the light emitter 160 can be a 515 nm laser diode of a type that is commercially available from PROPHOTONIX Limited (Salem, New Hampshire). The optics 162 can be an optical device/element such as a diffractive optical element (DOE) or another type of beamsplitter. For example, the optics 162 can be a DOE that is customized for the application based on a DOE of the type that is commercially available from PROPHOTONIX Limited (Salem, New Hampshire).

In the depicted embodiment, the light emitter 160 emits a source light beam and the optics 162 diffuses the source light beam into a predefined pattern of light indicia. In typical embodiments, a single optical element 162 diffuses the source light beam from the light emitter 160 into multiple diverging light beams, though optionally multiple optical elements can be used. In other embodiments, the light emitter 160 emits multiple light beams in a predefined pattern of light indicia (e.g., a number of light emitters with parallel light-projecting axes), and the optics 162 are not included. For example, in other embodiments the light emitter can be provided by nine LED lamps in a 3×3 arrangement to project nine light beams (parallel or divergent) in a 3×3 pattern onto the installation surface, without the need for the optics 162. In such embodiments, the "light module" includes the light emitter 160 but not the optics 162, and the "light axis" is defined by the centermost light beam.

Also, in typical embodiments the multiple light beams that form the indicia 154 on the installation surface 2 are divergent/diverging, for example as a result of refractory diffusion by the optics 162. In this way, the resulting indicia 154 projected onto the installation surface 2 have a greater indicia spacing X the farther away the light module 163 is from the installation surface 2 (because the light beams have diverged farther apart before reaching the installation surface 2). The adjustment mechanism (described elsewhere herein) can be used to reposition (adjust) the light module 163 to obtain the desired indicia spacing X. In these embodiments, the centermost light beam (typically forming the target indicia/installation location 154) is perpendicular to the installation surface 2, so its position on the installation surface 2 does not change, and it defines the light axis (along with the light beam emitted by the light emitter 160). The other light beams (other than the centermost light beam) are divergent and not perpendicular to the installation surface 2.

The light module 163 is powered by a battery or other power source 166, for example a rechargeable (e.g., 9 vDC lithium-ion) battery with a relatively long (e.g., 14-hour) operational capacity. In the depicted embodiment, the power source 166 is included in the light-projecting system 150 and is separate from and in addition to the power supply of the stud-welding gun system 110. In other embodiments, the power source 166 is the power supply of the stud-welding gun system 110, and the light-projecting system 150 includes an electrical power line that connects to the power source 166. And in other embodiments, the power source 166 is an electrical power cord for connection to an external power source such as a generator.

In depicted embodiment, the light-projecting system 150 further includes a control unit 164 for controlling the operation of the light module 163. In such embodiments, the control unit 164 can be of a conventional type for the controlling the operation of lasers or other light sources, for example providing functionality for features such as on/off, brightness, and circuit protection. In typical embodiments, the control unit 164 does not include programming for splitting the light beam or selecting configurations/patterns of the lighted indicia, with this functionality being done solely by the optics, and only includes a driver circuit with basic control logic included in the design.

In other embodiments, the control unit can be a conventional processor-based controller (e.g., a PMIC) with programming for controlling the operation of the light emitter 160 to produce the configurations/patterns of the lighted indicia. In such embodiments the light module 163 includes the light emitter 160 but need not include the optics 162. In yet other embodiments, the light-projecting system 150 does not include a control unit for controlling the operation of the light module 163. In such embodiments, the light patterns projected by the light-projecting system 150 can be adjusted for example by mechanically repositioning the light module 163 relative to the handheld tool 110, the basic on/off operation of the light module 163 can be controlled by powering on and off the tool 110, and no additional control of the light module 163 is required.

The light-projecting system 150 is operable to project the multiple light beams 152 that form, on the installation surface 2, a pattern of lighted indicia identifying installation locations 154. In the depicted embodiment, the light emitter 160 emits a source light beam 151 and the optical device 162 alters the source light beam 151 into the multiple light beams 152 that are projected onto the installation surface 2 to identify the installation locations 154. (As used herein, the "lighted indicia 154" and the "installation locations 154" are synonymous.) The lighted indicia/installation locations 154 in this embodiment form a symmetrical/square matrix (dots, intersecting lines defining a grid, etc.), with the installation locations 154 having predefined uniform indicia spacings or separations X. The light-projecting system 150 is coordinated with the distancer 170, based on the projected-light distance A the multiple light beams 152 travel, to ensure that the installation locations 154 are projected onto the surface 2 with the desired/correct indicia spacings X. The light-projecting (aka optics-to-surface) distance A the multiple light beams 152 travel in the depicted embodiment is the distance between where the multiple light beams 152 start (e.g., the front/distal surface of the optical device 162) and the installation surface 2. As shown in FIG. 5, an example grid pattern includes a 3×3 symmetrical/square matrix of lighted indicia that identify the installation locations 154.

Figure 6:
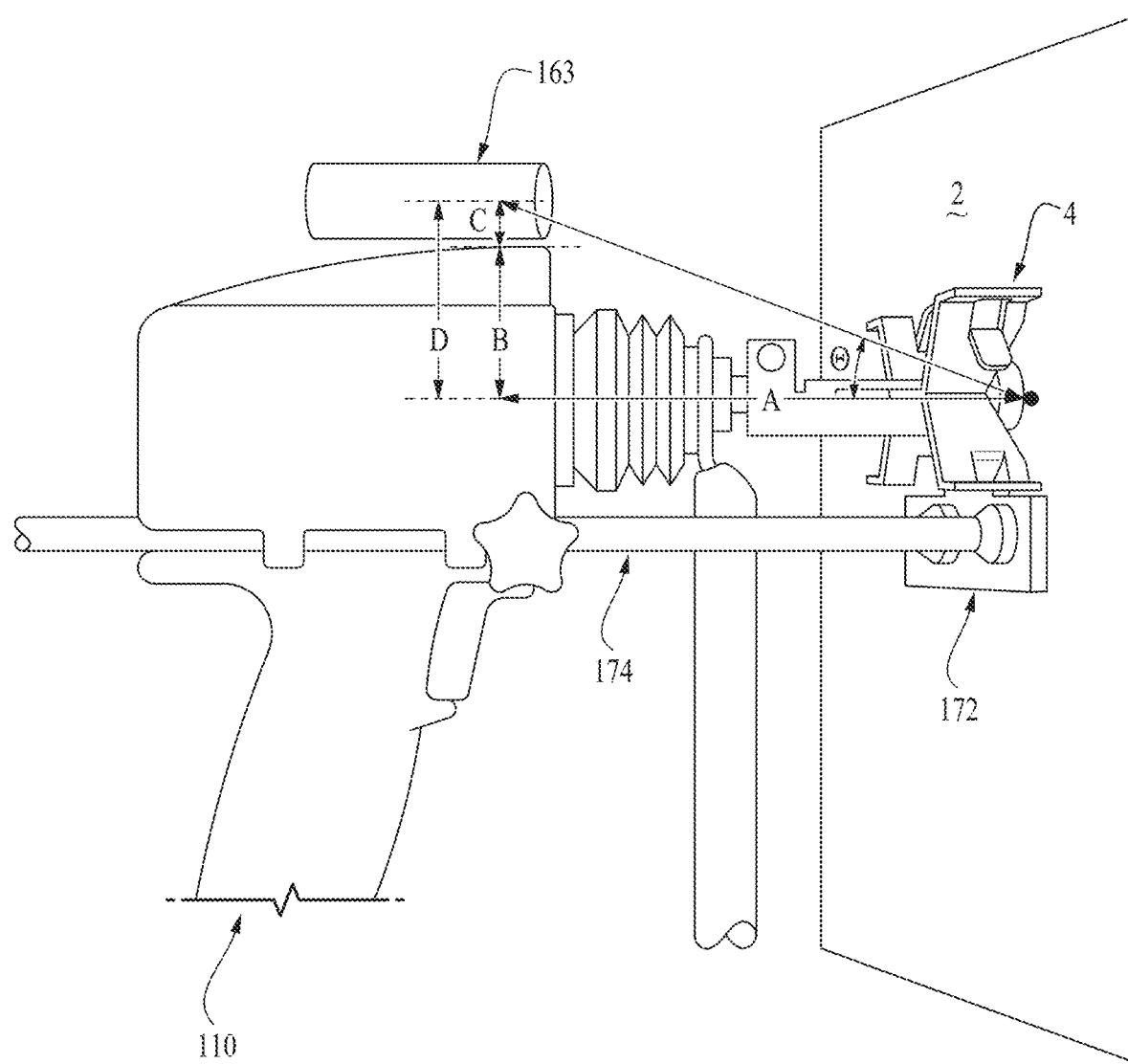
FIGS. 6-10 are side and rear perspective views of the light-projecting system and the handheld tool of FIG. 4 projecting light indicia onto an installation surface, showing design details of the light-projecting system.
Figure 7:
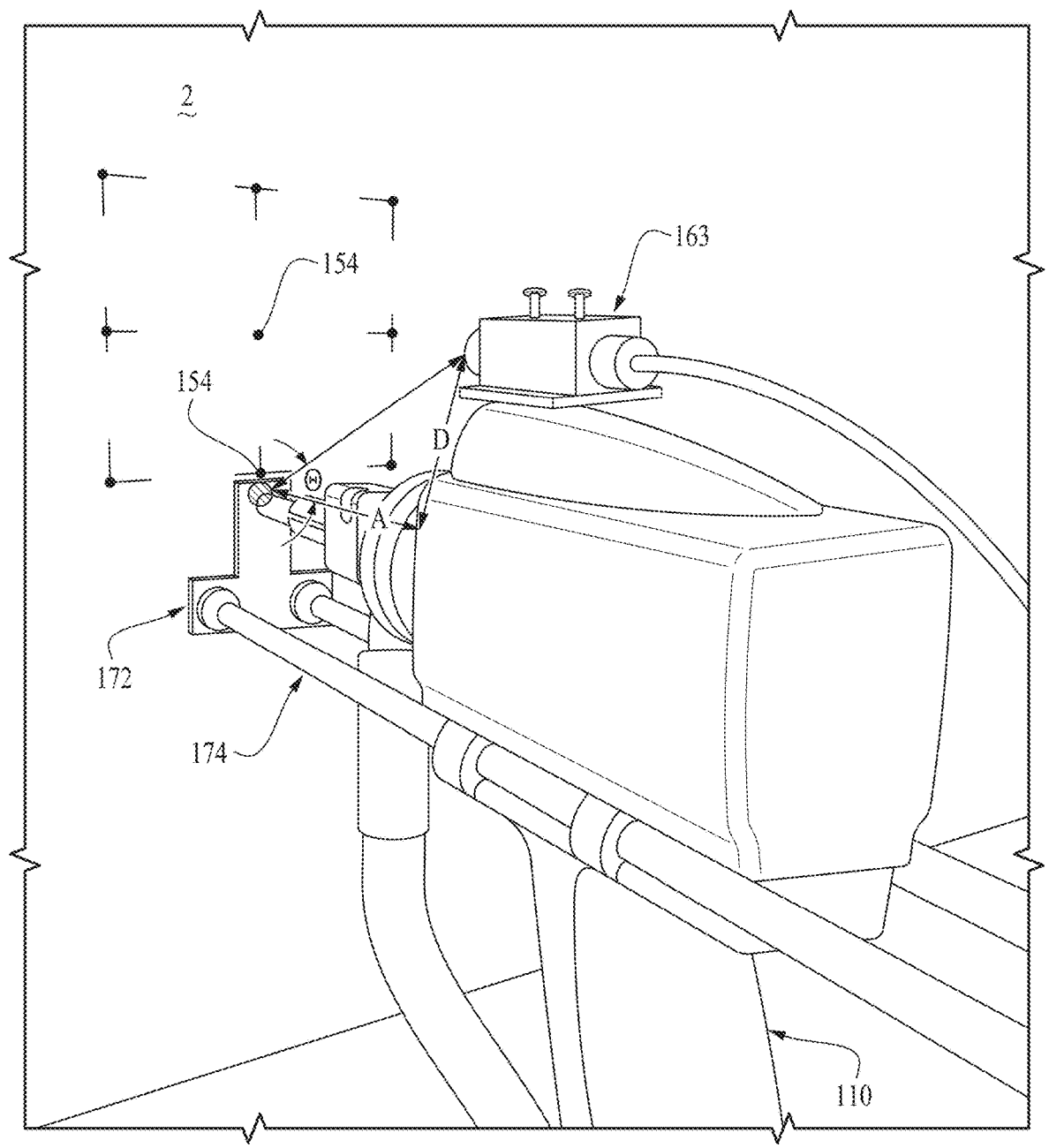
Figure 8:
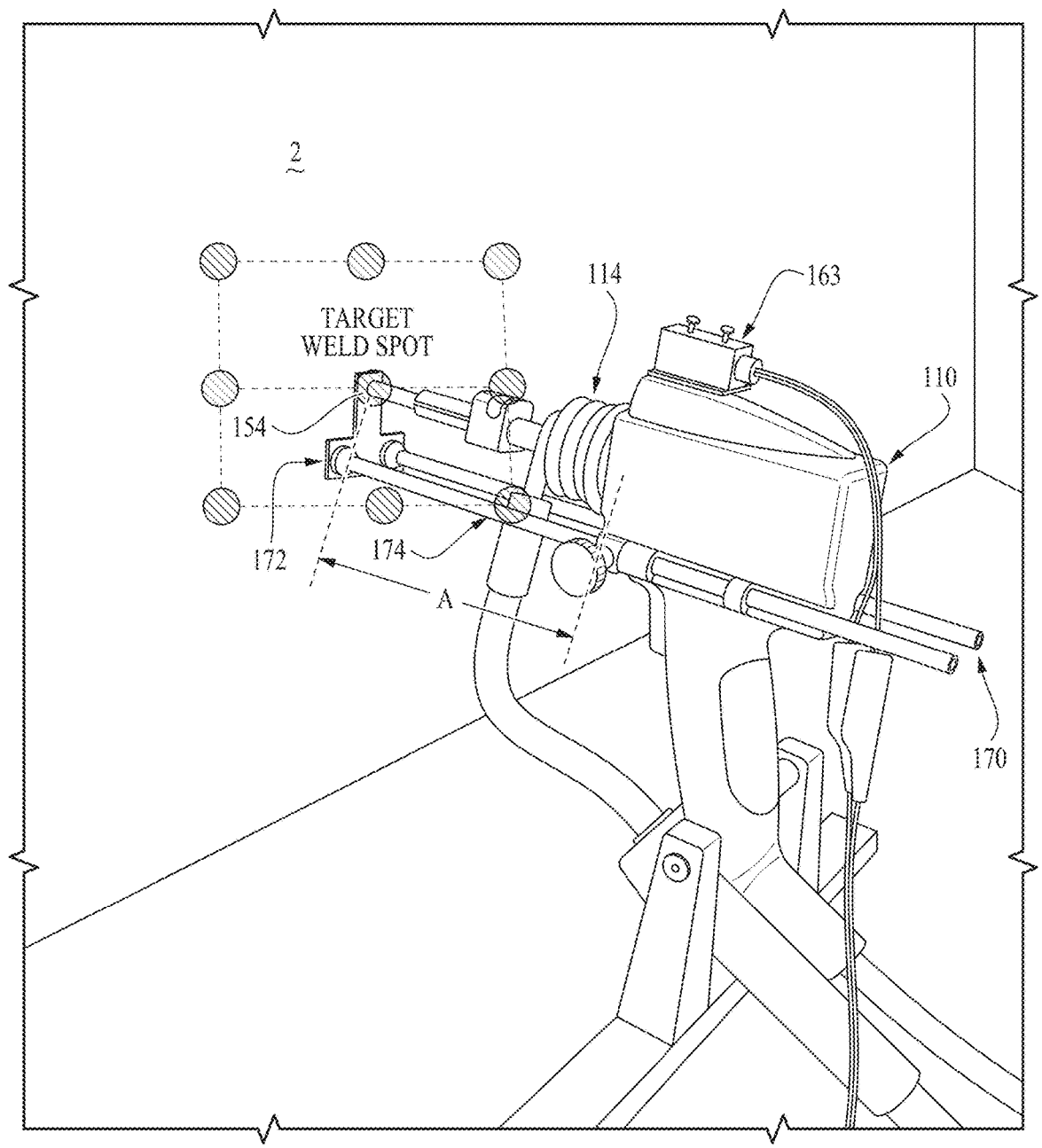

FIGS. 6-7 show design and operational details of the light-projecting system 150 and the stud-welding gun system 110 of this embodiment. The lighted indicia identifying the installation locations 154 are in the pattern of a 3×3 symmetrical/square matrix (array), with one of the installation locations 154 aligned with the light axis of the light module 163 and with another one of the installation locations 154 aligned with the welding (operating) axis of the weld gun 110 (the target installation location), with the light and welding axes offset by a predefined offset distance D (based on a welding-gun offset B plus a light-module offset C) that is the same as the indicia spacings X. Based on these dimensions, the axial offset angle θ can be determined by the equation: $\theta = \tan^{-1} D/A$. As a representative example, for a light-projecting system 150 and weld gun 110 having dimensions with A=130 mm and D=62.9 mm (based on B=40 mm and C=22.9 mm), the axial offset angle θ is about 20 degrees. The optics 162 can then be designed to provide the needed offset angle θ for the desired indicia spacing of installation locations 154 based on the geometry of the particular light-projecting system 150 and stud-welding system 110 and based on the working distances of the weld gun 110 (and thus the light-projecting aka optics-to-surface distance A).

Figure 9:
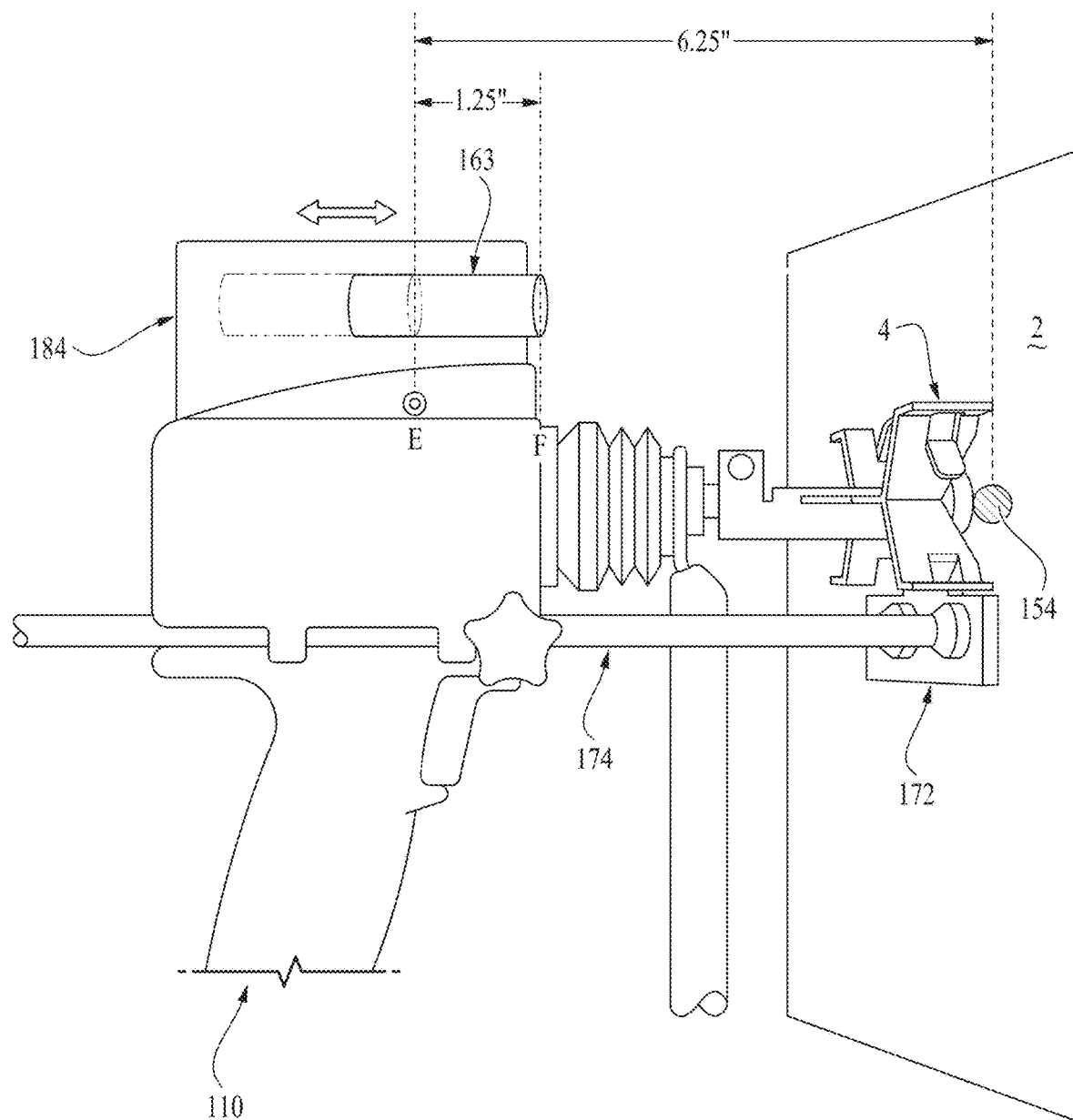

As shown in FIGS. 8-9, the light-projecting distance A is based on and set by the distancer 170. In the depicted embodiment, the distancer 170 includes one or more retractable extension members (e.g., rails) 172 that extend and retract (e.g., slide) relative to a housing of the welding mechanism 114 along an axis parallel to the laser axis and lock in set or indexed positions, and a footplate 174 that extends perpendicularly to the extension members 172 for positioning flush against the installation surface 2 at an installation location 154. The distancer 170 can be adjusted between the set or indexed positions to shorten or lengthen the light-projecting distance A based on the particular application, for example to install anchors with shorter or longer anchor posts. This type of adjustable distancing mechanism is common on conventional weld guns 110. (It should be noted that the hex-cell anchor 4 shown in FIGS. 6 and 9-10 is of a different type from the Y-shaped anchors 4 shown in FIGS. 2-3.) In this way, the footplate 174 of the distancer 170 "sets" (identifies) the light-projecting distance A.

To account for this adjustable distancing for welding and to maintain the desired light-projecting distance A, the light mount 184 includes an adjustment mechanism so that light-projecting system 150 can be linearly adjustably repositioned forward and rearward on the weld gun 110 to permit it to be repositioned linearly along the light axis between positions indexed to the distancer 170. In an example embodiment shown in FIG. 9, the distancer 170 permits indexed repositioning of the weld gun 110 to provide a light-projecting distance A within a predefined range (e.g., 5.0 in. and 6.25 in., or alternatively over a linear distance of 15 mm i.e. 0.59 inches), and so the adjustment mechanism of the light mount enables adjustable repositioning of the light module 163 along the light axis within a predefined range (e.g., between points E and F spaced 1.25 inches or 0.59 inches apart) to account for this. For example, the adjustment mechanism of the light mount 184 can include a sliding mechanism, multiple discrete mounting positions, or other mechanical mounting features to enable the linear repositioning functionality, in which the adjustment mechanism includes two parts that move linearly (forward and rearward on the weld gun 110) relative to each other, with the first portion fixed in place relative to the weld gun 110 and with the second portion linearly movable relative to the weld gun 110 and having the light module 163 securely mounted to it. Thus, the adjustment mechanism is operable so that, when the weld gun 110 is in a given position relative to the installation surface 2, the light module 163 can be adjustably positioned linearly forward or rearward relative to the weld gun 110 to obtain different indicia spacings X of the installation locations 154 on the installation surface 2.

In this way, the adjustable light mount 184 can be used to adjustably reposition the light module 163 to maintain the same indicia spacing of the installation locations 154 (as equal to the constant offset D between the light and welding axes) when the distancer 170 is operated to change the light-projecting (optics-to-surface) distance A. For example, if the distancer 170 is used to extend the footplate 174 farther away (e.g., by 1.25 inches or 0.59 inches), from a closer position (to the installation surface 2) to a farther away position, then the adjustment mechanism of the light mount 184 can be used to adjustably reposition the light module 163 forward (e.g., by 1.25 inches or 0.59 inches), from a farther away position E (from the installation surface 2) to a closer position F, to maintain the same optics-to-surface light-projecting distance A for both positions of the footplate 174 of the distancer 170, which thus maintains the same indicia spacing X of the installation locations 154.

Or the adjustment mechanism of the light mount 184 can be used to reposition the light module 163 to provide a different spacing X of the installation locations 154 (when the distancer 170 is not operated to change the optics-to-surface distance) when using anchors having a different size or spacing requirement. For example, if the distancer 170 is not used to adjust the position of the footplate 174 (relative to the installation surface 2), then the adjustment mechanism of the light mount 184 can be used to adjustably reposition the light module 163 forward (e.g., by 1.25 inches or 0.59 inches), from a farther away position E (from the installation surface 2) to a closer position F, to reduce the optics-to-surface light-projecting distance A, which thus reduces the indicia spacing X of the installation locations 154.

Figure 11:
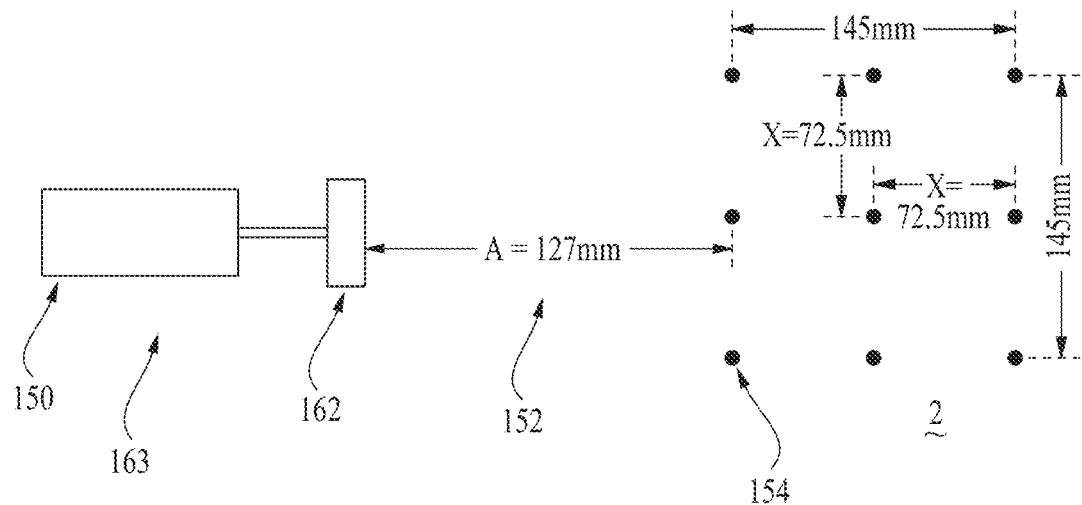
FIGS. 11-12 are additional functional schematic diagrams of the light-projecting system of FIG. 4, showing different projected-light distances producing different light-indicia spacings.
Figure 12:
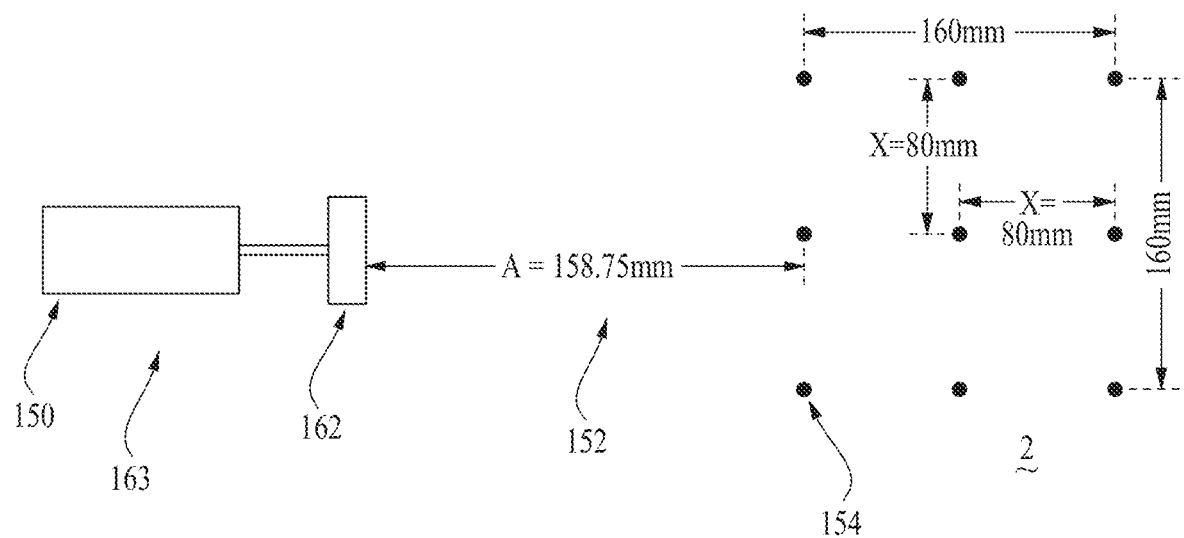

FIGS. 10-12 show two 3×3 matrixes (arrays/grids) of the lighted indicia identifying the installation locations 154, with different indicia spacings X between the installation locations 154. Having variable/different indicia spacings X between the installation locations 154 can be beneficial to enable use of the light-projecting system 150 with different refractory anchors 4 having different sizes/dimensions and different inter-anchor spacing requirements. For example, the matrix pattern of FIGS. 10-11 is symmetrical with a uniform indicia spacing X (72.5 mm) between the installation locations 154 (forming a square grid) and produced with a first optics-to-surface light-projecting distance A (e.g., 127 mm/5 inches), and the matrix pattern of FIG. 12 similarly is symmetrical but with a larger uniform indicia spacing X (80.0 mm) between the installation locations 154 (forming a larger square grid) and produced with a second optics-to-surface distance A (158.75 mm/6 inches) that is greater than the first optics-to-surface distance. The light-projecting system 150 can be repositioned relative to the weld gun 110, for example as described above with respect to FIGS. 8-9, to produce the different indicia-spacing matrixes of installation locations 154. That is, by moving the light module 163 (or at least the optics 162) farther away from the installation surface 2, the altered/angled light beams/portions travel farther away from the light axis of the light emitter 160 until they reach the installation surface 2, so the indicia spacing X between the lighted indicia identifying the installation locations 154 is increased. Conversely, by moving the light module 163 (or at least the optics 162) closer, the indicia spacing X is reduced.

FIGS. 13-18 (example units shown are in mm) show an example light module 163 including the light emitter (e.g., laser) 160 and the optical element (e.g., DOE) 162 provided together in a light-module housing 165. In this embodiment, the light axis of the light module 163 is off-center (non-concentric) relative to and within the module housing 165 (see FIGS. 14 and 17). The light module 163 can be positioned with the light axis closest to the operating (welding) axis of the weld gun 110 (FIG. 15) (with a relatively shorter offset distance D), or it can be repositioned and reoriented (e.g., rotated by 180 degrees, as depicted) with the light axis farthest away from the welding axis of the weld gun 110 (FIG. 18) (with a relatively longer offset distance D). In this way, the pattern (e.g., matrix or grid) of lighted indicia (e.g., dots) 154 projected onto the installation surface 2 can be shifted transversely (e.g., up or down), without changing the indicia spacing X. So the offset distance A (e.g., between the centerlines/axes of the light emitter 160 and the welding gun 110) can be adjusted (e.g., manually or using an angular adjustment mechanism, for example as described herein) to be the same as the indicia spacing X of the projected light indicia 154 in order to position the target installation location directly below the light module 163 and aligned with the operating (e.g. welding) axis. This can be useful for example when the light module 163 (or at least the optics 162) is linearly adjusted (e.g., forward or rearward, and manually or using a linear adjustment mechanism, for example as described herein) between a first projected-light distance A producing a relatively smaller indicia spacing X between installation locations 154 (FIGS. 11 and 15) and a second larger projected-light distance A producing a relatively larger indicia spacing X between installation locations 154 (FIGS. 12 and 18). That is, when the light module 163 is linearly adjusted to adjust the indicia spacing X, the light module 163 can also be angularly adjusted to transversely shift the lighted indicia pattern so that the light indicia that defines the target installation location is aligned with the welding axis. Because the light axis is non-concentric with the axis/centerline of the light module housing, the distance between the welding axis and the axis/centerline of the light module housing is not changed.

To implement this, the light-projecting system 150 can be mounted to the weld gun 110 to permit the light module 163 with the non-concentric light axis to be adjustably moved between (and locked in) two different angular positions (e.g., at 180 degrees apart). That is, the light mount 184 can include a linear adjustment mechanism (as described above), an angular adjustment mechanism (as described now), or both (as in the depicted embodiment). In the embodiments with both, one of the adjustment mechanisms (e.g., the linear adjustment mechanism) can be operated to adjust (larger or smaller) the indicia spacings X of the installation locations 154 on the installation surface 2, and the other one of the adjustment mechanisms (e.g., the angular adjustment mechanism) can be operated to reposition (transversely shift) the location of the center/target installation location at the tool operating axis based on the adjusted indicia spacing X (so that the offset distance D (between the tool operating axis and the light axis) is the same distance as the indicia spacing X).

In the depicted embodiment, the light mount 184 includes an angular adjustment mechanism that's adapted to enable angularly repositioning (adjustably shifting) the light module 163 relative to the weld gun 110 it's mounted to. The adjustment mechanism is operable so that, when the weld gun 110 is in a given position relative to the installation surface 2, the light module 163 with the non-concentric light axis can be adjustably positioned angularly relative to the weld gun 110 to obtain different positions of the installation locations 154 on the installation surface 2. The adjustment mechanism includes two parts that move angularly relative to each other, with at least one the first portion fixed in place relative to the weld gun 110 (and the light mount 184) and with at least one second portion angularly movable relative to the weld gun 110 (and the light mount 184) and having the light module 63 securely mounted to it.

For example, the angular adjustment mechanism of the light (aka light-to-tool) mount 184 can include a keyed mechanism (e.g., male and female elements that mate to prevent rotation between them) or other mechanical mounting features to enable the rotational repositioning and locking functionality. In the depicted embodiment, the light module 163 includes a female element (e.g., slot) 161 (i.e., the second portion of the angular adjustment mechanism) extending longitudinally along the light-module housing 165, and the light-to-tool mount (attached to the weld gun 110) includes two male members (e.g., tabs or ridges) (i.e., the first portion of the angular adjustment mechanism) that are receivable in the slot 161 and that are positioned at 180 degrees apart (opposite and facing each other), so that the slot 161 engages a first one of the male members in a first angular position of the light module 163 and engages a second one of the male members in a second 180-rotated angular position of the light module 163.

In other embodiments of the angular adjustment mechanism, the light module includes two of the slots (the second portion of the angular adjustment mechanism) positioned at 180 degrees from each other (opposite and facing each other) and the light mount includes one of the male elements (the first portion of the angular adjustment mechanism), or the male elements and female elements (e.g., slots) are reversed, for providing the same rotational repositioning and locking functionality. In this way, the adjustable light mount can be used to angularly reposition (adjustably shift) the light module 163 to provide different locations of the indicia 154 when using anchors having different sizes or spacing requirements. In some embodiments, two light modules 163 are provided with each for mounting in the same position (angularly and linearly) and with each having a different optical device 162, instead of one light module that is moved angularly or linearly between two or more positions.

The optics 162 can be designed or selected for providing a range of different lighted indicia, and patterns of lighted indicia, to identify at least three installation locations 154, including a light axis installation location, an operating (e.g., welding) axis installation location (i.e., the target installation location), and at least one reference installation location (typically at least two reference installation locations for triangulation purposes to accurately define/locate the target installation location. As noted above, the light-projecting system 150 can be configured to project lighted indicia that are dots and/or intersecting lines defining a 3×3 square matrix of installation locations 154. In other embodiments, the light-projecting system can be configured to project lighted indicia that are Xs, crosses, circles, triangles, or other shapes defining the installation locations 154, and/or line portions (e.g., dotted lines) that intersect to define the installation locations 154. In other embodiments, the light-projecting system can be configured to project lighted indicia defining a square or rectangular 4×4 matrix, a 5×5 matrix, a 6×6 matrix, a 7×7 matrix, etc. And in other example embodiments, the lighted indicia are not in a regular matrix pattern but instead form another pattern such as a 3-2-3-2-3 pattern.

Figure 19:
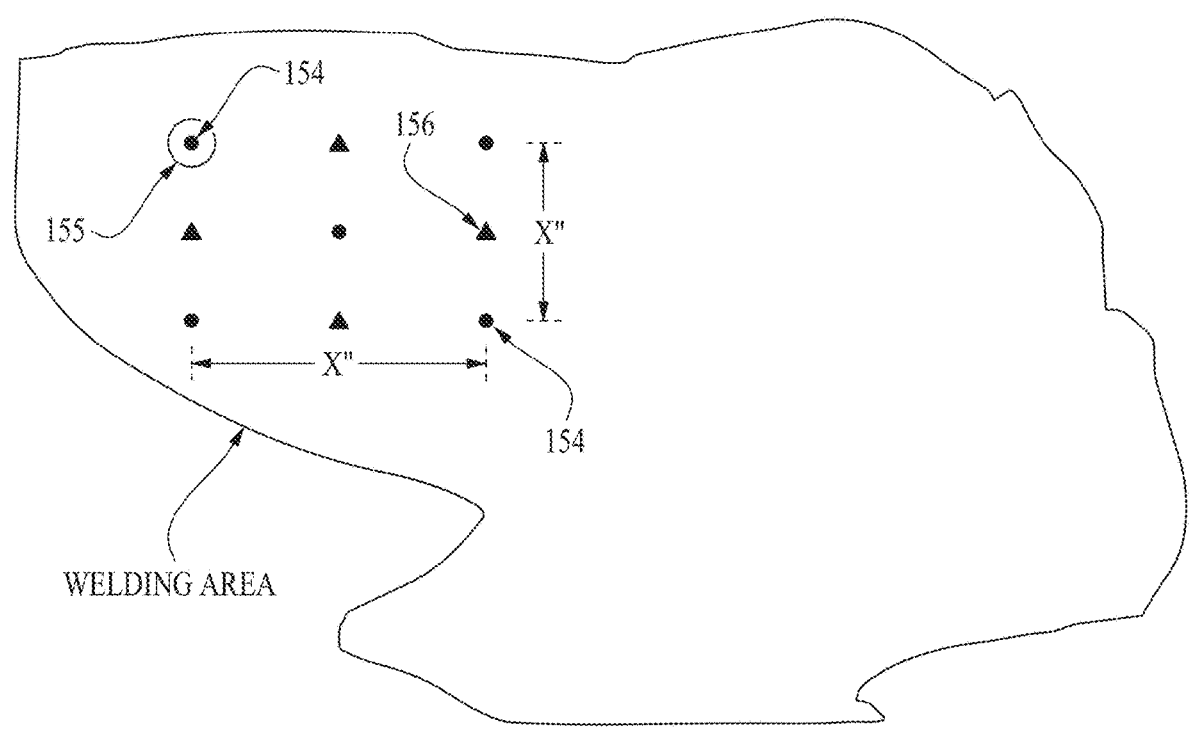
FIG. 19 shows features of a light-indicia pattern formed by the light-projecting system of FIG. 4.

In some example embodiments, the lighted indicia have a modified color (e.g., green instead of for example standard red) so the installation locations 154 are easier to see by the human eye when the surface 2 is rusted. For example, the light module can include a light filter to alter the color of the light beam 152. And in some example embodiments, the lighted indicia include the installation locations 154 and also include reference aid indicia. For example, the reference aid indicia can be peripheral lighted indicia 155 surrounding the installation locations 154 (e.g., a concentric circle) and/or a different-shaped lighted indicia 156 (e.g., triangles instead of dots), as shown in FIG. 19. The different-shaped lighted indicia 156 can be positioned between the installation locations 154 and separated from them by a spacing Y.

In some embodiments, the optic 162 is removably mounted to the light emitter 160 so it can be replaced with a specific optic selected for the job. This removable mounting can be of a conventional type known in the art, for example including a bracket, latch, screw-on design, locking tabs, etc. In this way, multiple optics 162 can be provided, with each producing a dedicated indicia pattern (different shape and/or size), and with one selected for each application and mounted to the weld gun 110 to provide the desired pattern. In other embodiments, the light module 163 is an integral unit including the light emitter 160 and the optical decide 162, and multiple light modules 163 can be provided, with each producing a dedicated indicia pattern shape and/or size, and with one selected for each application and mounted to the weld gun 110 to provide the desired indicia pattern.

In further example embodiments, the lighted indicia have two or more different types, such as two different colors and/or shapes. For example, the lighted indicia can define an 8×8 matrix, with half being green circles and with the other half being red triangles arranged in an alternating manner. In this way, the same projected light indicia pattern can be used for two different applications, with one application being to install an anchor at every installation location 154 (the green circles and the red triangles) to form an 8×8 array of installed anchors with a smaller anchor/indicia spacing, and with another application being to install an anchor at every other installation location 154 (only the green circles or only the red triangles) for form a 4×4 array of installed anchors with a larger anchor/indicia spacing.

FIGS. 20-25 show an example method of installing the anchors 4 at the light indicia (depicted as dots) defining installation locations 154 using the light-projecting system 150 and the tool (e.g., weld gun) 110. In particular, these figures show installing anchors 4a-f (collectively the anchors 4) at a target light indicia dot defining an installation location 154a using the light-projecting system 150 and the weld gun 110.

The indicia spacing X can be adjusted by linearly repositioning the light module to adjust the projected-light distance D of the light module to obtain the desired/correct indicia spacing X for the particular application. This linear repositioning can be done manually (e.g., by unmounting, moving, and remounting the light module on the handheld-tool support). Also, this linear repositioning can be done using a linear adjustment mechanism (e.g., as described herein) to reposition the light module on the handheld-tool support without removing it to do so. In addition, the actual projected-light distance D can be identified (i.e., set) in order to assist in the linear adjusting/repositioning so that the light module can be properly repositioned to obtain the desired/correct projected-light distance D. This distance setting can be done for example manually using a tape measure or using a distancing device such as a footplate of the handheld-tool support (e.g., when this a handheld welding gun).

FIG. 20 shows a first anchor 4a installed in a first location using the weld gun 110 (but not necessarily the light-projecting system 150) in order to establish a first reference point (installation location). In FIG. 21, the weld-gun 110 has been positioned so that the light-projecting system 150 is projecting a 3×3 matrix of lighted-indicia dots, with the lower left dot at the first installed anchor 4a as a reference point/location, and with the lower center target dot 154a at the welding axis to install a second anchor 4b. In FIG. 22, the weld-gun 110 has been shifted transversely (laterally to the right) and repositioned so that the light-projecting system 150 is projecting the same 3×3 matrix of lighted dots, but with the lower left dot at the second installed anchor 4b as a reference point, and with the lower center target dot 154a at the welding axis to install a third anchor 4c. The first installed anchor 4a is now co-located (coinciding) with a lighted dot. In this way, the method includes co-locating at least one reference light indicia with at least one existing anchor in order to project one or more target installation locations with the same indicia spacing X maintained throughout the installation job.

The process can be continued in a repeating manner by transversely repositioning/shifting the weld gun 110 laterally (to the right) until an entire row of anchors has been installed, or whenever desired the weld gun 100 can be shifted downward (or upward) to install another row or column of anchors. It will be understood that this example sequence is representative, and the process can be performed right to left, down to up, or in any other desired sequence.

In FIG. 23, the weld-gun 110 has been transversely shifted downward and repositioned so that the light-projecting system 150 is projecting the same 3×3 matrix of lighted dots, but with the center dot at the first installed anchor 4a and the center right dot at the second installed anchor 4b as reference points, and with the lower center target dot 154a at the welding axis to install a fourth anchor 4d. The third installed anchor 4c is not now co-located with a lighted dot.

In FIG. 24, the weld-gun 110 has been transversely shifted to the right and repositioned so that the light-projecting system 150 is projecting the same 3×3 matrix of lighted dots, but with the center left dot at the first installed anchor 4a, the center dot at the second installed anchor 4b, the center right dot at the third installed anchor 4c, and the lower left dot at the fourth installed anchor 4d as reference points, and with the lower center target dot 154a at the welding axis to install a fifth anchor 4e.

And in FIG. 25, the weld-gun 110 has been transversely shifted farther to the right and repositioned so that the light-projecting system 150 is projecting the same 3×3 matrix of lighted dots, but with the center left dot at the second installed anchor 4b, the center dot at the third installed anchor 4c, and the lower left at the fifth installed anchor 4e as reference points, and with the lower center target dot 154a at the welding axis to install a sixth anchor 4f. The first and fourth installed anchors 4a and 4d are not now co-located with a lighted dot. The process is continued until all of the intended anchors have been installed.

The described installation method is detailed as an example and thus is not an exclusive or limiting of the method. Based on this example, it will be understood that the installation method includes positioning the weld gun 100 and light-projecting system 150 with at least one lighted indicia defining a reference installation location 154 co-located (coinciding) with an installed anchor 4 and with a target light indicia aligned with the operating (welding) axis of the weld gun 110, then operating the weld gun 110 to install a next anchor 4 at the target installation location 154*a*, then transversely repositioning the weld gun 100 and light-projecting system 150 to repeat the process.

In related embodiments, the light mount of the light-projecting system is adapted to mount (e.g., securely but linearly adjustably) the light module to another movable-use support such as a helmet, a wearable harness or straps (for chest or shoulder mounting to a body part of the worker), or another wearable or carriable item used in the particular installation process.

FIGS. 26-43 show a system 1150 for projecting light indicia 1152 onto installation surfaces 2 to identify (define) installation locations 1154 according to a second example embodiment. The light-projecting system 1150 shown in the figures is a further-developed embodiment of the light-projecting system 150, and it can include the same or similar components and use as in the light-projecting systems described elsewhere herein, except as expressly detailed herein. As such, details of the common components, features, and uses of the light-projecting systems 50, 150, 250, and 1250 are not repeated for brevity. Conversely, for such common components, features, and uses, details disclosed for this embodiment also apply to the other disclosed embodiments.

Generally, the tool-mounted embodiments (described above and below) are typically (but not only) used for installation installations where layouts are set to identify/define where an anchor, stud, fastener, and/or other construction mount (e.g., other metal mounted construction and/or industrial objects) is to be mounted (e.g., stud welded). The light module is engineered to project a layout in the configuration of an array/pattern of indicia (e.g., nine dots) marking the installation locations for mounting (attaching or affixing) the construction mounts. The indicia patterns (arrays or other layouts) can be precalculated and custom designed specifically for the application so that human interpretation is removed from the equation, thus resulting in increased reliability/accuracy and speed/productivity in the process and outcome. This is especially important when working in confined spaces where room and "real estate" is limited, such as a relatively small, inhospitable, and dark environment.

Figure 26:
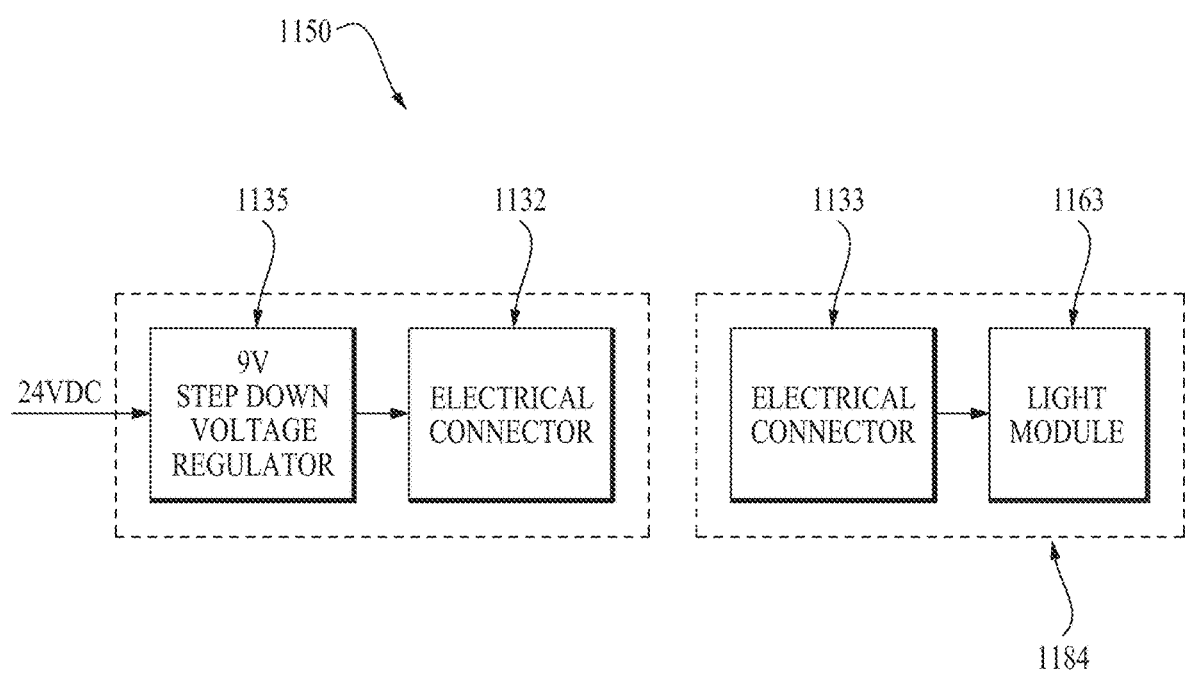
FIG. 26 is a schematic diagram of a system for projecting light indicia onto installation surfaces to identify installation locations according to a second example embodiment.
Figure 27:
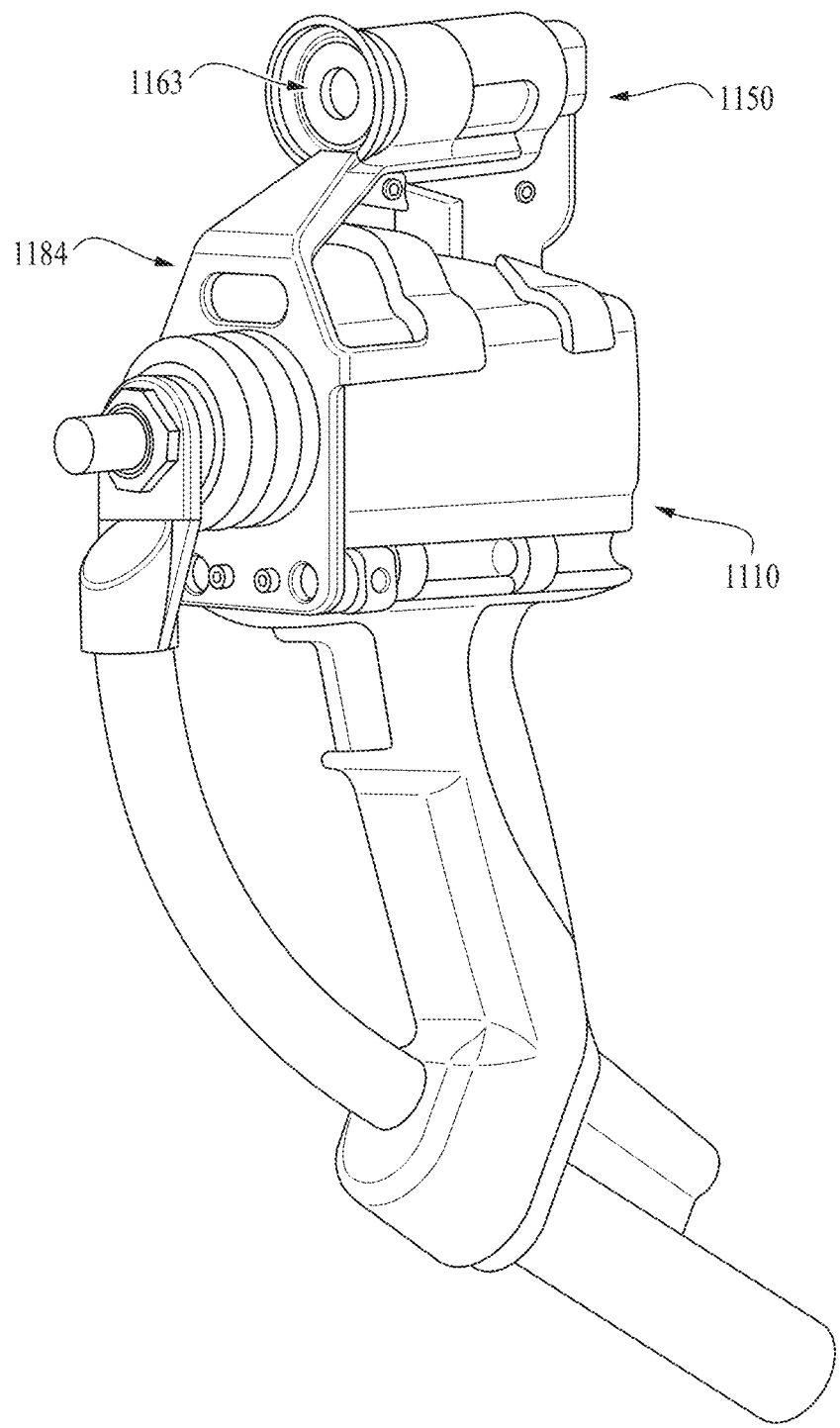
FIGS. 27-28 are front and rear perspective views of the light-projecting system of FIG. 26 shown mounted to handheld tool for use together.
Figure 28:
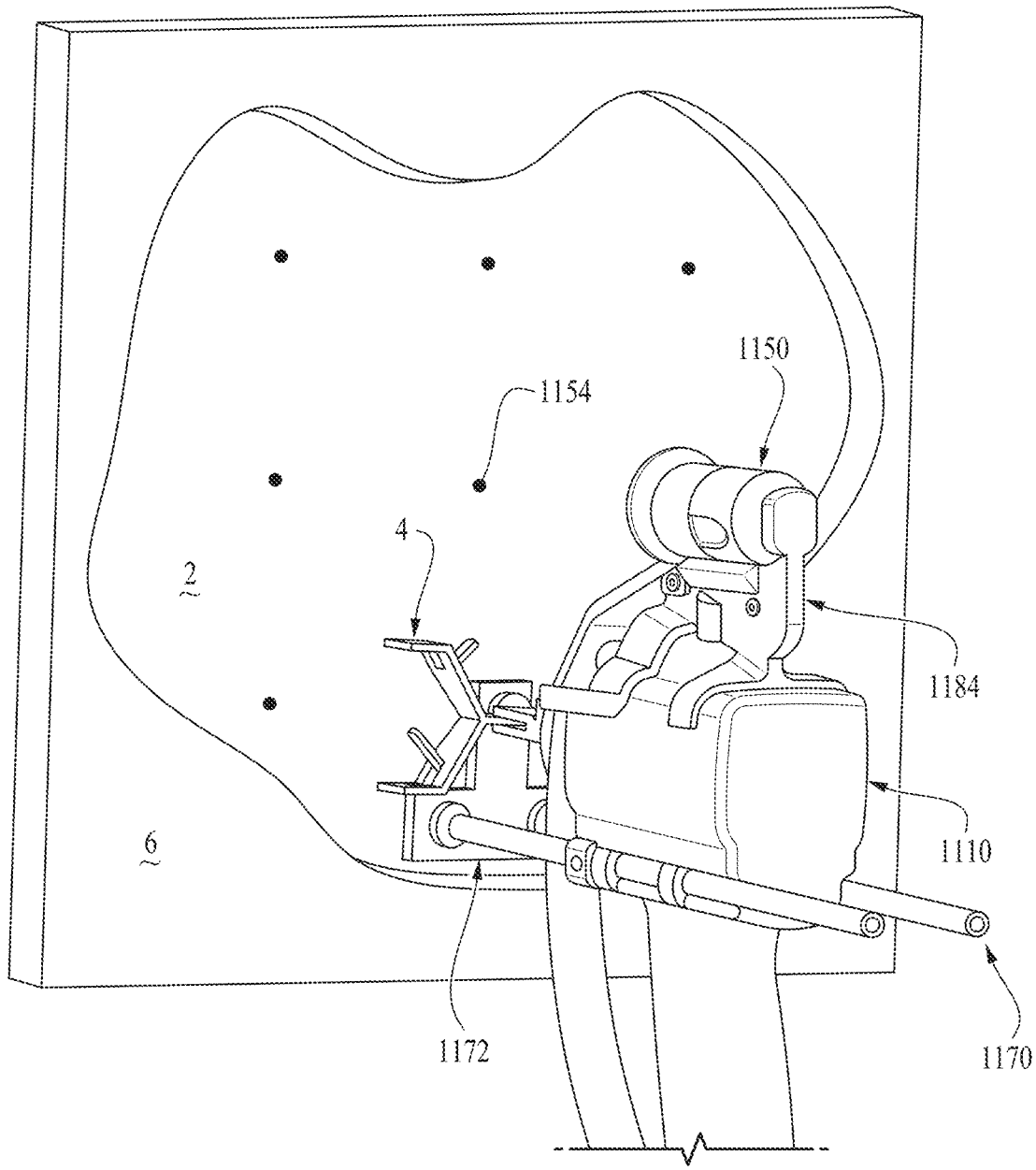

Referring particularly to FIGS. 26-28, the light-projecting system 1150 includes a light module 1163, a light-to-tool mount 1184 that mounts the light module to the handheld power tool 1110, and an adjustment mechanism that's operable to adjustably reposition the light module relative to the tool 1110 to adjust the indicia spacing X of the installation locations 1154. As in the previous embodiments, the light module 1163 can include a light emitter and an optical device, and the movable support/tool 1110 that the light module 1163 mounts to can be a welding gun, as depicted. In this embodiment, the light module 163 can be directly mounted to the support/tool (as depicted) or it can be indirectly mounted to the support/tool (e.g., the light module can be incorporated into a multi-component housing that is mounted to the tool).

In use, the light-projecting system 1150 is mounted to the welding gun 1110 to project light indicia to identify (define) installation locations 1154 on an installation surface 2, for example to install refractory anchors 4 for securing a refractory material lining 6 in place to protect an installation surface 2 of a thermal vessel. (The refractory lining 6 shown is representative for illustration purposes only; it is not actually installed until after the anchors 4 are first installed.) The projected light pattern can be an array of dots, for example the depicted square matrix/array (e.g., a 72.5 mm×72.5 mm) or a rectangular matrix/array (e.g., 62.5 mm×80 mm). The light-projecting system 1150 can be readily adapted to provide other light patterns, as described herein elsewhere.

The light-projecting system 1150 is mounted to the handheld welding gun 1110 by the light mount 1184 so that a worker can hold and portably/movably use the weld gun 1110 and the light-projecting system 1150 together on a job site. The welding gun 1110 includes the distancer 1170, which has a footplate 1174 that is adjustably positionable (linearly extendable and retractable) for use with different types of anchors 4. When the footplate 1174 is positioned flat against a planar installation surface 2, the weld gun 1110 is oriented with its welding axis perpendicular to the installation surface 2. The light module 1163 is mounted to and moves with the weld gun 1110, so repositioning the weld gun 1110 also repositions the light module 1163 by the same distance. This in turn results in different light-projecting distances A (aka light travel or optics-to-surface distances).

To account for the different light-projecting distances A, the light mount 1184 includes an adjustment mechanism that is adapted to enable linearly repositioning the light module 1163 on the tool 1100. In the depicted embodiment, the light module 163 includes a light emitter (e.g., a laser) and an optical device (e.g., a DOE) integrally provided as a single unit component, and so the entire light module is repositionable. In other embodiments, the optical device is not integrally provided with the light emitter in the light module (e.g., so different optical devices can be installed and used for a given applications), and the optical device is linearly repositionable/adjustable but the light emitter is not. And in other embodiments, the source light beam emitted by the light emitter is split into the multiple light beams by another component, and the optical device is not included in the light module. Accordingly, as used herein, linear adjusting and repositioning of the light module 1163 by operation of the adjustment mechanism of the light mount 1184 is intended to mean all of those arrangements just described.

Figure 29:
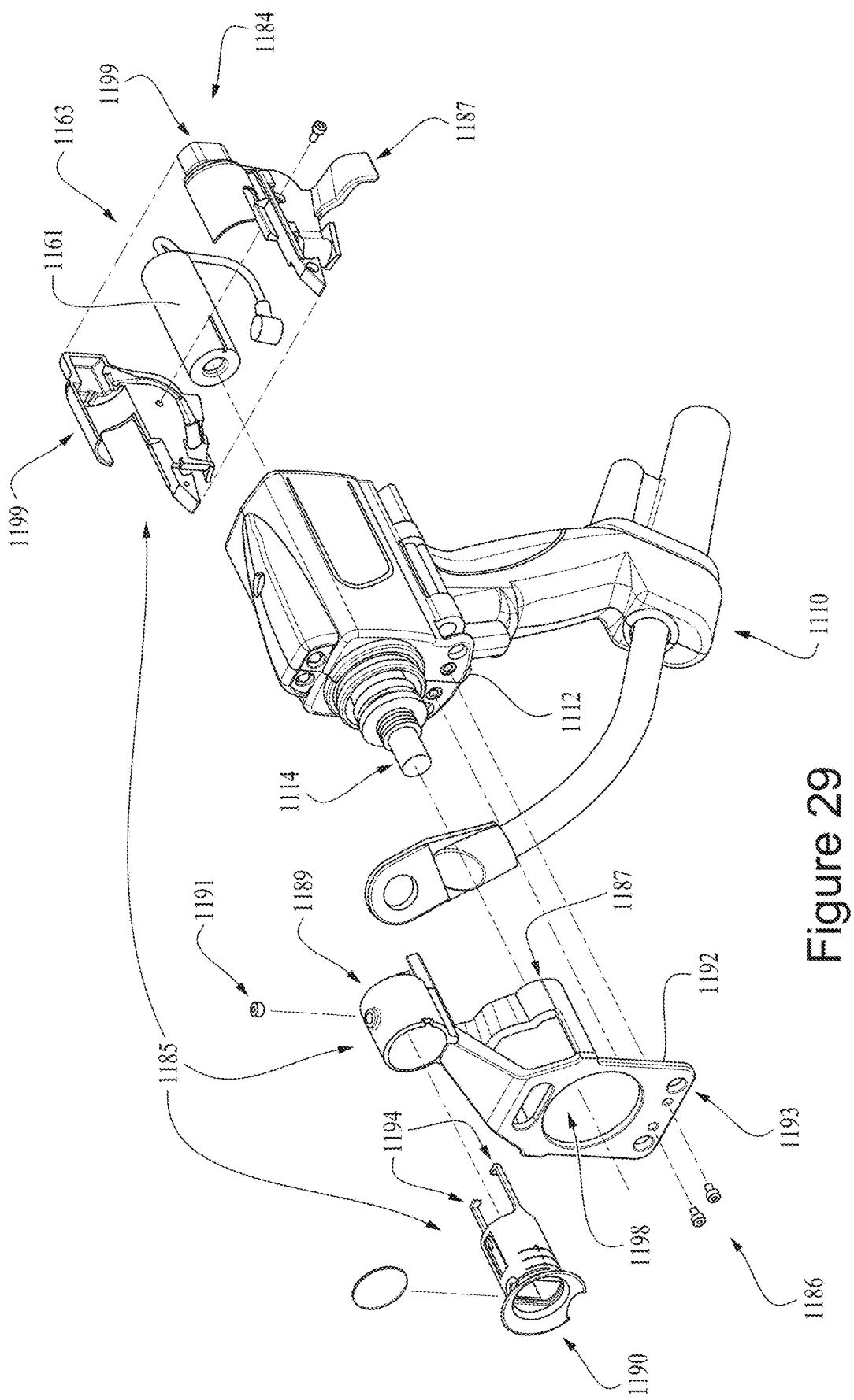
FIG. 29 is an exploded view of the light-projecting system of FIG. 27 shown with reference to the handheld tool.
Figure 30:
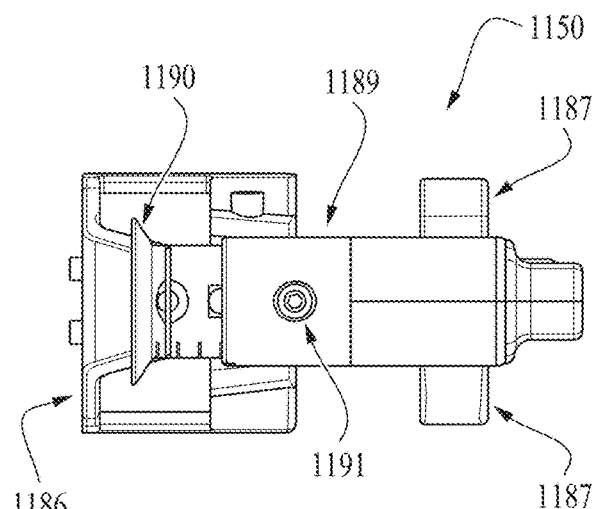
FIGS. 30-31 are top and side views, respectively, of the light-projecting system of FIG. 27, showing the light module positioned for producing a light-indicia pattern with light-indicia spacings.
Figure 32:
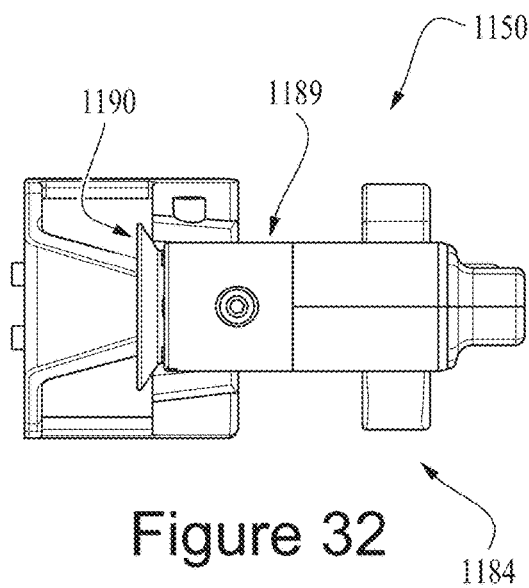
FIGS. 32-33 show the light-projecting system of FIGS. 30-31 with the light module linearly repositioned degrees to produce the same light-indicia pattern but with different light-indicia spacings.
Figure 31:
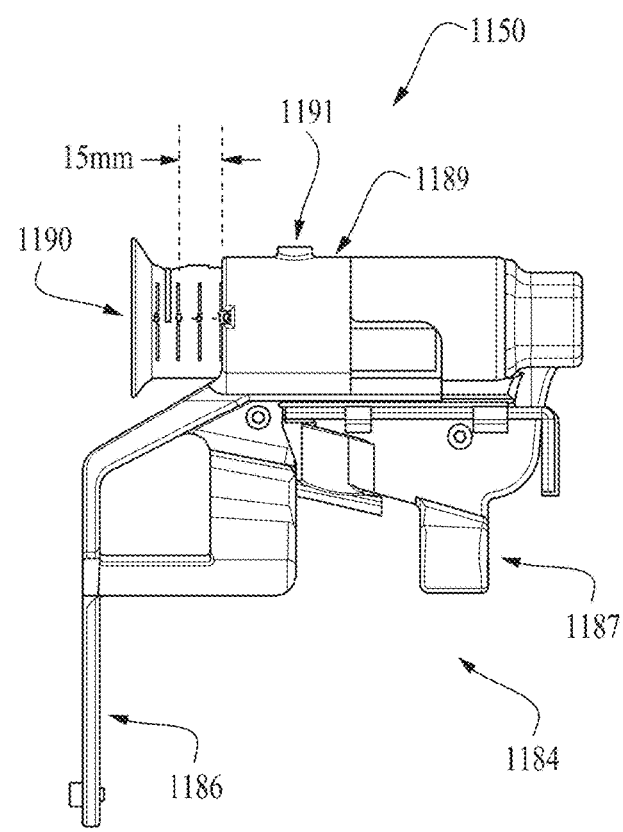
Figure 33:
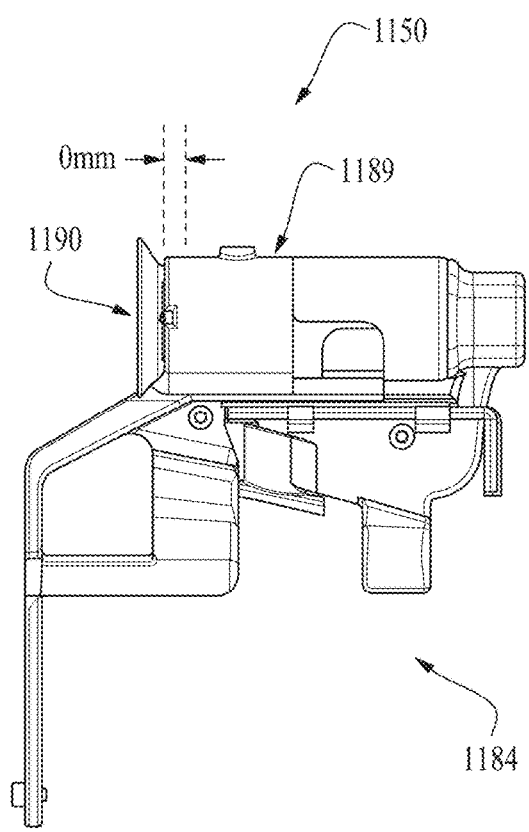

Referring particularly to FIG. 29, the light mount 1184 includes a holder 1185 that holds the light module 1163, at least one attachment 1186 that secures the holder 1185 to the tool 1110, and the adjustment mechanism that enables repositioning the light module 1163 relative to the holder 1185. The holder 1185 can include multiple parts assembled together, for example three major components as depicted. Also, the holder 1185 can include one or more mount supports (e.g., clips, legs, or other elements) 1187 that have a shape conforming to the tool 1110 so that they assist and cooperate with the attachment 1186 to secure the light mount 1184 in place on the tool 1110.

In addition, the light-to-tool mount 1184 and the light module 1163 can include an angular adjustment mechanism with first and second keyed portions (e.g., male and female elements that mate to prevent rotation between them) or other mechanical mounting features to provide the rotational repositioning and locking functionality described above with respect to FIGS. 13-18 (i.e., mounting the light module 163 in two different angular positions to produce two different indicia spacings). In the depicted embodiment, the light module 1163 includes at least one female element (e.g., a slot in the light-module housing) 1161 (i.e., the second portion of the angular adjustment mechanism) extending longitudinally along its holder 1165, and the light-to-tool mount 1184 includes at least two male members (e.g., tabs or ridges) 1194 (i.e., the first portion of the angular adjustment mechanism) that are receivable in the slot 1161 and that are at different angular positions (e.g., positioned at 180 degrees apart, opposite and facing each other), so that the slot 1161 engages a first one of the male members 1194 in a first angular position of the light module 1163 and engages a second one of the male members 1194 in a second (e.g., 180-rotated) angular position of the light module 1163. The depicted male members 1194 are tabs extending inwardly from rearwardly extension arms 1194 (e.g., of a second holder portion 1190) of the light-to-tool mount 1184 (see also FIG. 39). In other embodiments, the light module includes two of the slots positioned at 180 degrees from each other (opposite and facing each other) and the light-to-tool mount includes one of the male elements, or the male and female elements are reversed, for providing the same rotational repositioning and locking functionality.

Referring particularly to FIGS. 30-33, the linear adjustment mechanism includes two portions of the light mount 1184 (e.g., of the mount housing 1185) that move linearly (forward and rearward on the tool 1110) relative to each other, with the first portion fixed in place relative to the tool 1110 and with the second portion linearly movable relative to the tool 1110 and having the light module 1163 securely mounted to it. In the depicted embodiment, for example, the adjustment mechanism includes telescopically sliding parts, with two portions of the mount holder 1185 that are telescopically arranged and slidable relative to each other, for example with the first portion 1189 integrally formed with the attachment 1186 (e.g., a collar from which the attachment 1186 extends and through which the light module 1163 is slidingly received, as depicted), with the second portion 1190 telescopically arranged and linearly slidable relative to the first portion 1189 (e.g., a plunger or sleeve, as depicted), and with the light module 1163 securely mounted to and/or housed within at least a portion of the second portion (e.g., housed within a sleeve and connected by extension arms, as depicted). The second portion (e.g., plunger or sleeve) 1190 can include extension arms 1195 that engage the light module 1163 so that they linearly move together (see also FIGS. 38-39). (The extension arms 1195 can include the male key members 1194 for the angular adjustment mechanism described above, as depicted.) The second portion (e.g., plunger or sleeve) 1190 moves linearly parallel to (including coaxially with) the light axis of the light module 1163. Also, the mount supports 1187, and optionally other male keyed members (for the angular adjustment mechanism), can be included in a third portion 1199 of the light mount 1184 (e.g., two housing shell pieces, as depicted) or optionally in the first or second portions 1189 or 1190 of the light mount 1184.

In addition, the depicted adjustment mechanism includes a fastener 1191 that secures the first and second holder portions 1189 and 1190 together in place for use after they have been adjusted to achieve the desired position of the light module 1163. The fastener 1191 can be for example a set screw that extends through an opening in the fixed or movable portion 1189 or 1190 and that frictionally binds against the other portion 1189 or 1190, as depicted. In other embodiments, the fastener can be a clamp, clip, pin, latch, spring, or another fastening element or device to mechanically secure together the fixed and movable holder portions 1189 and 1190.

In other embodiments, the two portions of the mount holder that form the linear adjustment mechanism can include a linear track or rail and one or more guided members that are guided through a linear motion by the track or rail, two matingly geared members (e.g., a rack and pinion gearset), or other mechanical parts (e.g., spring, actuators, etc.) that inter-engage to provide the relevant functionality described herein. And in other embodiments, the light-to-tool mount does not include the adjustment mechanism (i.e., the light-to-tool mount fixes the light module unmovably in place to the handheld tool) and instead it is adapted to removably attach different light modules (or at least different optical devices) to it so that different light modules (or at least different optical devices) can be interchanged attached and used for different applications for produce different light patterns.

In use, releasing the fastener 1191 (e.g., unscrewing the set screw) allows the first and second holder portions 1189 and 1190 to linearly move relative to each other so that the light module 1163 can be moved to a desired/correct position at a desired/correct light-projecting distance from the installation surface, then the fastener 1191 can be tightened to secure the first and second holder portions 1189 and 1190 together for use of the light-projecting system 1150. The linear adjustment mechanism typically provides for multiple positions of the light module 1163, for example four positions at 5 mm linearly apart in the range between 0 mm and 15 mm, as depicted. This enables making positional adjustments to the light module to counter positional adjustments of the tool 110 (e.g., made by the distancer footplate 1172) to obtain the same light pattern (as described above with respect to FIGS. 8-9), as well as making small incremental positional adjustments to fine tune the light patterns as may be needed at very close range.

In addition, the mount attachment 1186 secures the mount holder 1185, and thus the light module 1163 attached to the mount holder 1185, in place on the handheld tool 1110. Also, the mount attachment 1186 orients the mount holder 1185, and thus the light module 1163, so that the light axis of the light module 1163 is parallel to the tool operational axis (e.g., the welding axis) and perpendicular to the installation surface 2, as shown for example in FIGS. 27 and 29.

For example, the mount attachment 1186 can include a surface 1192 that is configured (e.g., sized and shaped) to conform to a mating surface 1112 of the tool and that is at a predefined angle with respect to the light axis of the light module 1163 held by the mount holder 1185. In this way, when the light mount 1184 is positioned on the tool 1110, the conforming mating surfaces 1192 and 1112 contact each other to automatically orient the light module 1163 so that the light axis is perpendicular to the installation surface 2.

In the depicted embodiment, the mating surface 1192 is formed by a rear side of a front panel 1193 of the mount attachment 1186 that abuts a mating surface 1112 formed by the front panel of the weld gun 1110. The front panel surface 1112 of the depicted weld gun 1110 is planar and perpendicular to the weld/tool operating axis, and the mating panel surface 1192 of the mount attachment 1186 is planar and at a predefined perpendicular angle to the light axis of the light module 1163. Thus, the mating panel surface 1192 of the mount attachment 1186 is parallel to the installation surface 2. In this way, the mount attachment 1186 extends from the mount holder 1185, with the mating panel surface 1192 of the mount attachment 1186 being perpendicular to a longitudinal axis defined by the mount holder 1185.

To provide the dual securing and orienting functionality, the mount attachment 1186 includes an opening 1198 in its front panel 1193 that receives the receiver 1114 (that defines the welding/operating axis) of the weld gun 1110. The power cable of the weld gun 1110 can be removed from the receiver 1114 to install the front panel 1193 of the mount attachment 1186 over it, with the receiver 1114 extending through the opening 1198 of the front panel 1193, and then the power cable can be reattached. Also, fasteners (e.g., screws or bolts) can be installed through aligned holes in the front panels 1193 and 1112 of the attachment 1186 and the weld gun 1110 to secure the light mount 1184 to the gun 1110. In other embodiments, the securing and orienting functionality can be provided by the one or more mount supports (e.g., clips, legs, or other elements) 1186 of the mount holder 1185.

Figure 34:
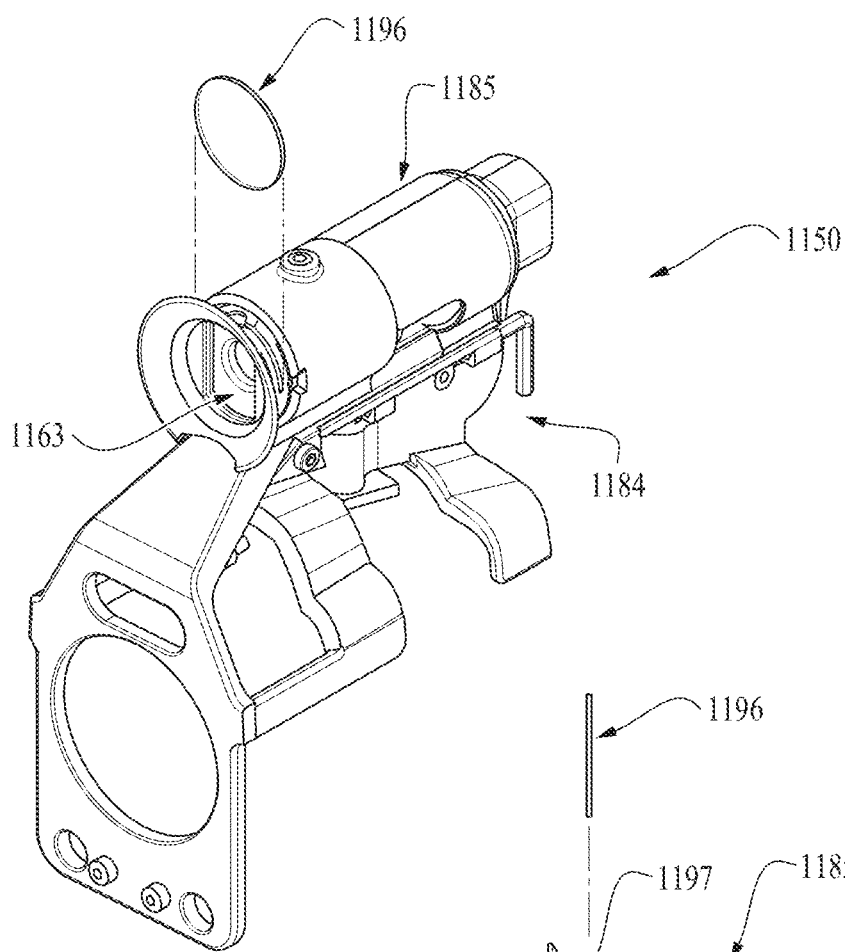
FIGS. 34-35 are perspective and side views, respectively, of the light-projecting system of FIG. 27, showing a thermal shield for protecting the light module during use.
Figure 35:
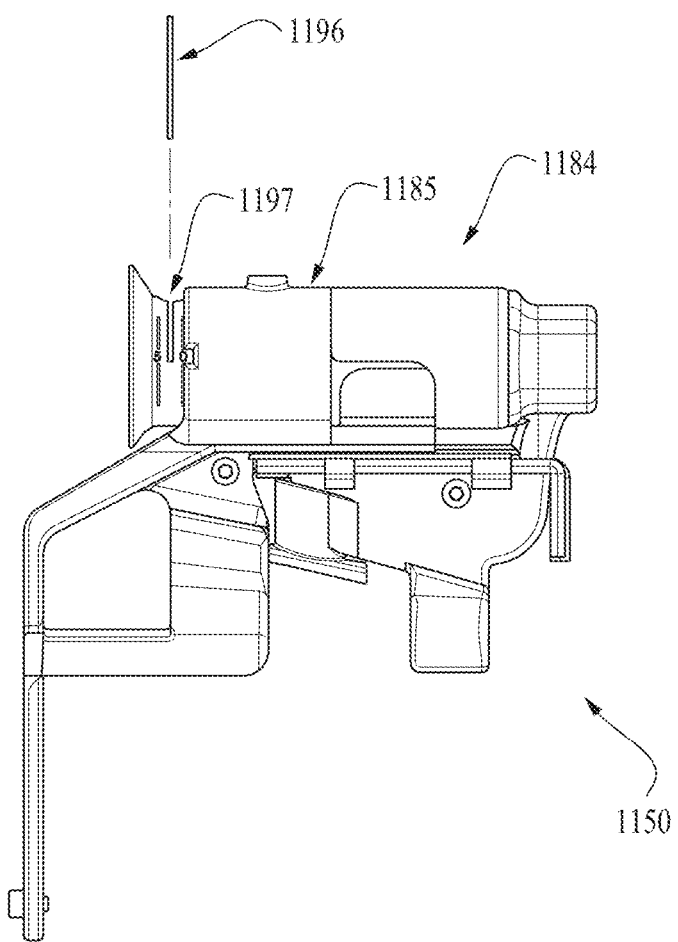
Figure 36:
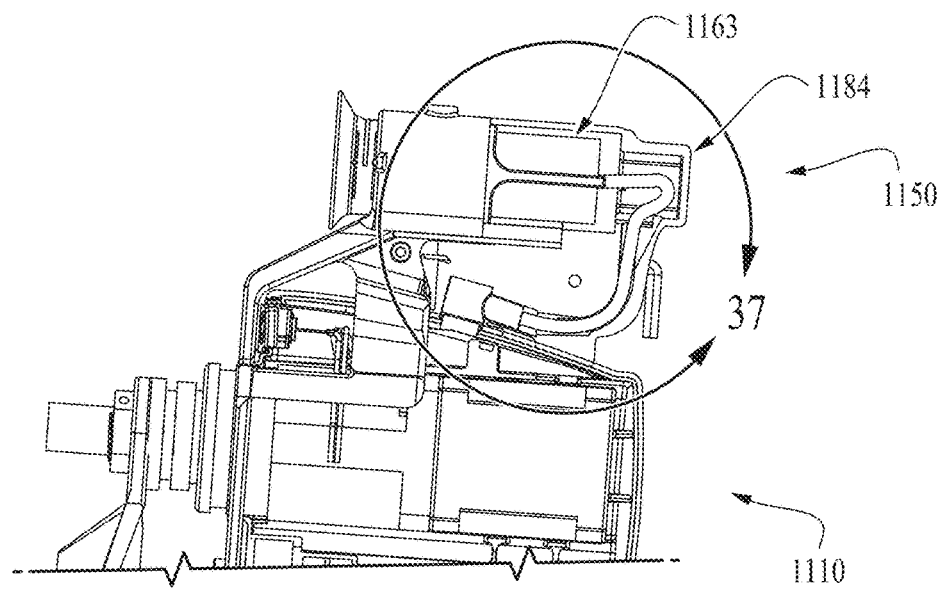
FIGS. 36-37 are a side view of the light-projecting system of FIG. 27, and a detail thereof, showing the light module electrically connected to the handheld tool.
Figure 37:
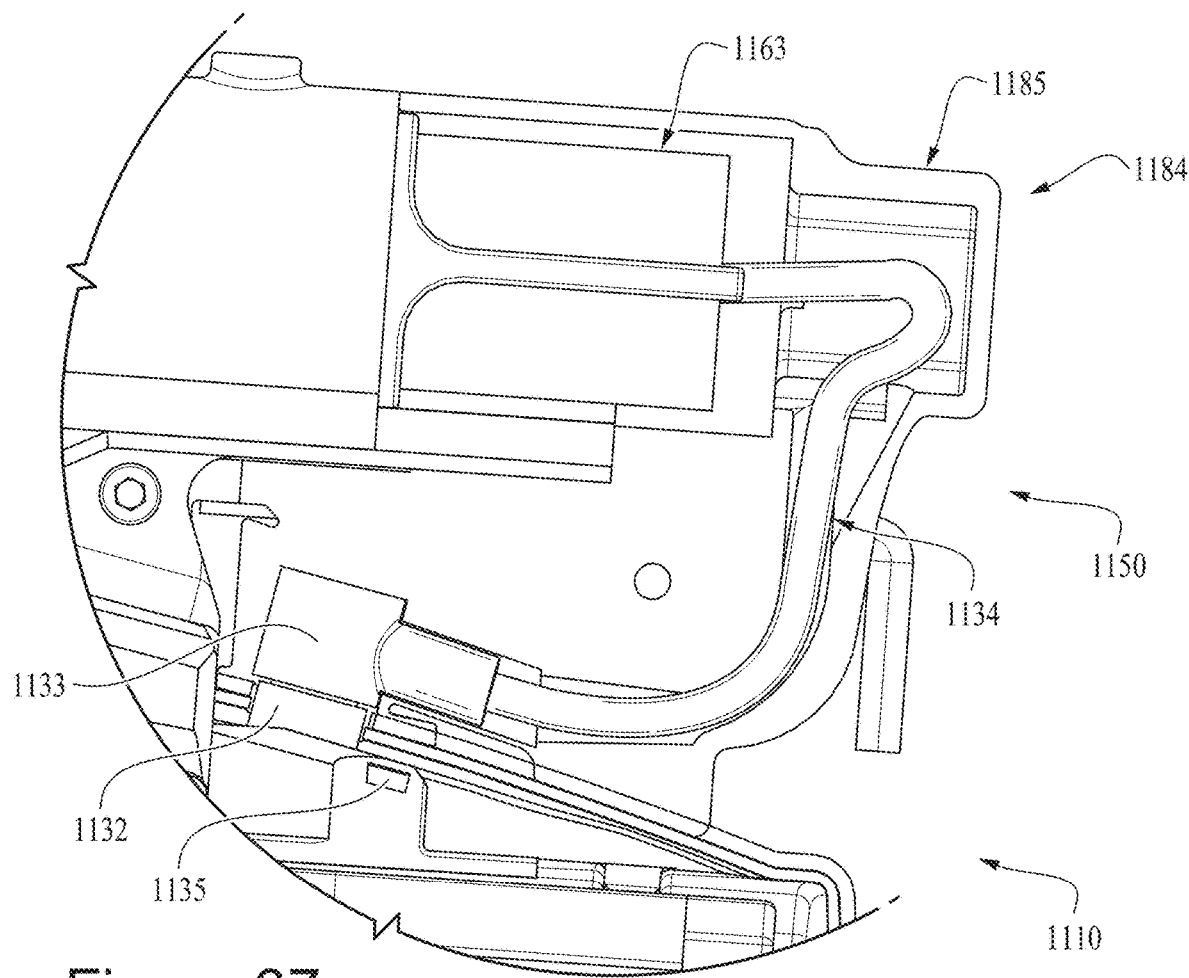
Figure 38:
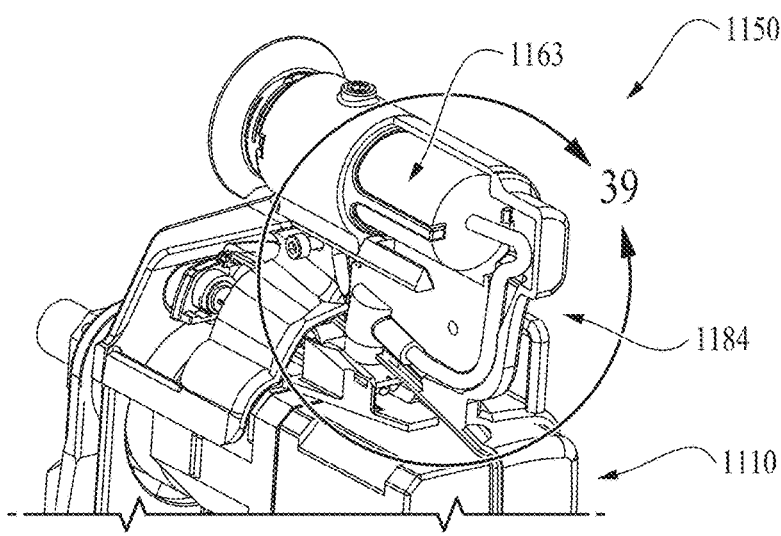
FIGS. 38-39 are perspective views of the light-projecting system of FIGS. 36-37.
Figure 39:
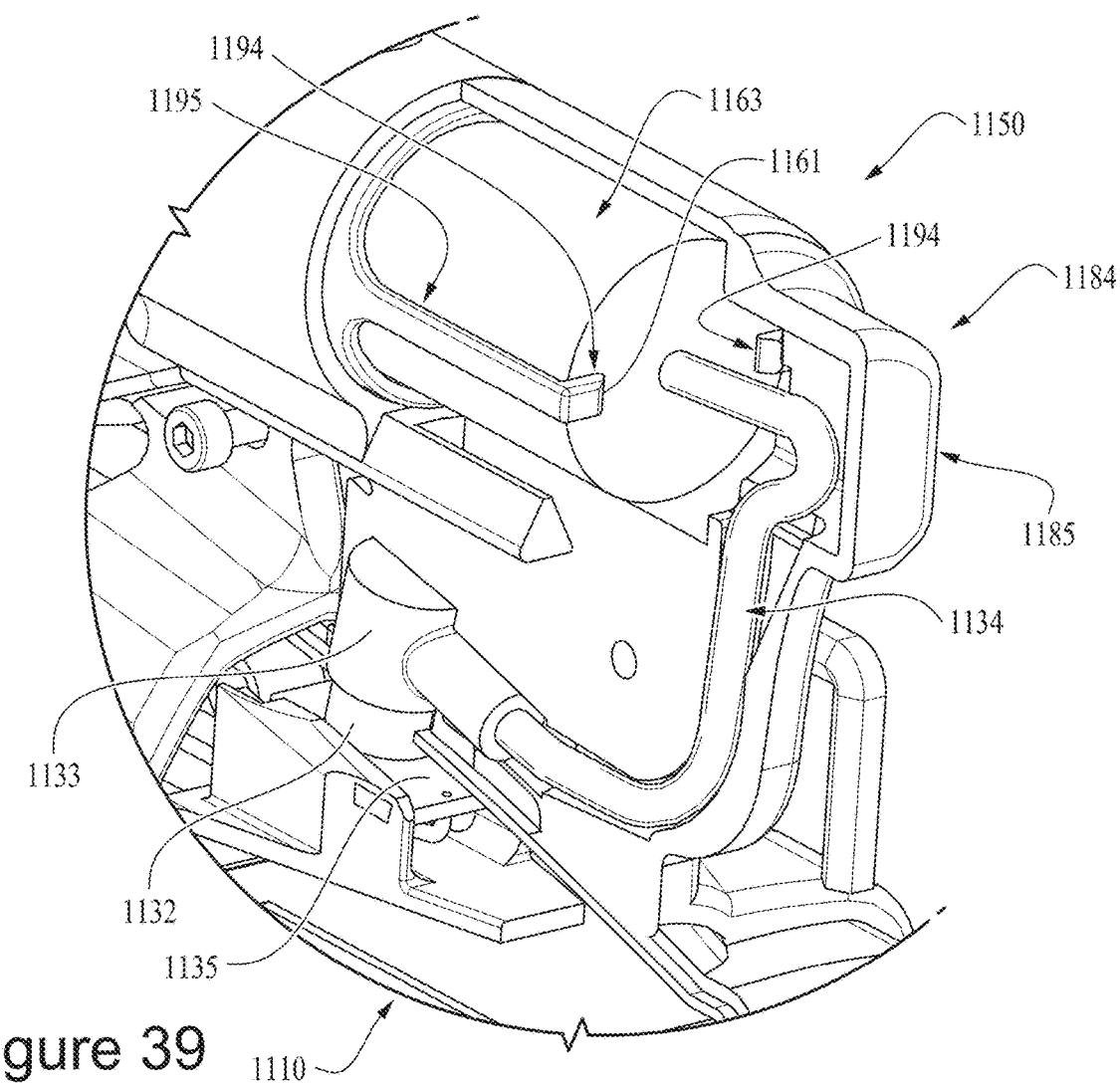

Referring particularly to FIGS. 34-35, the light-projecting system 1150 can further include a replaceable thermal shield 1196 that protects the light module 1163 (e.g., the laser and the DOE) from weld slag during the welding process. The weld slag is extremely hot and caustic and would damage the light module 1163 during use. But when using the thermal shield 1196, sensitive components of the system 1150 that are forward and exposed will not get damaged by the weld slag, which is blocked by the thermal shield 1196, and replacing the thermal shield 1196 is more cost-effective than replacing the light module 1163 (at least the optical device or the light source). The thermal shield 1196 can be provided by a protective high-temperature glass element, for example a disk of soda lime float glass.

The thermal shield 1196 can be received through an open-topped vertical slot 1197 in the mount holder 1185 and positioned in front of the light module 1163, so that the thermal shield 1196 can be removed after being damaged during use and then replaced for further use of the system 1150. More particularly, the mount holder 1185 includes a peripheral wall (around the light module 1163) and an annular front panel with a central opening through which the light axis passes, with a compartment formed by the peripheral wall, the front panel, and the light module 1163, with the slot 1197 formed in the peripheral wall, and with the thermal shield 1196 held in the compartment and removable/replaceable through the slot 1197.

Referring particularly to FIGS. 26 and 36-43, the light-projecting system 1150 can be operably connected to the handheld tool 1110 so that the system 1150 and tool 1110 operate together. For example, the light-projecting system 1150 can be electrically connected to the power source of the tool 1110, and have only on/off control functionality, so that a separate power source and control unit (including an on/off button or other control) are not needed or included. In this way, turning on the handheld tool 1110 also turns on the light-projecting system 1150 so the two are ready for use together.

In some embodiments, the handheld tool 110 can be provided with a power connection to which the light-projecting system 1150 can be electrically connected. The power connection can be included in the original manufacture of new tools 1110 or it can be retrofit onto existing tools 1110.

Referring particularly to FIGS. 26 and 40-41, in the depicted embodiment the power connection is added to the weld gun 1110 by tapping into the electrical cable 1116 from the weld gun power source (e.g., 24 vDC battery) to the weld gun control lights (e.g., LEDs) 1118 of an existing weld gun 1110. The new power connection includes a first connector 1132 electrically connected to the weld-gun control lights 1118 (directly or indirectly via their power cable 1116) by a first electrical cable 1131. In other embodiments, the first connector is electrically connected directly to the battery of the weld gun 1110 or indirectly to another electrically powered component of the weld gun 1110.

In addition, the light-projecting system 1150 includes a second connector 1133 electrically connected to the light module 1163 by a second electrical cable 1134. The first and second electrical connectors 1132 and 1133 removably connect together and can be of a conventional type. In this way, the light module 1163 can be electrically connected to the power source of the weld gun 1110 so that powering on the gun also powers on the light module 1163.

In some embodiments such as that depicted, the light module 1163 is powered by a different voltage than the tool 1110, and a transformer 1135 is included. For example, for a tool 1110 that operates at 24 vDC and a light module 1163 that operates at 9 vDC, a transformer 1135 is provided to step down the voltage accordingly. The transformer 1135 can be of a conventional type, for example a PCB step-down converter circuit. The transformer 1135 can be installed on the weld gun 1110 (electrically connected between the gun battery and the first connector 1132), as depicted, or on the light mount 1184 (electrically connected between the light module 1163 and the second connector 1133).

Figure 42:
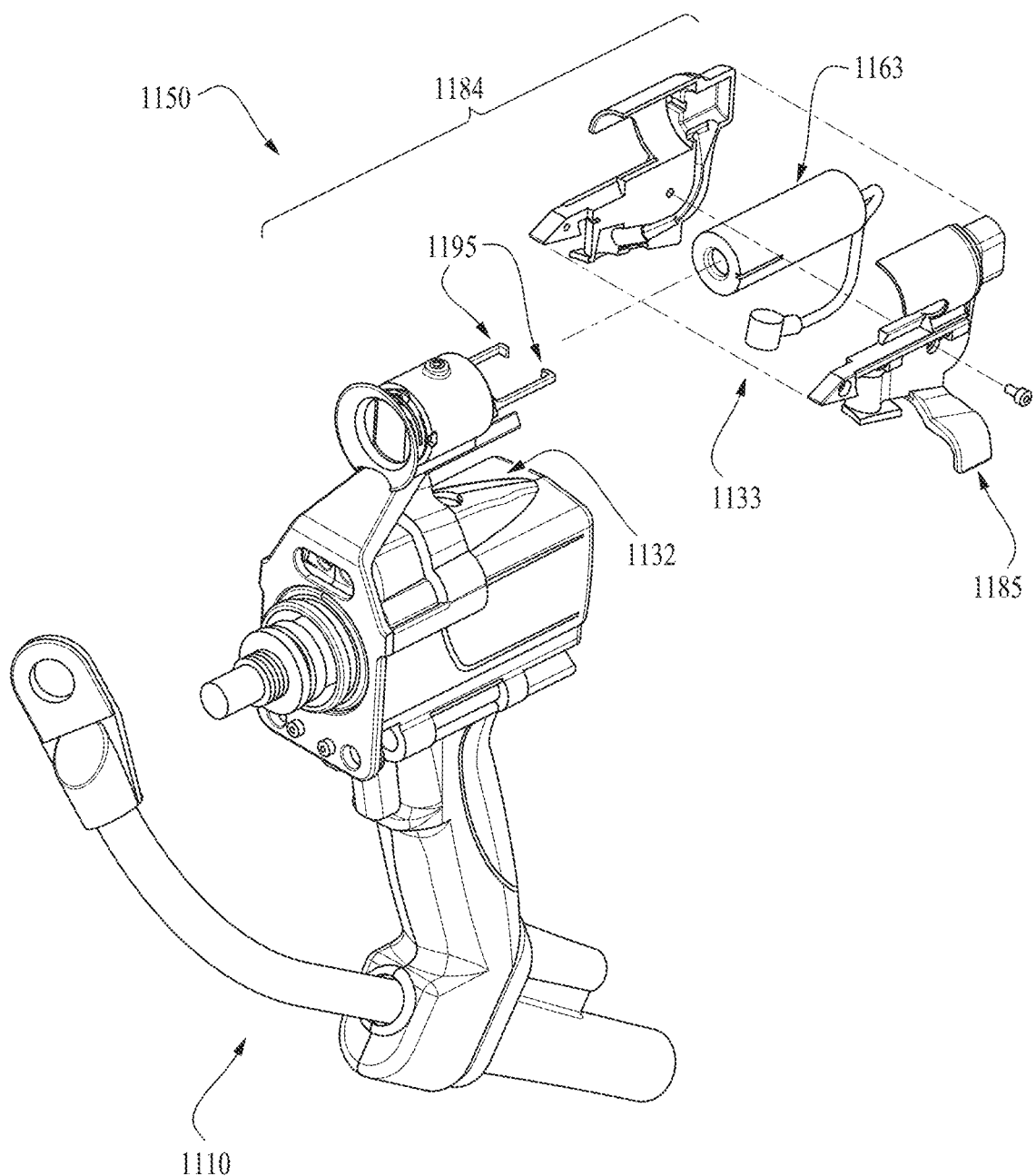
FIGS. 42-43 are perspective views of the light-projecting system and the handheld tool of FIG. 27 being installed and electrically connected together.
Figure 43:
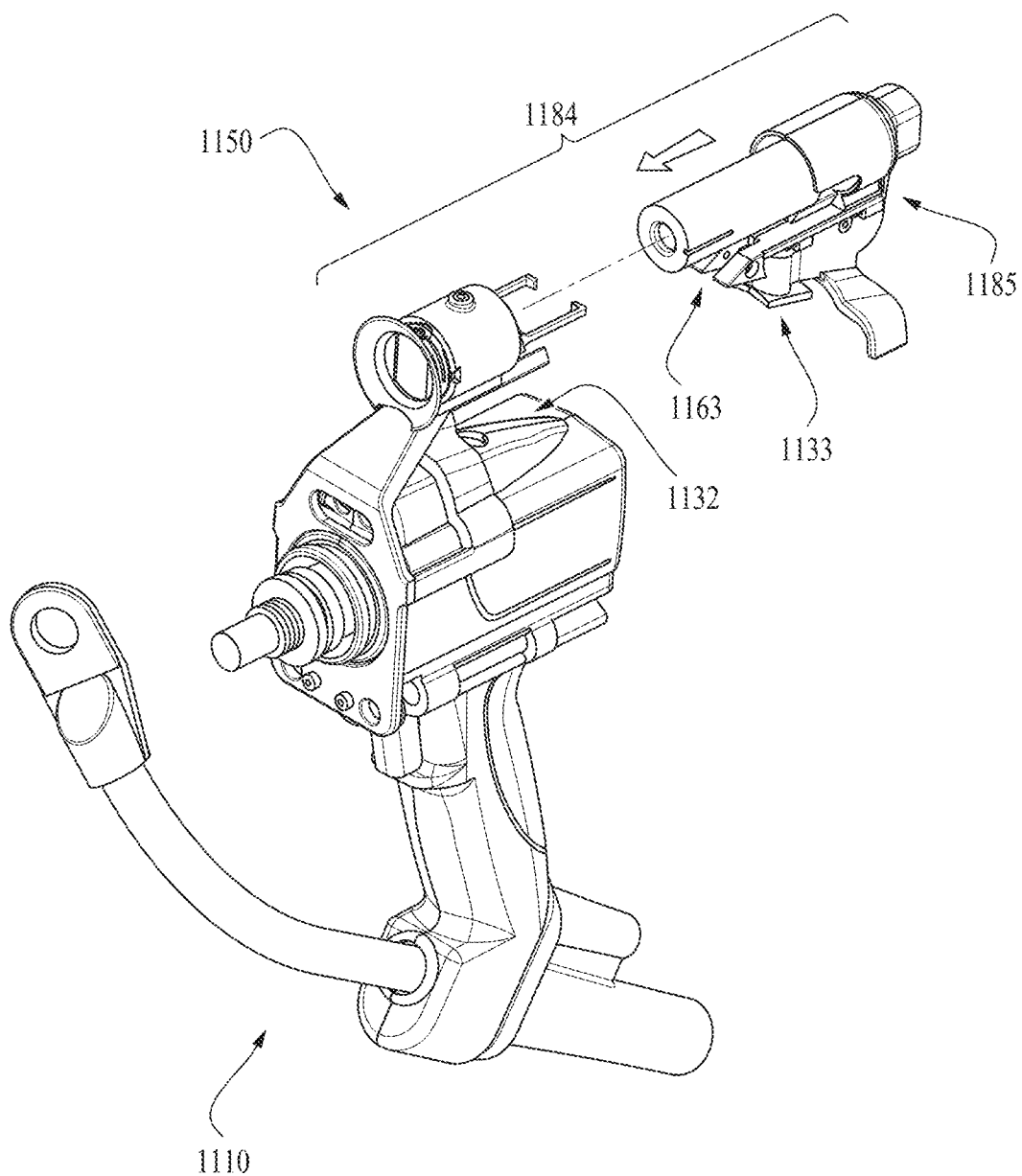

Referring additionally to FIGS. 42-43, the light-projecting system 1150 and the weld gun 1110 can electrically connect together automatically when the light-projecting system 1150 is installed onto the weld gun 1110 by moving the portion of the light-to-gun mount 1184 holding the light module 1163 from an unmounted position (FIG. 43) to a mounted position (FIGS. 37 and 39) on the weld gun 1110. The first and second connectors 1132 and 1133 are both positioned on a rearward-to-forward axis so that they align and mate as the light-projecting system 1150 is moved into the mounted position on the weld gun 1110. Also, the light-to-tool mount 1184 can include the extension arms 1194 and tabs 1195 that engage the light module 1163 to facilitate the linearly adjustment described herein, with the extension arms 1194 being resiliently deflectable so that they come into engagement with the light module 1163 when the portion of the light-to-tool mount 1184 holding the light module 1163 is moved into the mounted position on the weld gun 1110. The tabs 1195 of the extension arms 1194 can have angled leading surfaces so that the extension arms 1194 are deflected outward when forced into an interference contact with the light module 1163, and then when the interference is cleared the extension arms 1194 resiliently return inward when to retain the light module 1163 in place. When the light module 1163 is linearly adjusted forward and rearward by the adjustment mechanism, the first and second connectors 1132 and 1133 remain connected together, with the power cable 1134 long enough to provide the needed slack to enable the light module movement.

The first connector 1132 can be positioned on an upward facing external surface of the weld gun 1110, and the second connector 1133 can be positioned on a downward facing external surface of the light-to-tool mount 1184. Also, these external surfaces can be angled downward front-to-rear. In this way, when the light-to-tool mount 1184 is moved in a rearward-to-forward direction onto the weld gun 1110, the angled surfaces compress the connectors 1132 and 1133 together into mating electrical contact.

In addition, the first and second connectors 1132 and 1133 can be of a type that permits them to mate with electrical contact by being moved laterally together (instead of axially). For example, the first and second connectors 1132 and 1133 can be conventional magnetic connectors (magnetically held together in electrical contact). The contact surfaces of the connectors 1132 and 1133 can also be arranged at the same or a similar angle at the external surfaces they are mounted to. In this embodiment, the light module 163 can be directly mounted to the support/tool (as depicted) or it can be indirectly mounted to the support/tool (e.g., the light module can be incorporated into a multi-component a housing that is mounted to the tool).

FIGS. 44-52 show a system 250 for projecting light indicia 252 onto installation surfaces 2 to identify (define) installation locations 254 according to a third example embodiment. The light-projecting system 250 is used with a power tool such as a handheld stud-welding gun, but it is not mounted to the tool for portable use together. Instead, in this embodiment, the light-projecting system 250 includes a static-use light mount for mounting to a support that is a static structure. That is, in this embodiment, the static-use support is not intended to be transversely repositioned with and when transversely repositioning the light module 263 to install the anchors (or other construction mounts) 4 at all of the installation locations 254 in one projected pattern of light indicia. Instead, the static-use support remains in a static location while the tool is static-use repositioned to install the anchors at all of the installation locations of one pattern of projected light indicia.

Figure 46:
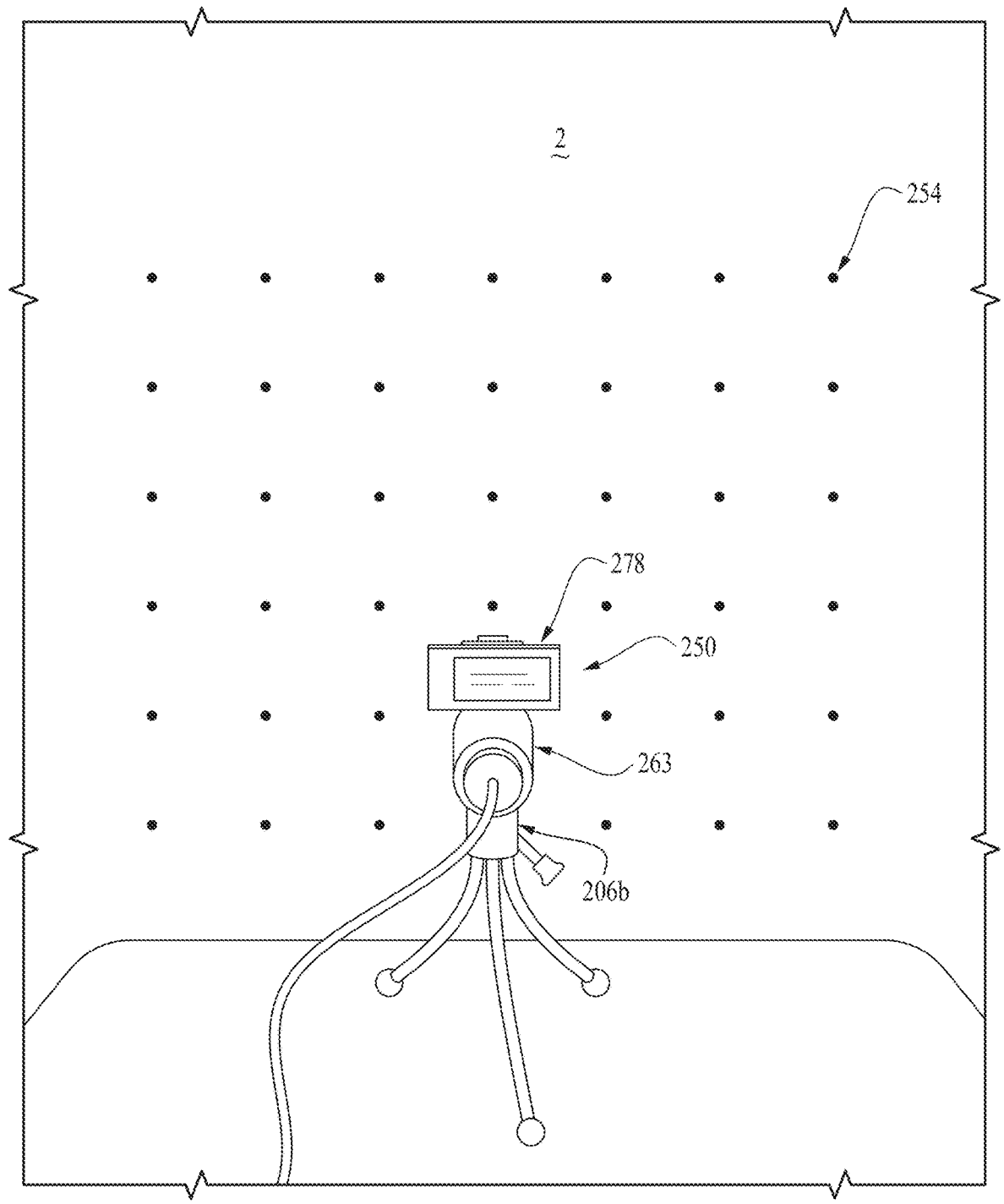
FIGS. 46-48 are perspectives view of the light-projecting system of FIG. 44 shown mounted to a mini-tripod and projecting light indicia onto an installation surface.
Figure 47:
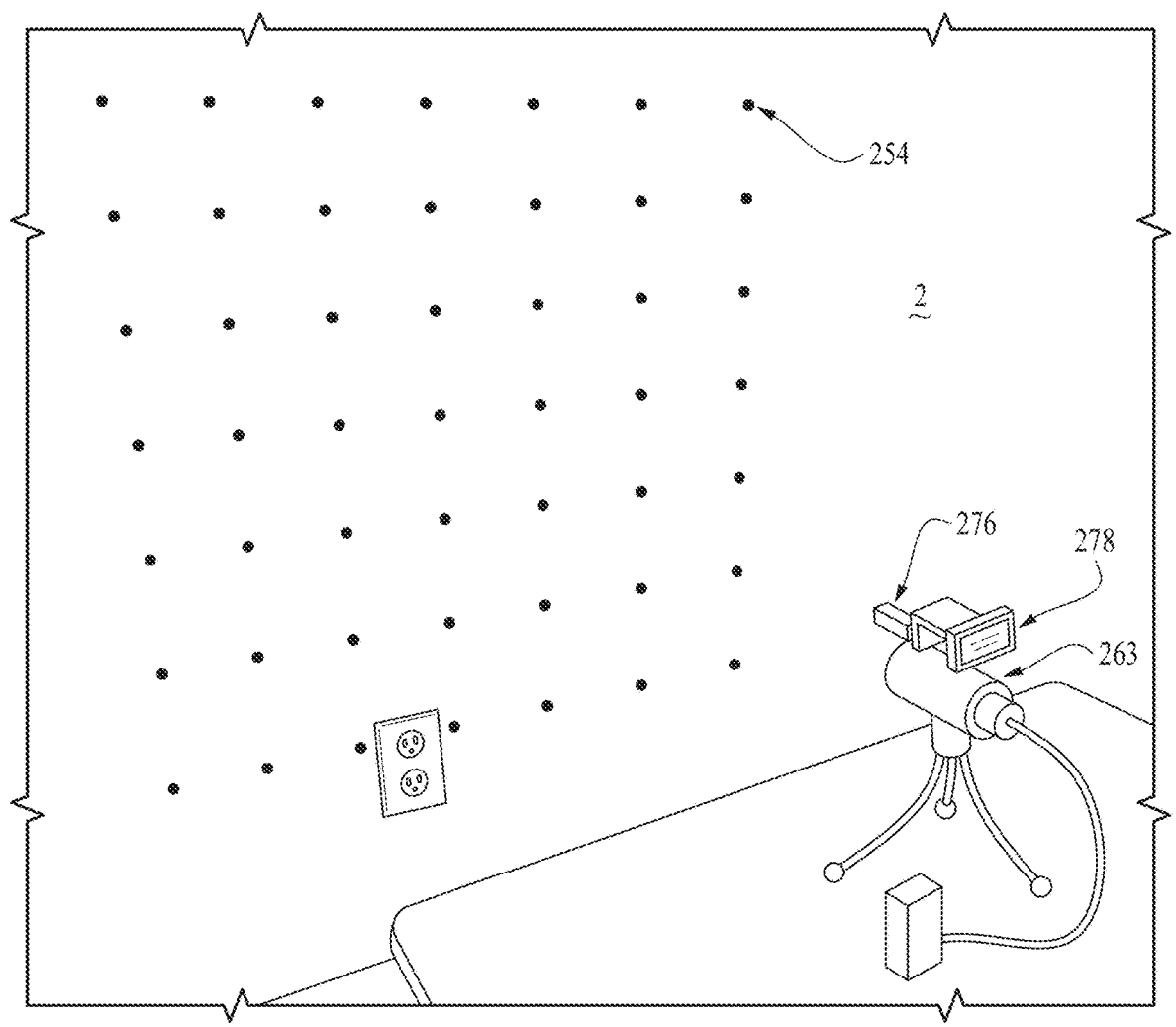
Figure 48:
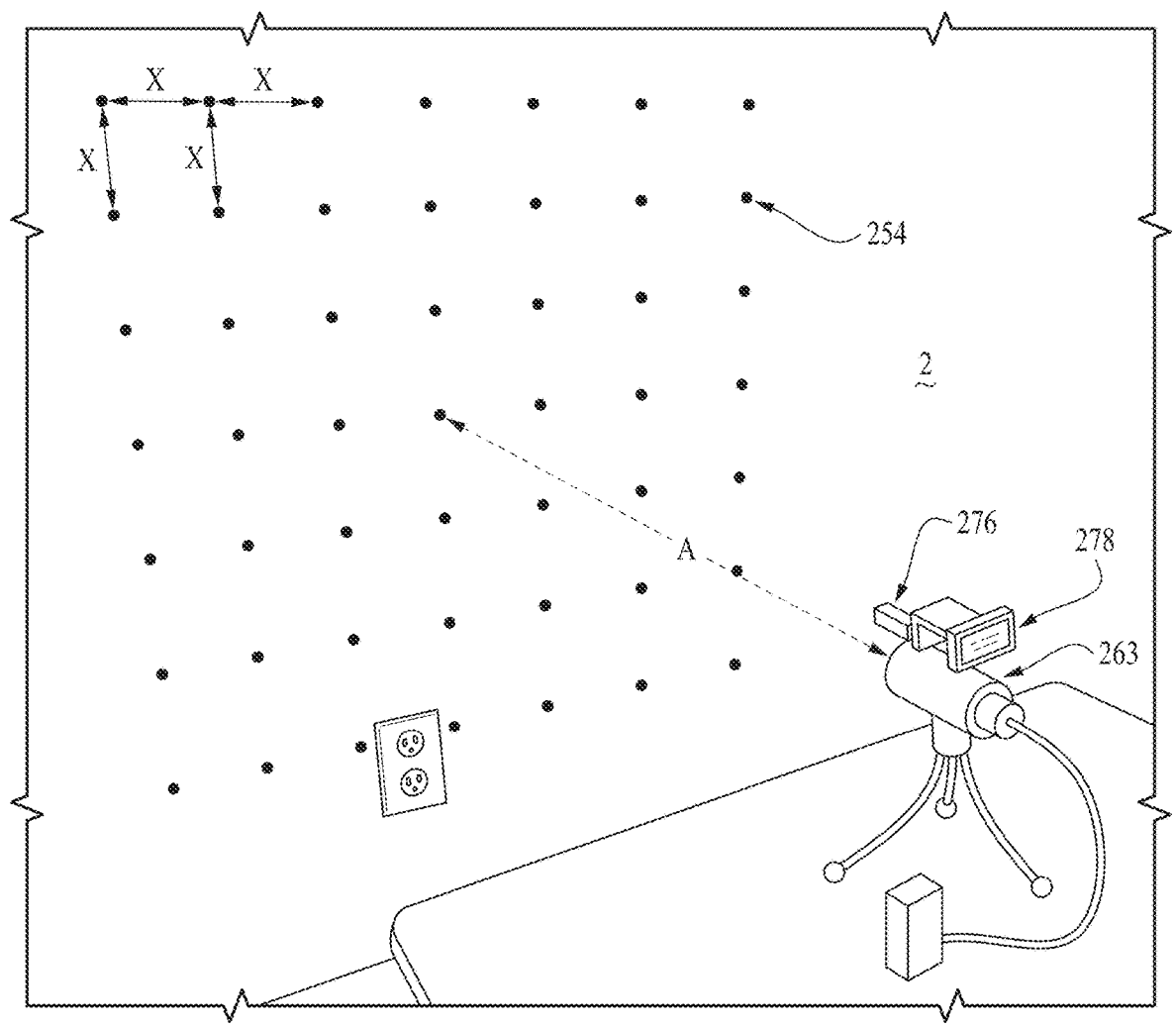
Figure 49:
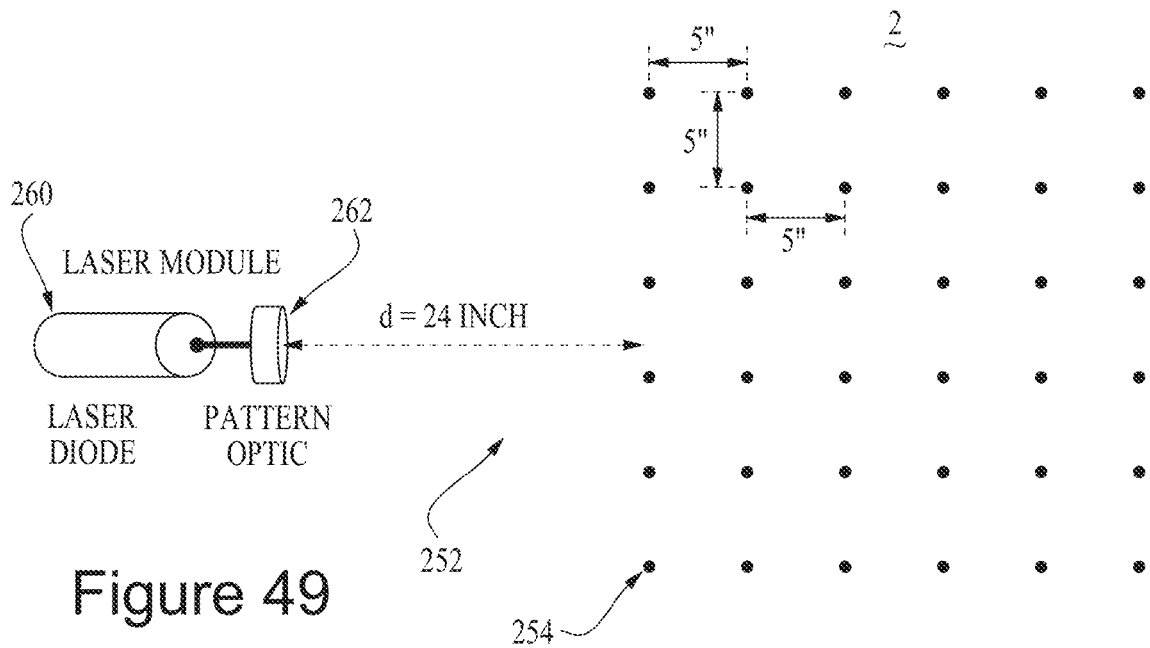
FIG. 49 is a functional schematic diagram of the light-projecting system of FIG. 44, showing a pattern of the light indicia.
Figure 50:
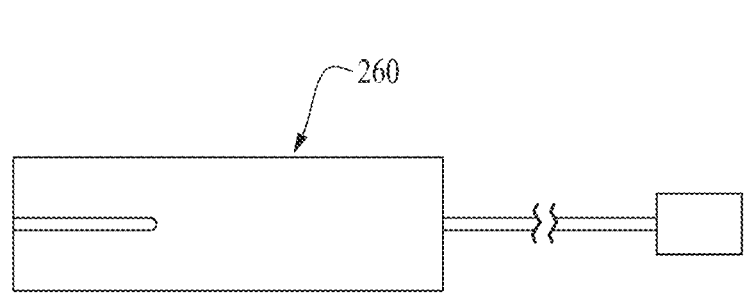
FIGS. 50-51 are side and end views, respectively, of a light module of the light-projecting system of FIG. 44.
Figure 51:
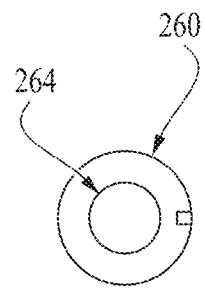
Figure 52:
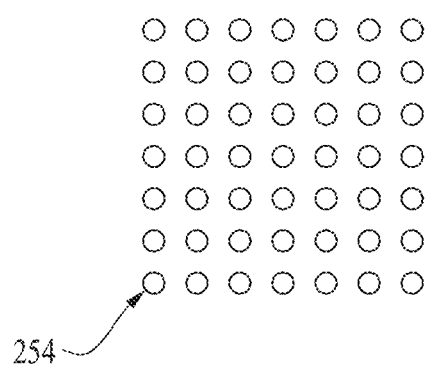
FIG. 52 shows an example pattern of light indicia formed by the light module of FIGS. 50-51.

For example, the static-use support can be scaffolding 206a (the system 250 can be repositioned on fixed scaffolding 206a to sequentially project the lighted indicia pattern on adjacent sections of the installation surface), or the static-use support can be a tripod 206b (the tripod 206b and system 250 can be static-use repositioned together to sequentially project the lighted indicia pattern on adjacent sections of the installation surface during the installation job (as such, the tripod is not necessary static throughout the entire installation job on all sections of the installation surface). (FIGS. 46-48 show the light-projecting system 250 mounted to a mini-tripod 206b as the static-use support for prototype demonstration purposes; in actual field use a larger tripod would typically be used.) In other embodiments, the static-use light mount is designed for mounting the light-projecting system 250 to other static supports such as piping or scaffolding (e.g., FIG. 45), including conventional scaffolding, suspended access systems, and other work platforms. The light module 263 can be indirectly mounted to the static-use support (e.g., the light module can be incorporated into a multi-component a housing that is mounted to the tool, as depicted) or it can be directly mounted to the support. The light-projecting system 250 of this embodiment is well suited for use in open (e.g., outside) or less-confined areas (e.g., furnaces, heaters, etc.) where there is more space. Thus, the light-projecting system 250 can be mounted father away from the installation surface 2 to project the lighted indicia over a larger area of the installation surface 2.

The light-projecting system 250 shown in the figures is a prototype embodiment disclosed to provide details of basic components and their arrangement, and it can include the same or similar components as in the light-projecting systems described elsewhere herein, except as expressly detailed herein. As such, details of the common components, features, and uses of the light-projecting systems 50, 150, 1150, and 1250 are not repeated for brevity. Conversely, for such common components, features, and uses, details disclosed for this embodiment also apply to the other disclosed embodiments.

In this embodiment, the optics 262 can be designed and/or selected to produce larger matrixes so that, although a worker installing the anchors 4 will typically block some of the light beams 252 from reaching the installation surface 2 at any given time, enough other/unblocked lighted beams 252 will still reach the installation surface 2 to perform the installation job. Also, because the light-projecting system 250 has to be transversely repositioned (shifted) when anchors have been installed at all of the lighted indicia projected onto the installation surface 2, and because repositioning of the system 250 can take some time, larger matrixes may be desirable. For example, for this embodiment, a 6×6 matrix of lighted indicia (see FIG. 49) or a 7×7 matrix of lighted indicia (see FIG. 52) can be used instead of a 3×3 matrix. The indicia spacings X can be for example 4 inches (101.6 mm), 5 inches (127 mm), or 6 inches (152.4 mm), with the working distance (i.e., projected-light distance A) being 24 inches (609.6 mm), 30 inches (762 mm), or 36 inches (914.4 mm), respectively, with a fan angle (i.e., offset angle) of 70.5 degrees for all these. The values are representative of layout patterns/grids used per industry code, but still offer flexibility to adjust the indicia spacing X as may be desired (e.g., 3-inch×3-inch, or 20-inch×20-inch).

The static-use light mount for mounting the light-projecting system 250 in a fixed position can be of a conventional type. For example, the static-use light mount can include a clamp, a magnet, or another conventional mounting element.

Figure 44:
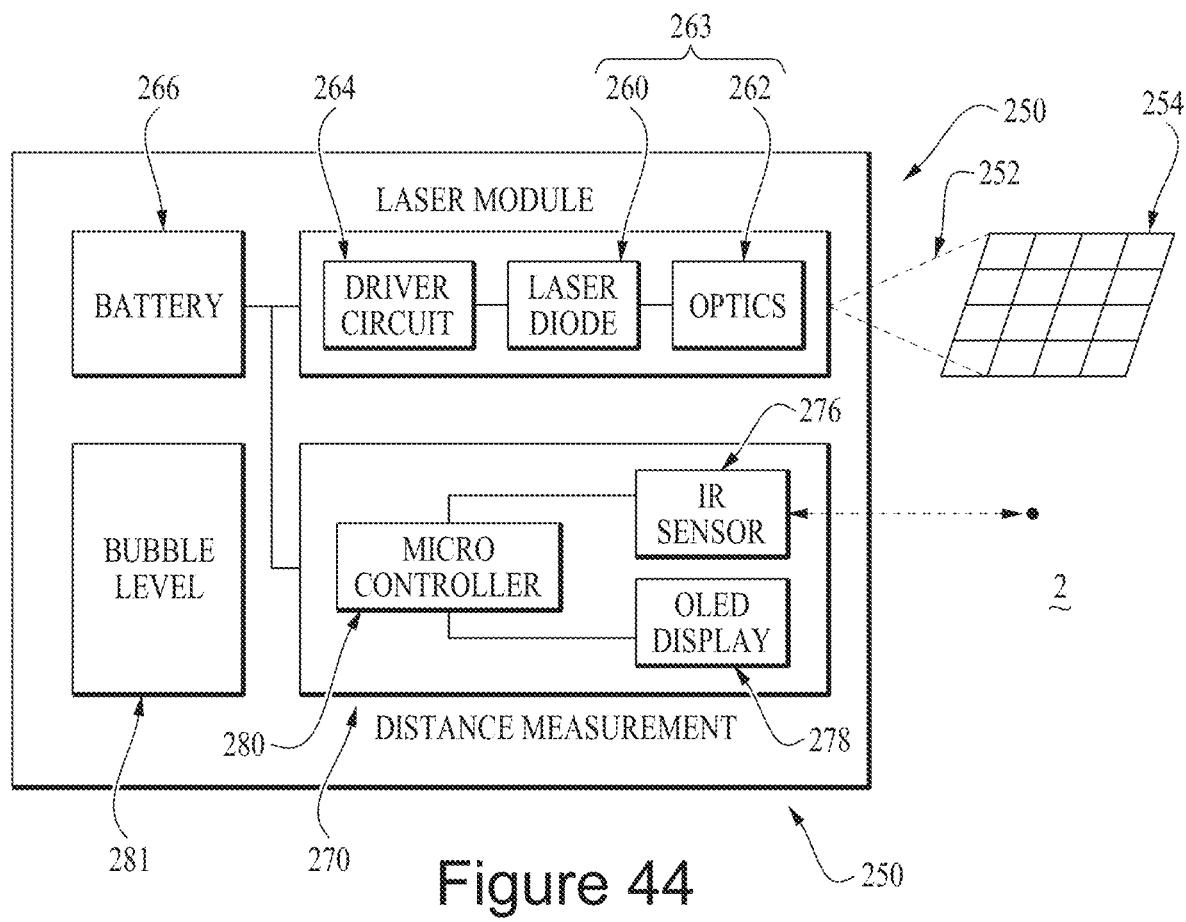
FIG. 44 is a schematic diagram of a system for projecting light indicia onto installation surfaces to identify installation locations according to a third example embodiment.
Figure 45:
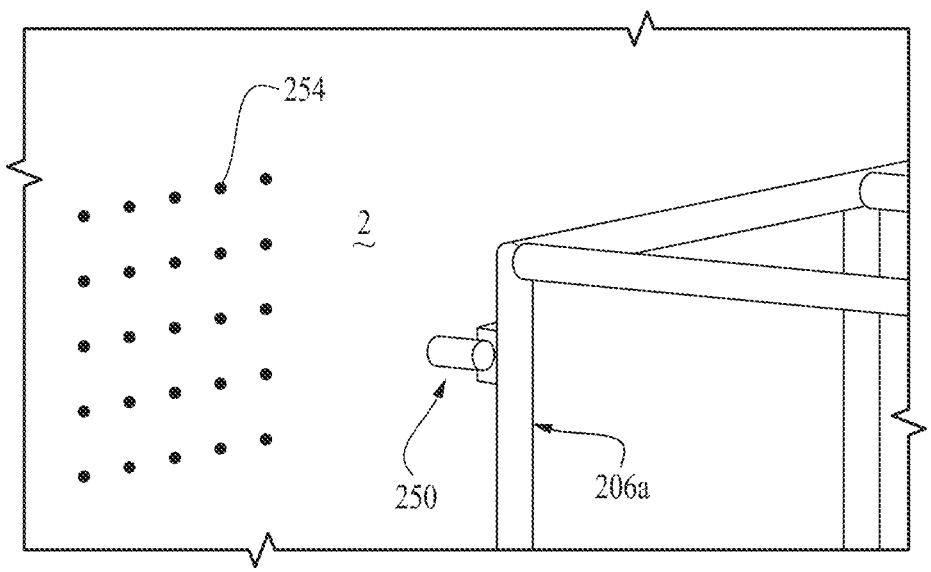
FIG. 45 is a perspective view of the light-projecting system of FIG. 44 shown mounted to a scaffolding and projecting the light indicia onto an installation surface.

Referring particularly to FIG. 44, the light-projecting system 250 includes a light source 260, optics 262 aligned with and downstream from the light source 260, and a control unit 264 for operating the light source 260. The system 250 also includes a battery or other power source 266, for example a rechargeable lithium-ion battery with a 14-hour operational capacity. In the depicted embodiment, the light source 260 is a laser diode, the optical element/device 262 includes a diffractive optical element, and the control unit 264 is a drive circuit, though these can be provided by other conventional components. The light source 260, the optics 262, and the control unit 264 can be of the same or a similar type as in the first embodiment, so details are not repeated for brevity. Also similarly, the light source 260 and the optics 262 can be provided as a single unit and thus are sometimes referred to collectively as the light module 263.

In this embodiment, the light-projecting system 250 further includes a distancer (distancing device) 270. In the depicted embodiment, the distancer 270 includes an IR sensor 276, a display (e.g., OLED) 278, and a micro-controller 280 that operably controls the IR sensor 276 and the display 278. The IR sensor 276, the display 278, and the micro-controller 280 can be of a conventional type and can be selected and configured to provide basic functionally for example on/off, determining the distance to the installation surface, displaying the determined distance, battery management, safety, and/or other functionality. In other embodiments, the distancer 270 can be a conventional LIDAR range sensor or another conventional range sensing device selected to provide the functionality described herein.

In typical embodiments, the light-projecting system 250 also includes a level 281. The level 281 can be of a conventional type, for example a bubble level, that can be used to determine that the light module 263 is level (i.e., with the light axis perpendicular to the installation surface 2) so that the projected light pattern is not distorted.

In the depicted embodiment, the light-projecting system 250 is placed in an initial location and the micro-controller 280 operated to use the IR sensor 276 to determine the initial/actual projected-light distance from the installation surface 2 and to output this distance to the display 278. A user then reads the displayed distance and manually repositions the system 250, adjustably linearly repositioning the light module 263 farther away from or closer to the installation surface 2, while the IR sensor 276 and drive circuit 280 continue to operate to update the displayed distance, until the displayed projected-light distance correctly matches the working distance (desired/correct projected-light distance A) needed for the desired indicia spacing X of the light indicia 254. As such, the system 250 can have a static-use design so that the light module 263 is not adjustably repositionable together with the tool used to install the construction mounts (e.g., refractory anchors) at the installation locations.

In other embodiments, the distancer 270 is operable to determine the working distance (projected-light distance A) from the installation surface 2 and input this data to the control unit 264. The control unit 264 can be programmed to receive the input from the distancer 270 and, based on the distance sensed, automatically control (linearly adjust the position of) the light module 260/262 to adjust the projected-light distance A (e.g., by an actuator that linearly and/or angularly repositions the light module on the static-use mount) and thus the axial offset or fan angle so that the desired/correct indicia spacing X is produced.

The optics 264 can include multiple optical elements for producing multiple different lighted indicia patterns, for example one optical element that produces a 6×6 square matrix pattern with one indicia spacing X, and another optical element that produces a 7×7 rectangular matrix with another indicia spacing. In automated embodiments such as that described above, the control unit 264 can be operable to receive an input selection from a user, based on an indicia pattern (e.g., a grid) selected by the user for the job, and then position a corresponding one of the optical elements 262 in line with the laser 260 along the light axis to produce the desired indicia pattern.

In still further example embodiments, the light-projecting system 250 includes an auto-focus feature. In this feature, the lighted indicia come into sharp focus on the installation surface 2 when the light module 263 is at the correct projected-light distance A to provide the predefined/correct indicia spacings X between the installation locations 254.

Figure 53:
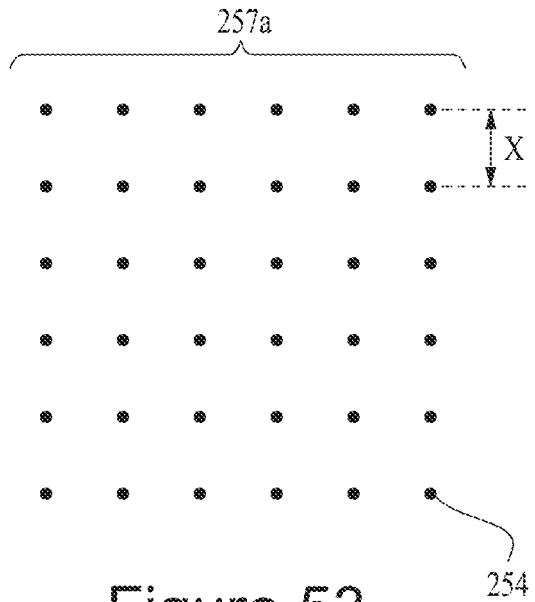
FIGS. 53-55 show a sequence of steps of an example method of projecting light indicia onto installation surfaces to identify installation locations for example using the light-projecting system of FIG. 44.
Figure 54:
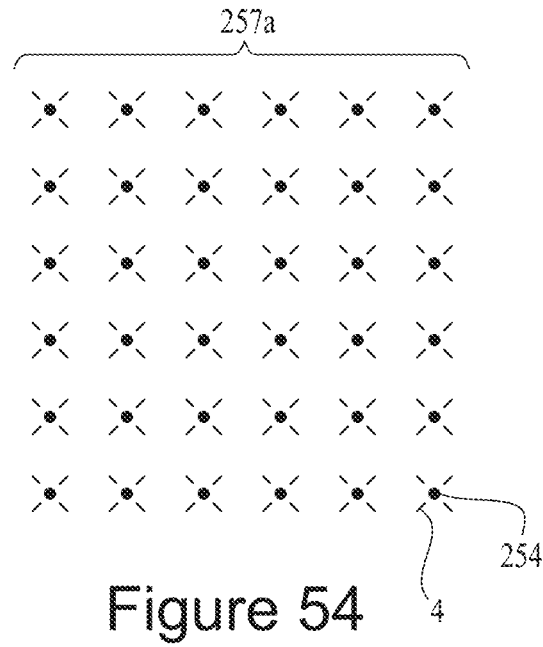
Figure 55:
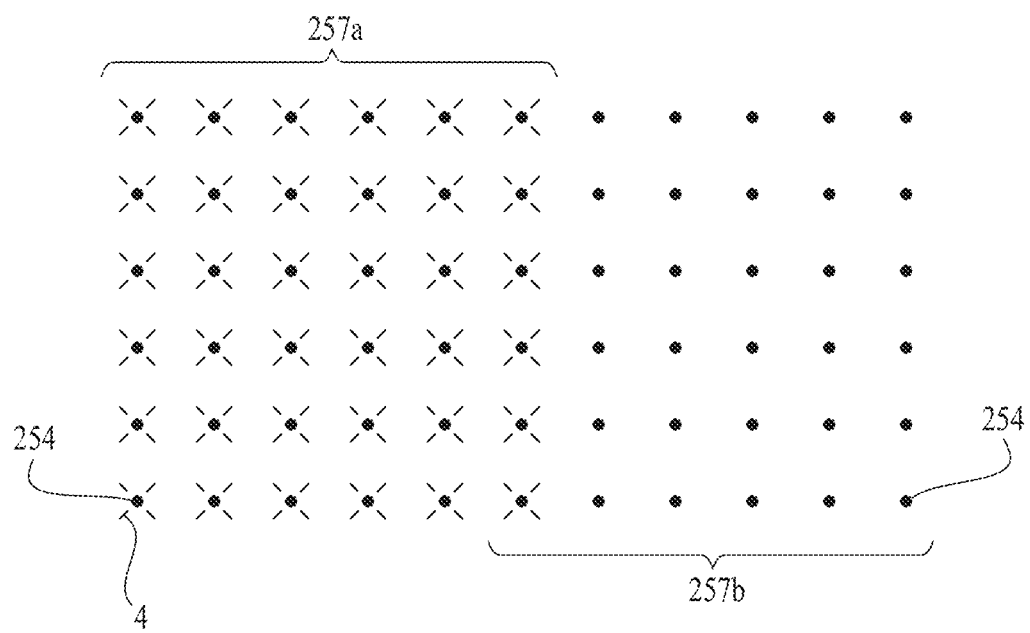

FIGS. 53-55 show an example method of installing the anchors 4 at the light indicia (depicted as dots) defining installation locations 254 using the light-projecting system 250 and a tool such as a handheld weld gun. In use, the light-projecting system 250 is mounted on a static-use support in a first fixed location/position with the light module 263 pointing at the installation surface 2 and operated to project the lighted indicia identifying installation locations 254 of a first pattern (e.g., grid or array) 257a onto a first section of the installation surface 2, as shown in FIG. 53.

The indicia spacing X can be adjusted by linearly repositioning the light module to adjust the projected-light distance A of the light module to obtain the desired indicia spacing X for the particular application. This linear repositioning can be done manually, for example by unmounting, moving, and remounting the light module on the static-use support (e.g., for scaffolding static-use support) or by repositioning the static-use support and the light module together (e.g., for a tripod static-use support). Also, this linear repositioning can be done using a linear adjustment mechanism (e.g., as described herein) to reposition the light module on the static-use support without removing it to do so. In addition, the actual projected-light distance A can be identified (i.e., measured) in order to assist in the linear repositioning so that the light module can be properly repositioned to obtain the desired projected-light distance A. This measurement can be done for example manually using a tape measure or using a distancing device such as an IR sensor.

A worker operating a tool such as a handheld weld gun then installs anchors 4 (or other construction mounts) at the installation locations 254 projected on this first section of the surface 2. When using larger lighted patterns (e.g., an 8×8 grid), multiple (e.g., 2-4) workers can install the anchors for the projected light pattern at the same time, instead of a single worker installing them all. This process is continued until anchors 4 have been installed at all of the installation locations 254 of the first pattern 257a, as shown in FIG. 54.

Then the light-projecting system 250 is transversely shifted/repositioned (moved on the support without moving the support or moved together with the support) to a second location/position to project the lighted indicia identifying installation locations 254 of a second pattern (e.g., grid or array) 257b onto a second section of the installation surface 2, with the second pattern 257b overlapping the first pattern 257a. That is, one or more lighted indicia in the second pattern 257b are projected at (coinciding with or co-located with) one or more of the installed anchors in the first pattern 257a as reference points. For example, one row or one column of lighted indicia can overlap with one row or column of installed anchors, with the other rows or columns of light indicia then identifying new target installation locations 254 for the worker/s to proceed to install additional anchors. In FIG. 55, one column of installed anchors 4 from the first pattern 257a and one column of the lighted indicia dots of the second pattern 257b are coinciding/co-located. In this way, the method includes co-locating at least one reference light indicia with at least one existing anchor in order to project one or more target installation locations with the same indicia spacing X maintained throughout the installation job. This process can be repeated until anchors 4 have been installed on the entire installation surface 2.

In another example method of use, multiple of the light-projecting systems 250 can be positioned and mounted in place with overlapping/co-located lighted indicia. For example, each end row or column of each pattern projected by one system 250 can be co-located with an opposite end row or column of the pattern projected by an adjacent-positioned system 250. With this method, many workers can be deployed to install anchors 4 on a very large surface 2 at the same time. In this way, the method includes co-locating at least one reference light indicia with at least one existing anchor in order to project one or more target installation locations with the same indicia spacing X maintained throughout the installation job.

FIGS. 56-70 show a system 1250 for projecting light indicia onto installation surfaces 2 to identify (define) installation locations 1254 according to a fourth example embodiment. The light-projecting system 1250 is used with a power tool (typically handheld) such as a stud-welding gun, but it is not mounted to the tool for portable use together. Instead, in this embodiment, the light-projecting system 1250 includes a static-use mount for mounting to a static-use support (e.g., structure/fixture), so that the light-projecting system 1250 can be repositioned as needed during the installation job (e.g., by repositioning it on the same or a different static-use support, or by repositioning the support and the system 1250). The light-projecting system 1250 of this embodiment is well suited for use in open (e.g., outside) or less-confined areas (e.g., furnaces, heaters, etc.) where there is more space. Thus, the light-projecting system 1250 can be mounted father away from the installation surface 2 to project the lighted indicia over a larger area of the installation surface 2.

The light-projecting system 1250 shown in the figures is a further-developed embodiment of the light-projecting system 250, and it can include the same or similar components as in the light-projecting systems described elsewhere herein, except as expressly detailed herein. As such, details of the common components, features, and uses of the light-projecting systems 150, 1150, and 250 are not repeated for brevity. Conversely, for such common components, features, and uses, details disclosed for this embodiment also apply to the other disclosed embodiments.

These static-mounted embodiments are typically (but not only) used for attachment (e.g., stud welding) installations where layouts are set to identify where a stud, fastener, anchor, and/or other construction mount is to be fixed/installed (e.g., stud welded). The light module 1263 of these embodiments can be engineered to project a light-indicia layout in a configuration/pattern of an array/grid of 49 indicia (e.g., dots) marking the location for the fixation of the construction mounts. The layouts can be precalculated and custom designed specifically for the application so that human interpretation is removed from the equation, thus resulting in increased reliability/accuracy and speed/productivity in the installation process and outcome. This is especially important when working in confined spaces where room and "real estate" is limited as an inhospitable and dark environment.

Figure 56:
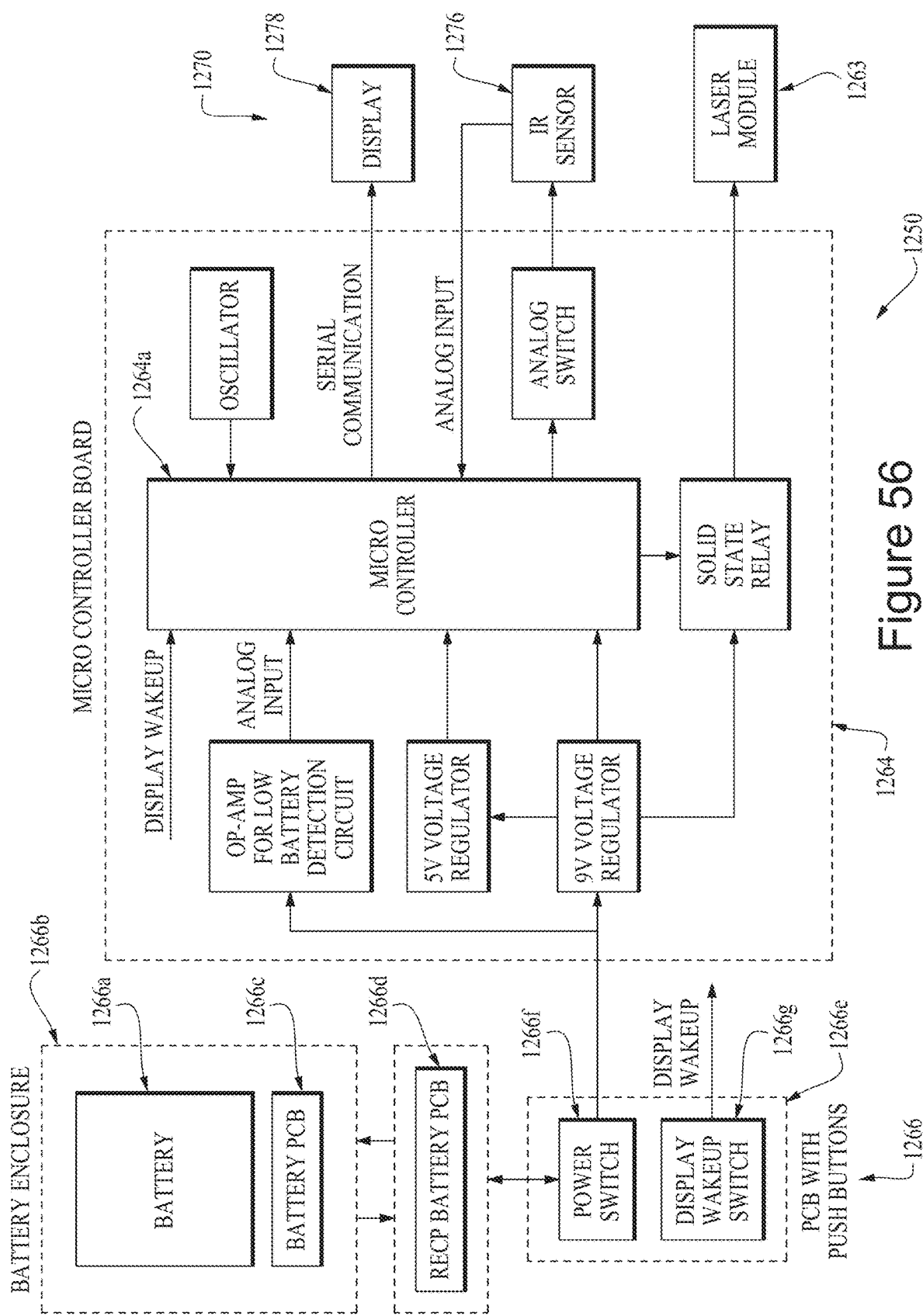
FIG. 56 is a schematic diagram of a system for projecting light indicia onto installation surfaces to identify installation locations according to a fourth example embodiment.
Figure 57:
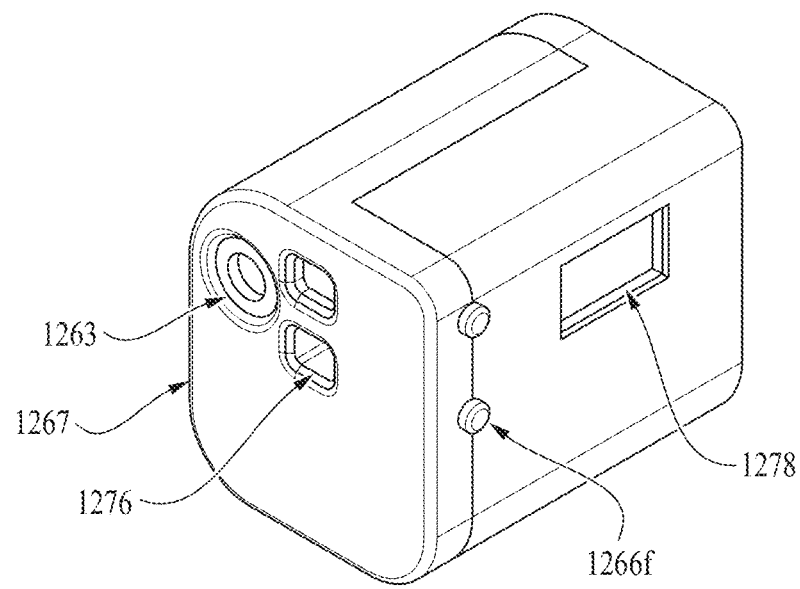
FIG. 57 is a perspective view of the light-projecting system of FIG. 56.
Figure 58:
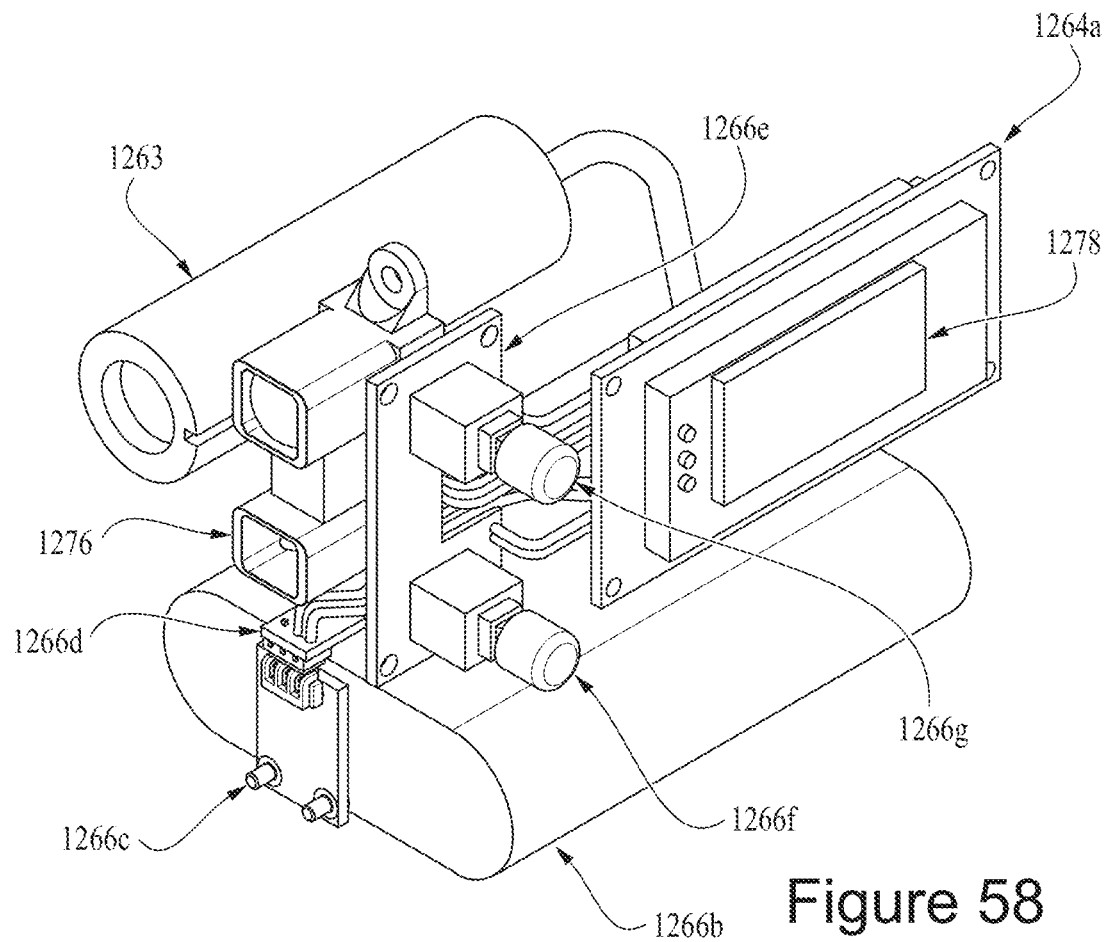
FIG. 58 shows the light-projecting system of FIG. 57 with its enclosure removed to reveal its internal components.

Referring particularly to FIG. 56, the light-projecting system 1250 includes a light module 1263, a control unit 1264 for operating the light module 1263, and power components 1266 for powering the light module 1263 and the control unit 1264. The light module 1263 projects a predetermined number of indicia (e.g., dots) at the installation surface 2 in a predetermined pattern, and typically includes a light source and optics, as detailed elsewhere herein.

Referring additionally to FIGS. 57-60, the power components 1266 can include a rechargeable battery 1266*a* in a removable case/enclosure 1266*b*, a battery PCB 1266*c* that's wired to the battery and removably connectable (for removing and recharging the battery) to a RECP PCB 1266*d*, and a switch PCB 1266*e* with pushbutton switches 1266*f* and 1266*g* for the light module and a display screen, as depicted. The battery can be three lithium-ion batteries (e.g., 11.1 v, 2200 mAh), as depicted. The batteries can be interconnected to provide a suitable service/operation time (e.g., 14 or 16 hours minimum) before needing to be recharged, thus handling a full 12-hour work shift. The batteries can be designed into a removable pack to keep the light-projecting system working without interruption.

The control unit 1264 can include a conventional microprocessor 1264*a* and additional conventional control components such as the depicted voltage regulators, op-amp, oscillator, relay, and switch. The control unit 1264 houses code to manage, control, and display critical information on the functionality of the light-projecting system functionality, e.g., battery power, distance, etc.

In this embodiment, the light-projecting system 1250 further includes a distancer (distancing device) 1270. In the depicted embodiment, the distancer 1270 includes a distance sensor 1276 and a display 1278 that are connected to and controlled by the control unit 1264. The distance sensor 1276 can be of a conventional type such as the depicted infrared (IR) sensor (e.g., Model No. GP2Y0A21YK0F, Sharp Corporation), and the display can be of a conventional type such as the depicted PCB with an LCD screen 1278. The distance sensor 1270 thereby "measures" (identifies) the actual projected-light distance A, and the display screen 1278 displays the measured actual projected light distance A from the laser module to the projected surface. The screen 1278 can also display the battery status. These components can be of a conventional type and can be selected and configured to provide basic functionally for example on/off, determining the distance to the installation surface, displaying the determined distance, battery management, safety, and/or other functionality.

In other embodiments, the distancer 1270 can be another distancing device that is operable/usable to measure linear distances to identify (e.g., set or measure) the projected-light distance A from the light module 1263 to the installation surface 1254 to make sure the light module is correctly positioned to produce the intended/correct dot spacing X. For example, in some embodiments the distancer 1270 is not included in the light assembly, and instead the distancer is a tape measure used to manually measure the distance from the installation surface 2 to determine where to position the light module 1263.

The distance sensor 1276 enables the light module 1263 to be positioned so it projects the light pattern at the correct distance (i.e., the projected-light distance A) from the installation surface 2 to result in the desired indicia spacing X. For example, for projecting a 4-inch×4-inch pattern, a 24-inch projected-light distance A can be used between the distance sensor 1276 and the installation surface 2. Similarly, a 30-inch distance can be used for a 5-inch×5-inch pattern, and a 36-inch distance for a 6-inch×6-inch pattern. For patterns of 8-inch×8-inch, 10-inch×10-inch, and 12-inch×12-inch, the same distances can be applied, but in use only every other projected dot/indicia considered as an installation location.

In other embodiments, other conventional components can be provided for the light module 1263 (e.g., laser diodes or other light sources, and diffractive optical elements or other optics), the control unit 264 (e.g., drive circuits), the power components 1266 (e.g., solid-state batteries), and/or the distancer components 1270 (e.g., LIDAR range sensors). As such, the light module 1263, the control unit 1264, and the power components 1266 can be of the same or a similar type as in the previously described embodiments, so details are not repeated for brevity.

All of these components, including the light module 1263, the control unit 1264, the power components 1266, and the distancer components 1270, can be housed in an enclosure 1267 to form a light-projecting device. That is, the light-projecting device in this embodiment can be for example the device depicted in FIG. 56-60. The enclosure 1267 can be of a conventional type, for example a NEMA-rated enclosure designed/selected for the intended environment of use.

Figure 59:
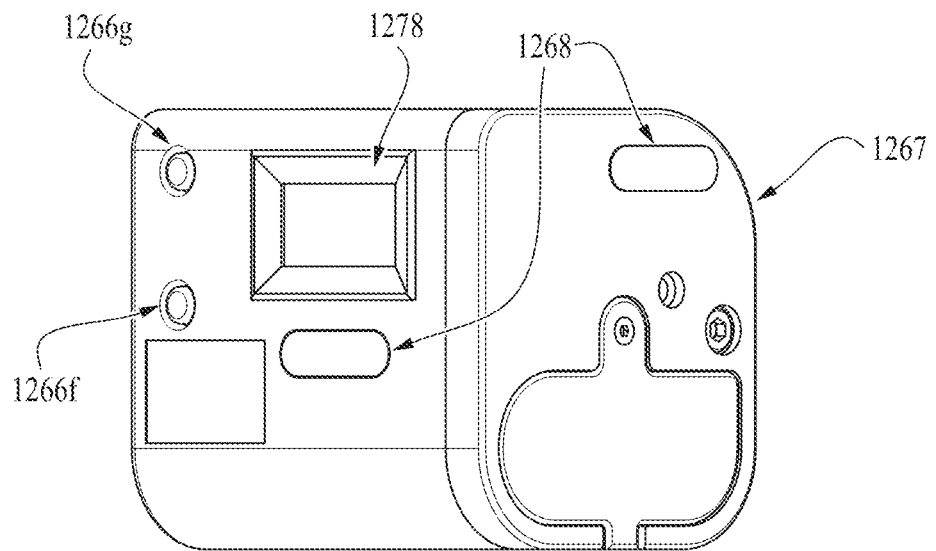
FIG. 59 is a perspective view of the light-projecting system of FIG. 57 showing leveling features.
Figure 60:
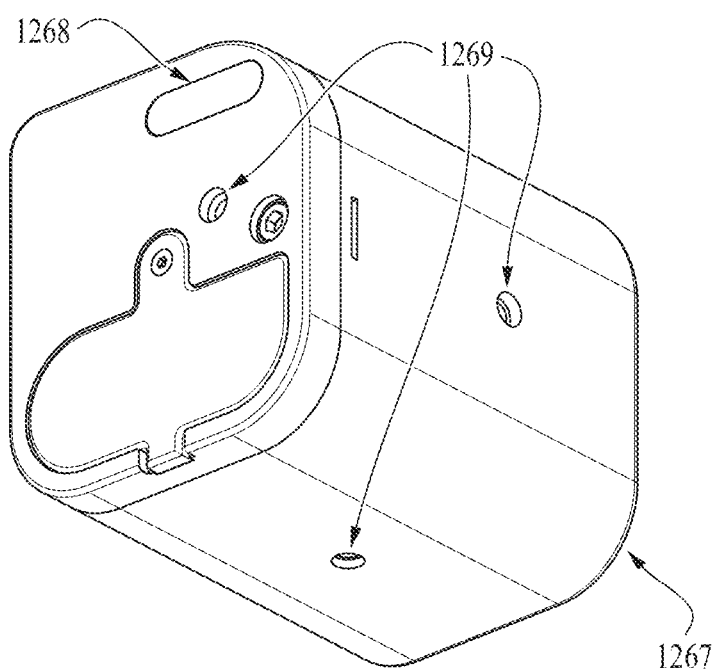
FIG. 60 is another perspective view of the light-projecting system of FIG. 57 showing mounting features.

In addition, the light-projecting system 1250 can further includes one or more leveling features that can be used to position the light-projecting system 1250 in a level/horizontal orientation. For example, this can include two bubble levels 1268, which can be of a convention type, as shown in FIG. 59. Also, the light-projecting system 1250 can further include one or more mounting features that can be used to mount the light-projecting system 1250 in place on a static-use support. For example, this can include three standard camera-mount connectors 1269, each on a different side of a six-sided enclosure 1267, and each being of a convention type (e.g., ¼-20 female connectors on cameras for mounting to mating male connectors of camera tripods), as shown in FIG. 60.

Figures 61, 62:
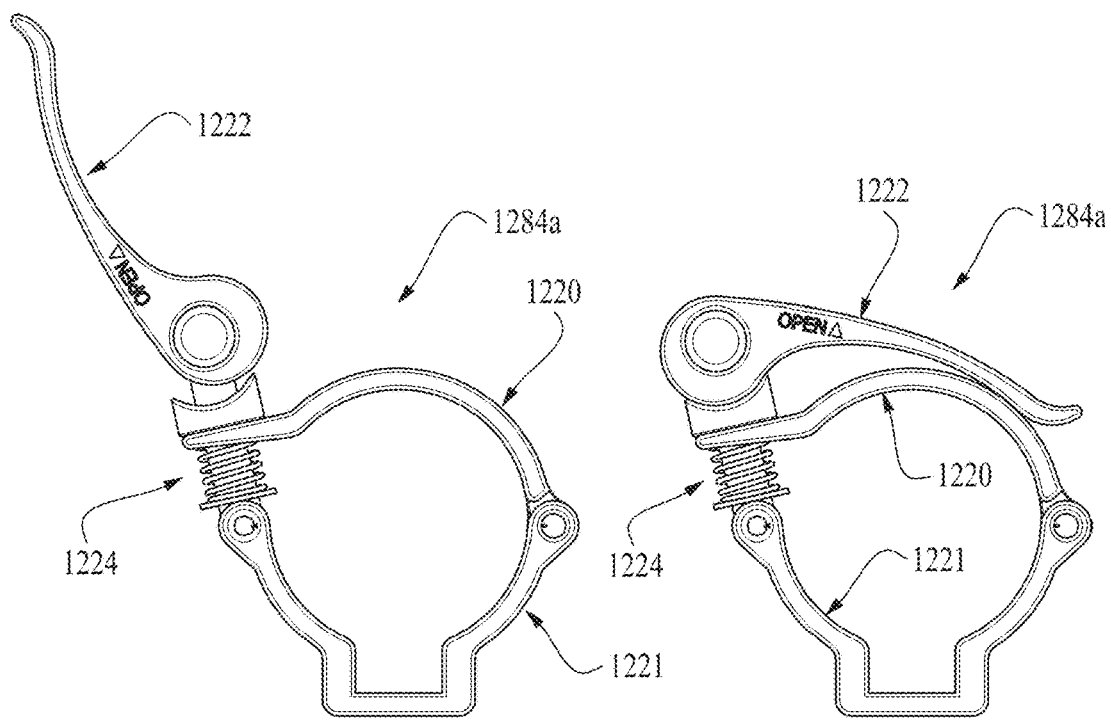
FIGS. 61-62 are side views of a clamp light mount in locked and unlocked positions, respectively.
Figure 63:
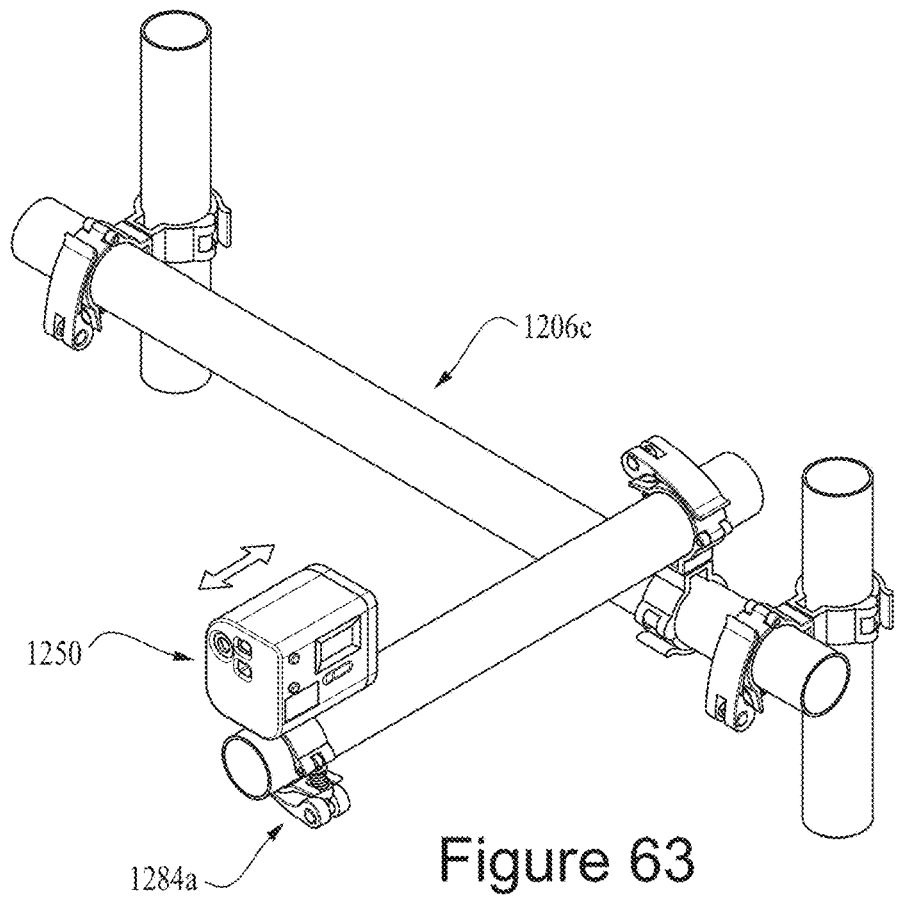
FIG. 63 is a perspective view showing the clamp light mount of FIGS. 61-62 adjustably mounting a light-projecting system in place.

FIGS. 61-63 shown a light mount 1284a for use in the light-projecting system 1250 (or for use with the light-projecting systems 50 and 250 or other embodiments). The light mount 1284a is a clamp that attaches to the light module 1263, for example by attaching at one of the three connectors 1269 of the enclosure 1267. The clamp 1284a includes a locking mechanism so it can be adjusted between an unlocked position (FIG. 61) and a locked position (FIG. 62). The clamp 1284a includes two pivotally connected clamp members 1220 and 1221, and a lock lever 1222 that pivots between the unlocked and locked positions. In the depicted embodiment, for example, the lock lever 1222 is a cam lever (including a cam surface) and a spring element 1224 is provided that biases the clamp members 1220 and 1221 apart toward the unlocked position. Pivoting the cam lever 1222 from its unlocked position to its locked position causes its cam surface to engage a contact surface on the clamp member 1220 to force it against the spring force of the spring element 124 to tighten the clamp member 1220 securely against the other clamp member 1221. This changes the clamp 1284a from its unlocked position to its locked position, and reversing this (i.e., pivoting the cam lever 1222 back to its unlocked position) returns the clamp 1284a to its unlocked position.

In some embodiments, the clamp 1284a can be adjusted for mounting to different sized pipes or other supports. For example, clamp 1284a can include a post connected to one clamp member 1121, slidable relative to the other clamp member 1220, and holding the spring 1224 between the clamp members. In the depicted embodiment, the post extends through a hole in the clamp member 1200, the spring 1224 is wound around it, and the spring and the clamp member have mating helical threads to that the lever 1222 can be rotated to screw the clamp member closer together or farther apart to adjust the size of the center space between them. When the lever 1222 is rotated clockwise or counterclockwise to its desired position, the lever is then pivoted to engage and displace the contact surface on the clamp member 1220 to drive it against the spring force of the spring 124 and thereby move the clamp member 1220 toward the other clamp member 1221 into the locked position. Other types of conventional locking mechanisms can be included in other embodiments.

FIG. 63 shows the clamp light-mount 1284a mounting the light-projecting system 1250 in a static location to a static-use support including pipes. This can be done for example when the static-use support is scaffolding 1206c. The clamp light-mount 1284a thereby functions as a linear adjustment mechanism. That is, the clamp light-mount 1284a can be operated to its unlocked position, the light-projecting system 1250 can be linearly repositioned forward or reward closer to or farther away from the installation surface (as indicated by the directional arrow), and the clamp light-mount 1284a can be operated to its unlocked position to secure the light module in place for use projecting a pattern of the light indicia onto the installation surface.

FIGS. 64-76 show another light mount 1284b for use in the light-projecting system 1250 (or for use with the light-projecting systems 50 and 250 or other embodiments). The light-mount 1284b includes a frame member 1226 and a slide member 1227 with a linear adjustment mechanism including track-and-guide sliding parts. The frame member 1226 includes at least one track 1228 and the slide member 1227 includes at least one guide 1229 that is slidingly retained by the track 1228. The track 1228 can be a channel or groove with a relatively smaller neck channel portion and a relatively larger head channel portion, and the guide 1229 can be a tab or protrusion with a relatively smaller neck tab portion and a relatively larger head tab portion, with the neck and head tab portions received and slidable within the neck and head channel portions, respectively, but with the head tab portion larger than the neck channel portion so that the guide 1229 is retained from separation from the channel 1228, as depicted. Alternatively, the channel and tab can be reversed, in a vice versa arrangement. Also, the frame member 1226 can include multiple of the tracks 1228, for example one on each of four sides, as depicted.

Further, the frame member 1226 can include an end opening 1230 for receiving a post 1231 mounted to the system 1250 so that the light module can be mounted at an end of the frame member 1226 (e.g., see FIG. 69). For example, the opening 1230 and post 1231 can have mating helical screw threads for securing them together, and the clamp light-mount 1284a can be used to mount the system 1250 to the post 1231.

Figure 72:
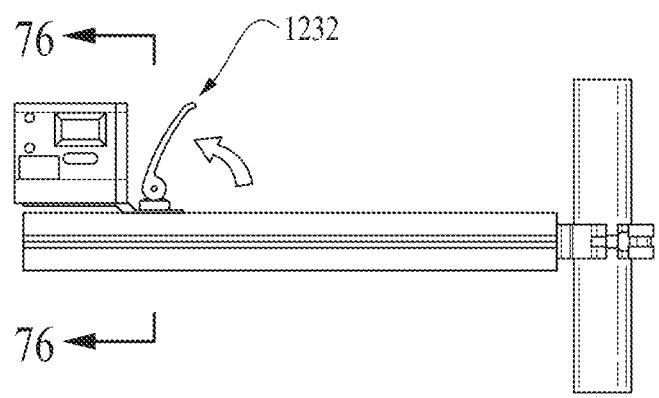
Figure 73:
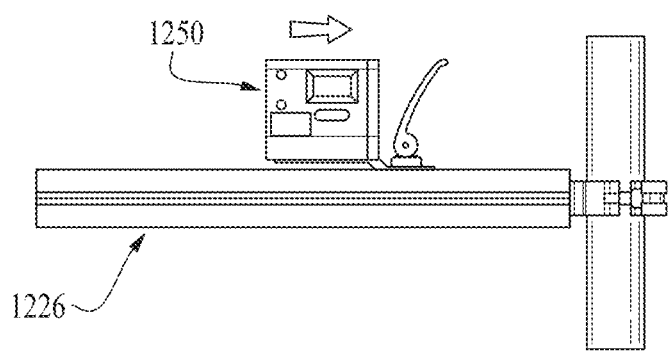
Figure 74:
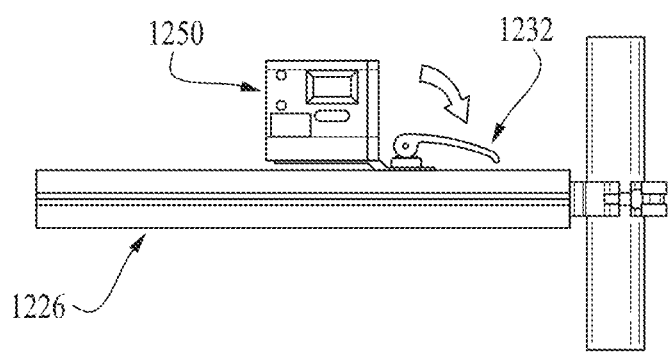
Figure 76:
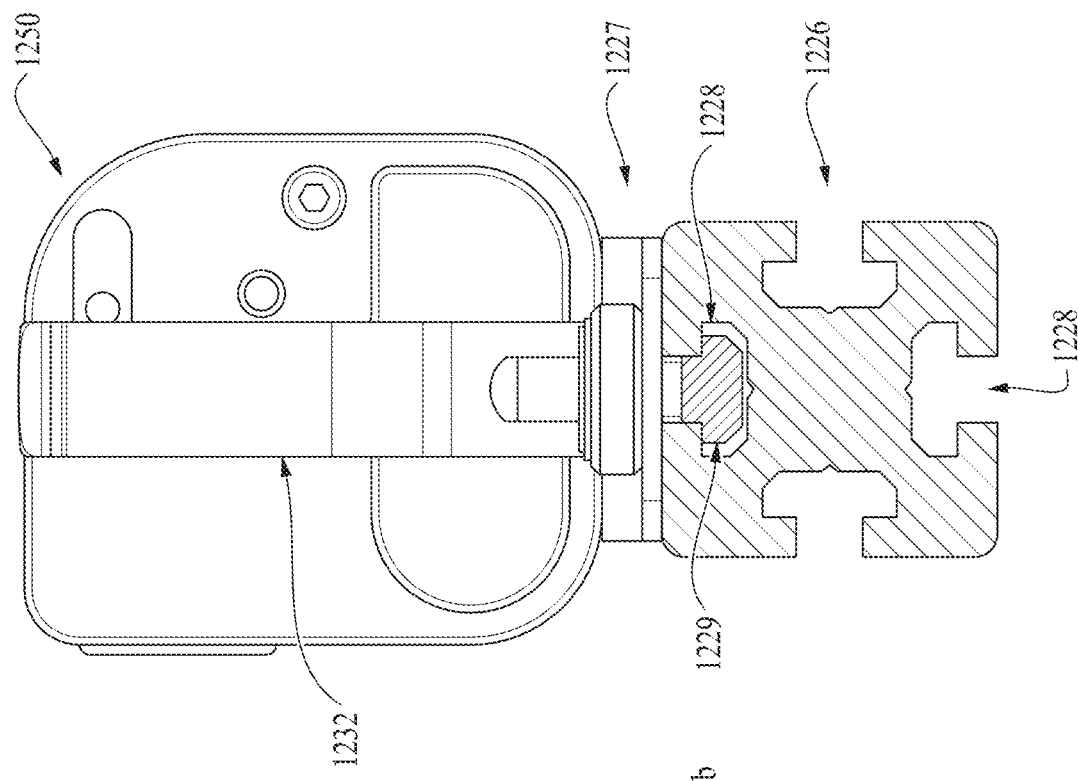
FIGS. 75 and 76 are cross-sectional views of the frame/slide light mount taken at lines 75-75 and 76-76 of FIGS. 71 and 72, respectively.
Figure 75:
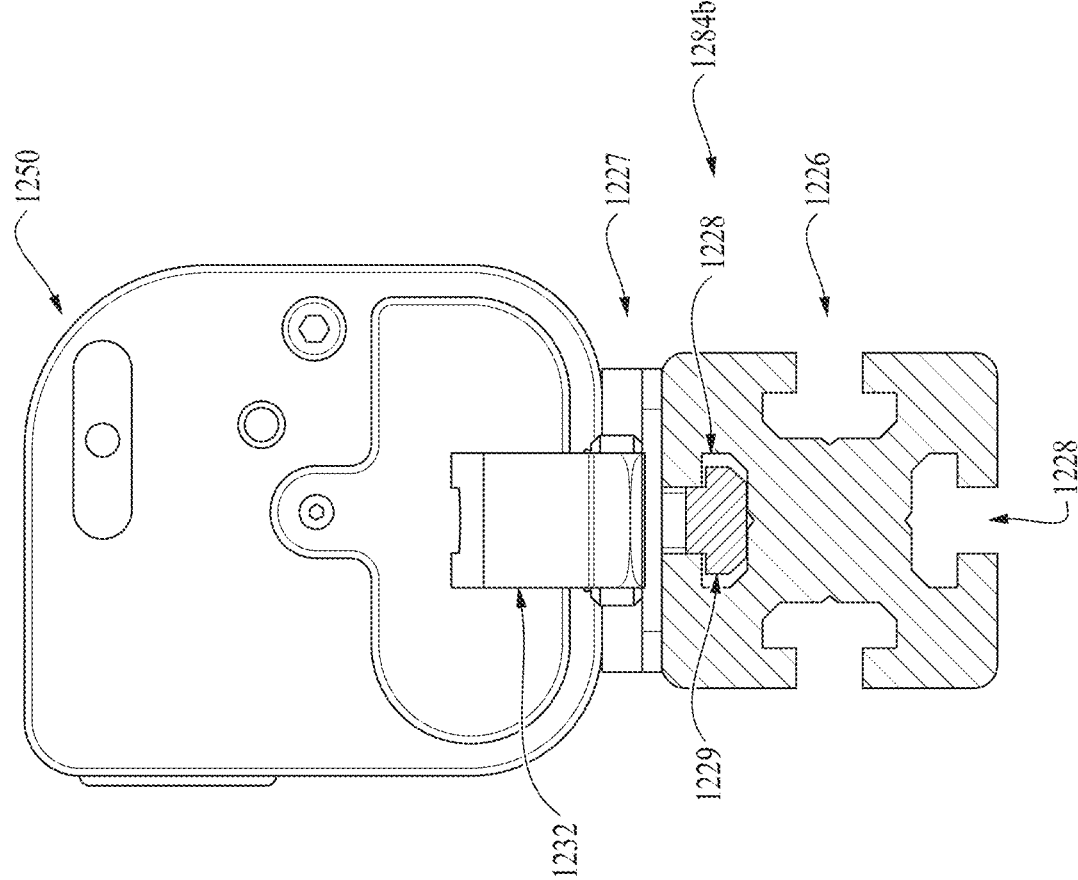

In addition, the frame/slide light mount 1284b includes a locking mechanism so it can be adjusted between a locked position (FIGS. 71 and 75) and an unlocked position (FIGS. 72 and 76). The slide member 1227 includes a lock lever 1232 that pivots between the unlocked and locked positions. In the depicted embodiment, for example, the lock lever 1232 is a cam lever (including a cam surface) and the guide member 1229 includes a resiliently deformable portion (e.g., made of a rubberized material and/or including a spring element) connected to the lock lever 1232. Pivoting the lock lever 1232 from its unlocked position to its locked position moves the slide member 1229 into compressional mechanical interference with an inner wall/surface of the channel 1228 to frictionally retain the slide member 1227 in place on the frame member 1226. Reversing this (i.e., pivoting the lock lever 1232 back to its unlocked position) returns the slide member 1229 to its unlocked position. Other types of conventional locking mechanisms can be included in other embodiments.

Figure 64:
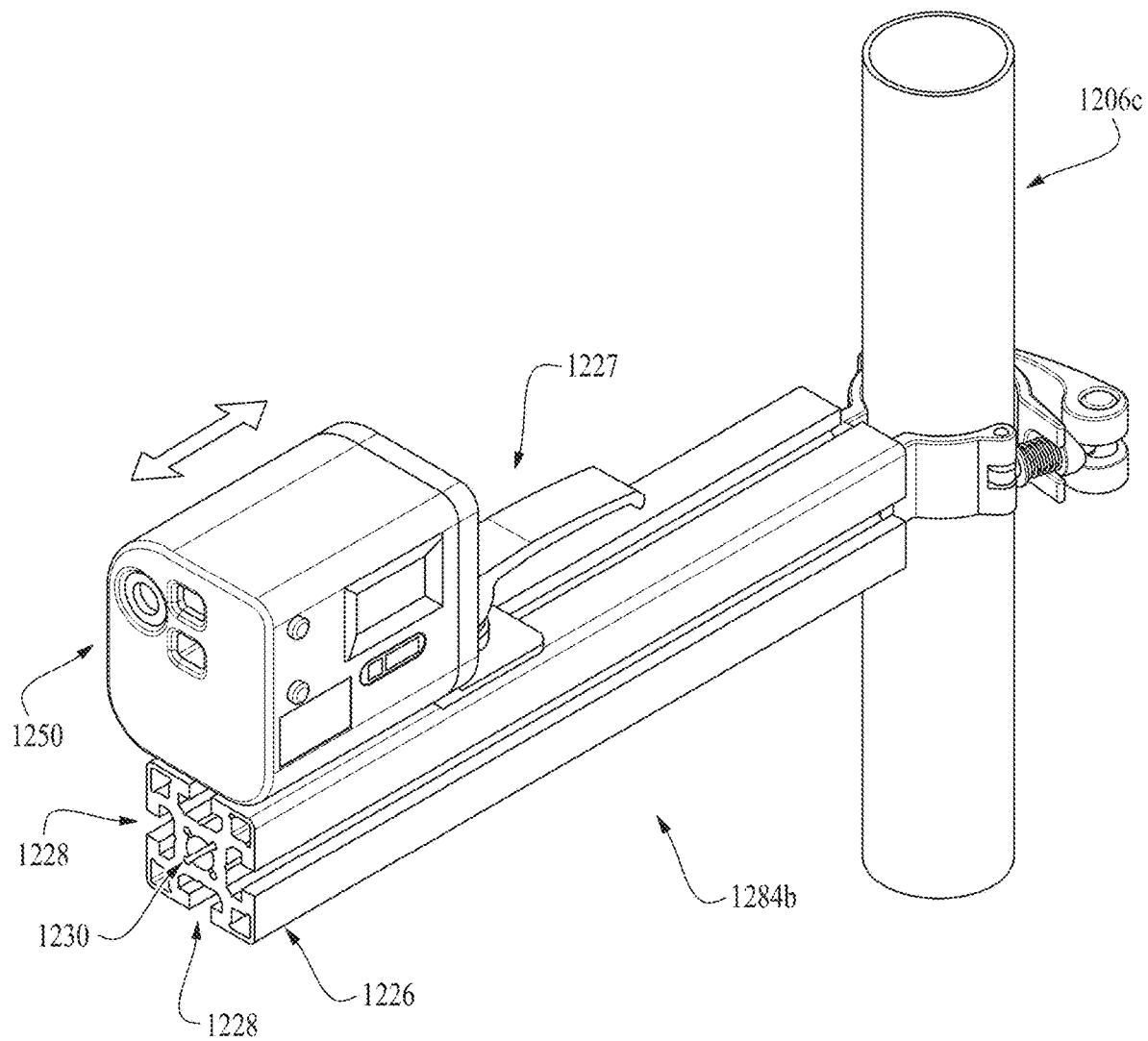
FIG. 64 is a perspective view showing a frame/slide light mount adjustably mounting a light-projecting system in place.
Figure 71:
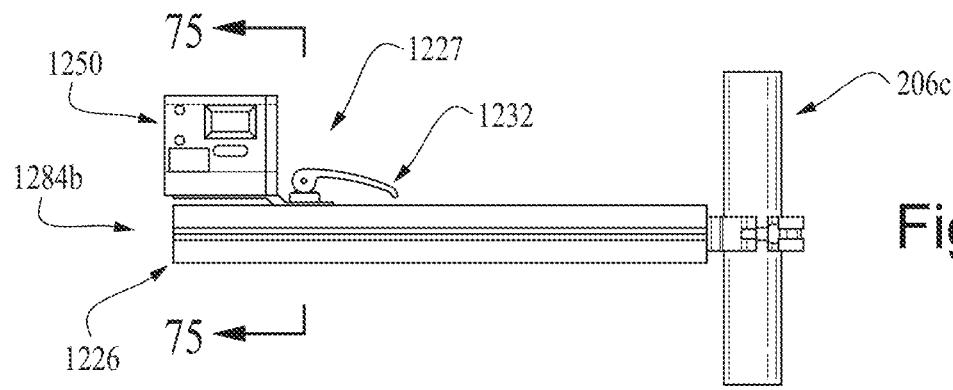
FIGS. 71-74 are perspective views showing the frame/slide light mount of FIG. 64 used to adjustably reposition a light-projecting system in multiple locations.

In this way, the frame/slide light mount 1284b can be operated to its unlocked position, the light-projecting system 1250 can be linearly repositioned/adjusted forward or reward closer to or farther away from the installation surface (as indicated by the directional arrow), and the clamp light-mount 1284a can be operated to its unlocked position to secure the light module in place for use projecting a pattern of the light indicia onto the installation surface, as indicated by the directional arrows of FIG. 64. As a particular example, FIGS. 71-74 show the frame/slide light mount 1284b in its locked position (FIG. 71) and then operated to its unlocked position (FIG. 72), show the light-projecting system 1250 linearly repositioned reward farther away from the installation surface (FIG. 73), and show the frame/slide light-mount 1284b operated to its locked position (FIG. 74) to secure the light module in place for use projecting a pattern of the light indicia onto the installation surface.

In addition, FIGS. 65-68 show examples of multiple of the frame/slide light mounts 1284b assembled together to provide further linear adjustment as well as lateral adjustment of the system 1250. The lateral adjustment (between the locations/positions of FIGS. 65 and 66) can be used to transversely reposition the light module so that one pattern of light indicia can be projected from each location/position. In this way, after one array of anchors has been installed at the installation locations of a first pattern of light indicia, then the system 1250 can be transversely repositioned and a second/subsequent pattern of light indicia can be projected with at least one light indicia (e.g., one column of dots) overlapping at least one of the installed anchors (e.g., one column of anchors), for example as described with respect to FIGS. 53-55. Also, the additional linear adjustment options (e.g., between FIG. 65 and FIGS. 67-68) enable a wider range of linear repositioning of the light module to obtain the desired indicia spacing X as described herein.

Furthermore, FIGS. 69-70 show additional examples of multiple of the frame/slide light mounts 1284*b* assembled together to provide further linear adjustment and lateral adjustment of the system 1250. (FIG. 69 depicted multiple systems 1250 for purposes of illustrating positioning options; in use typically only one or a very few systems 1250 would be mounted so close together.) Multiple of the frame/slide light mounts 1284*b* can be adjustably attached together by a connector bracket 1236, which can include for example an L-bracket and two lock levers (e.g., each of the type described above) so that the connector bracket 1236 can be unlocked, slid along the frame members into a different position, and locked in place.

Figure 77:
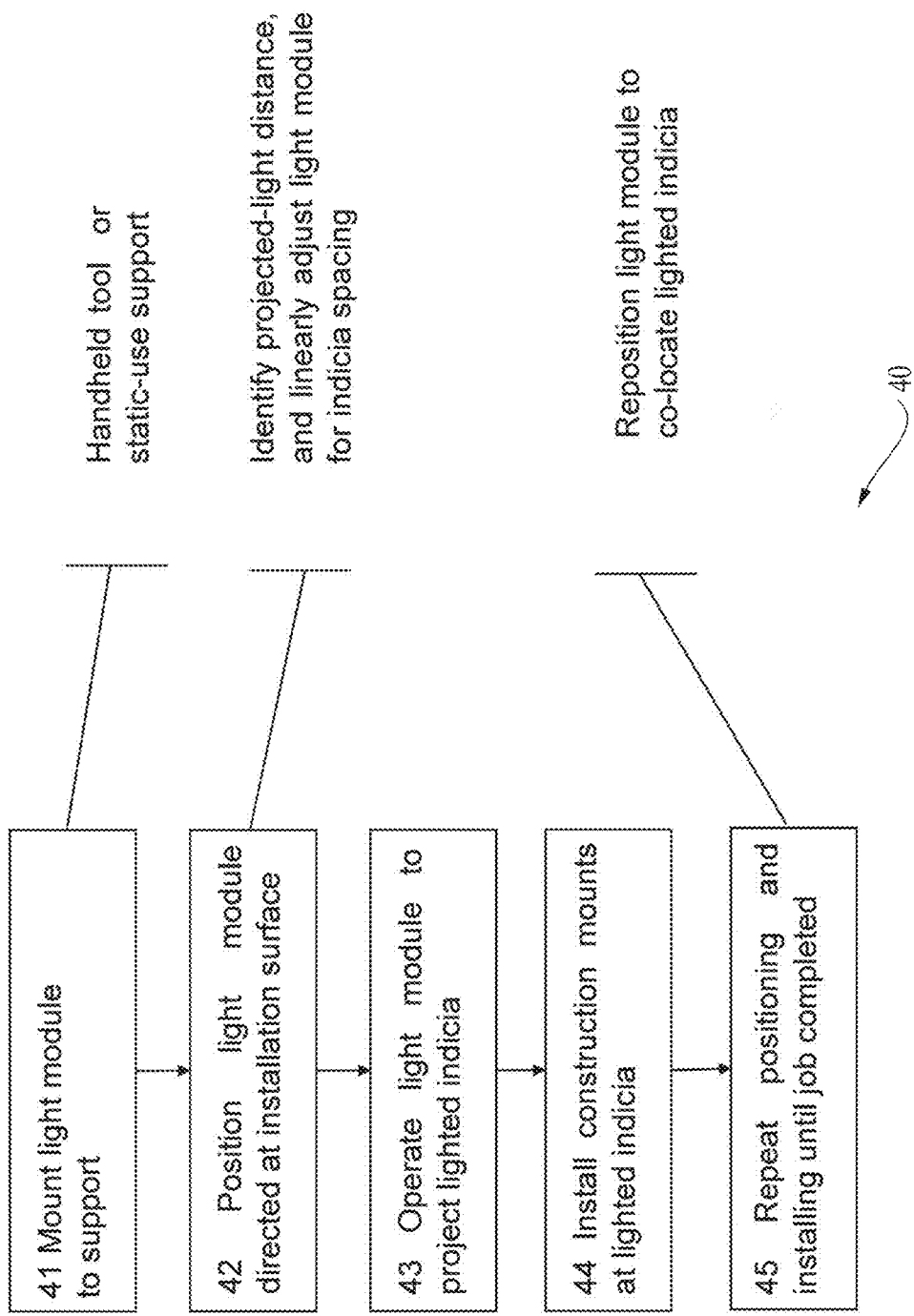
FIG. 77 is a flow diagram showing an example method using a light-projecting system to install refractory anchors or other construction mounts at installation locations of installation surfaces.

FIG. 77 shows an example method 40 of installing construction mounts on installation surfaces using a light-projecting system. The method 40 can be performed using any of the light-projecting systems 50, 150, 1150, 250, and 1250 described herein or using similar other light-projecting systems. The method 40 can be used for installing refractory anchors or other construction mounts on thermal vessel walls or other installation surfaces using weld guns or other tools. The method 40 described below will be best understood in relation to the systems described above as well as the methods described above with respect to FIGS. 20-25 and 53-55.

The method 40 includes at 41 mounting a light module in place on a support. The light module and the support can be of any type described herein or other similar types. For example, the light module can include a light emitter (e.g., a laser) that emits a source light beam and an optical device/element (e.g., a diffractive optical element) that diffuses the source light beam into multiple light beams.

Also, the support can be a movable-use support (e.g., the weld gun or another handheld tool that is used to install the refractory anchors or other construction mounts) or a static-use support (e.g., scaffolding or a tripod). When mounted to a movable-use support, the handheld tool and the light module move together when repositioning the tool between installations. When mounted to a static-use support, the light module remains static in a first position while the light module is operated to project the predefined pattern of multiple lighted indicia onto a first section of the installation surface and while the tool is transversely repositioned to install the construction mounts at all of the light indicia of the first section.

At 42 the light module is positioned so that it's directed at the installation surface. Typically, this means the light module is perpendicular to the installation surface, that is perpendicular when the installation surface is flat and/or substantially perpendicular (on average) when the installation surface has a curvature.

In example embodiments, the multiple light beams emitted by the light module are divergent/diverging light beams, and so the spacing between the lighted indicia will be different depending on how close or far the light module is from the installation surface. In such embodiments, positioning the light module includes linearly adjusting the light module closer to or farther from the installation surface to adjust an actual indicia spacing until the lighted indicia have a correct indicia spacing. The correct indicia spacing is what's needed for the particular construction mounts being installed.

The linearly adjusting can include manually adjusting the light module position (removing, repositioning, and reattaching it to the mount), automatically adjusting the light module position (a control unit operating an electrical adjustment component based on a projected-light distance received from a distancing device), or operating a linearly adjustment mechanism of a light mount that mounts the light module to the support. In example embodiments, the linear adjustment mechanism includes telescopically sliding parts, track-and-guide sliding parts, clamps, and/or mechanical assemblies that function to linearly reposition the light module closer to or farther from the installation surface without removing/dismounting the light module from the support.

In order to linearly adjust the light module, the positioning can also include identifying a correct projected-light distance from the light module to the installation surface to project the predefined pattern of multiple lighted indicia onto the installation surface with the correct indicia spacing. When the light module is mounted on the handheld tool, identifying the correct projected-light distance can include adjusting a distancing device (e.g., footplate) of the tool (e.g., weld gun) so that the footplate is set to position the light module at the correct projected-light distance from the installation surface. When the light module is mounted on a static-use support, identifying the correct projected-light distance includes using a distancing device (e.g., IR sensor, LIDAR sensor, or tape measure) to measure actual and correct projected-light distances from the light module to the installation surface.

At 43 the light module is operated the light module to project a predefined pattern (e.g., grid) of multiple lighted indicia (e.g., dots) onto the installation surface. The lighted indicia in the pattern define the installation locations for the refractory anchors or other construction mounts.

At 44 the refractory anchors or other construction mounts are installed at the installation locations on the installation surface (e.g., the thermal vessel) by using the handheld tool. And at 45 the positioning and installing actions are repeated until the installation job is completed. The repeating includes transversely repositioning the light module from a first position to a second position so that at least two of the lighted indicia projected onto the installation surface with the light module in the second position are located where there are or were at least two of the lighted indicia projected onto the installation surface with the light module in the first position, For example, when the light module is mounted on the handheld tool, the installing includes operating the tool to install a first one of the construction mounts at a first one of the installation locations with the light module and the tool in a first position. And the repeating includes transversely repositioning the light module so that a reference one of the lighted indicia is co-located with the installed first construction mount, and then installing a second one of the construction mounts at a target one of the multiple lighted indicia (sec FIGS. 20-25).

Also, when the light module is mounted on a static-use support, the light module remains static in a first position while the light module is operated to project the predefined pattern of multiple lighted indicia onto a first section of the installation surface and while the tool is repositioned to install the construction mounts at all of the lighted indicia while the light module is in the first position. And the repeating includes transversely repositioning (remounting if needed) the light module on the static-use support so that the light module remains static in a second position while the light module is operated to project the predefined pattern of multiple lighted indicia onto a second section of the installation surface. In the second position, at least two lighted indicia of the predefined pattern on the second section of the installation surface are co-located with either at least two lighted indicia of the predefined pattern on the first section of the installation surface (when using two projected-light systems simultaneously to project the patterns on both sections of the installation surface) or at least two of the construction mounts that were previously installed at least two lighted indicia of the predefined pattern on the first section of the installation surface (when transversely repositioning the same projected-light system to project the patterns on both sections of the installation surface; see FIGS. 53-55).

Another embodiment includes a method of replacing a refractory lining in a thermal-process vessel using a light-projecting system and a handheld tool for example of the type described herein. The method includes removing an existing refractory lining from the vessel wall, removing existing refractory anchors from the vessel wall, transporting the light-projecting system and the handheld tool into the thermal vessel, installing new refractory anchors onto the vessel wall using the light-projecting system and the handheld tool, and installing a new refractory material on and around the refractory anchors to form a new refractory lining. The process for installing the new anchors can be as described above.

It is to be understood that this invention is not limited to the specific devices, methods, conditions, and/or parameters described and/or shown herein, and that the terminology used herein is for the purpose of describing particular embodiments by way of example only. Thus, the terminology is intended to be broadly construed and is not intended to be unnecessarily limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the specific sequence of steps described but can be carried out in other sequences, unless expressly stated otherwise herein.

While the invention has been shown and described in exemplary forms, it will be apparent to those skilled in the art that many modifications, additions, and deletions can be made therein without departing from the spirit and scope of the invention as defined by the following claims.

What is claimed is:

1. A method of installing refractory anchors on installation surfaces of thermal vessels, the method comprising:
    mounting a light module in place on a support;
    positioning the light module so the light module is directed at the installation surface;
    operating the light module to project a predefined pattern of multiple lighted indicia onto the installation surface, wherein the lighted indicia in the pattern define installation locations for the refractory anchors;
    installing the refractory anchors at the installation locations on the installation surface of the thermal vessel by using a handheld weld gun; and
    repeating the positioning and installing by transversely repositioning the light module from a first position to a second position so that at least two of the lighted indicia projected onto the installation surface with the light module in the second position are located where there are or were at least two of the lighted indicia projected onto the installation surface with the light module in the first position,
    wherein operating the light module includes emitting divergent light beams to project the lighted indicia onto the installation surface, and wherein positioning the light module includes linearly adjusting the light module closer to or farther from the installation surface to adjust an actual indicia spacing until the lighted indicia have a correct indicia spacing.

2. The method of claim 1, wherein mounting the light module includes mounting the light module in place on the weld gun by a light mount so that the light module and the weld gun move together, wherein installing the refractory anchors includes operating the weld gun to install a first one of the refractory anchors at a first one of the installation locations with the light module and the weld gun in a first position.

3. The method of claim 2, wherein repeating the positioning and installing includes transversely repositioning the light module so that a reference one of the lighted indicia is co-located with the installed first refractory anchor, and wherein installing the refractory anchors includes installing a second one of the refractory anchors at a target one of the multiple lighted indicia.

4. The method of claim 1, wherein mounting the light module includes mounting the light module in place on a static-use support by a light mount so that the light module remains static in a first position while the light module is operated to project the predefined pattern of multiple lighted indicia onto a first section of the installation surface and while the weld gun is repositioned to install the refractory anchors at all of the lighted indicia while the light module is in the first position.

5. The method of claim 4, wherein repeating the positioning and installing includes transversely repositioning the light module on the static-use support so that the light module and the weld gun remain static in a second position while the light module is operated to project the predefined pattern of multiple lighted indicia onto a second section of the installation surface with at least two lighted indicia of the predefined pattern on the second section of the installation surface co-located with either at least two lighted indicia of the predefined pattern on the first section of the installation surface or at least two of the refractory anchors that were previously installed at at least two lighted indicia of the predefined pattern on the first section of the installation surface.

6. The method of claim 1, wherein linearly adjusting the light module includes operating a linear adjustment mechanism of a light mount that mounts the light module to a support that supports the light module during use.

7. The method of claim 1, further comprising identifying a correct projected-light distance from the light module to the installation surface to project the predefined pattern of multiple lighted indicia onto the installation surface so that the lighted indicia have a correct indicia spacing, wherein positioning the light module includes positioning the light module at the correct projected-light distance from the installation surface.

8. The method of claim 7, wherein mounting the light module includes mounting the light module in place on a weld gun so that the light module and the weld gun move together, and wherein identifying a correct projected-light distance includes adjusting a distancing device of the weld gun so that the distancing device is set to position the light module at the correct projected-light distance from the installation surface.

9. The method of claim 7, wherein mounting the light module includes mounting the light module in place on a static-use support so that the light module remains static in a first position while the light module is operated to project the predefined pattern of multiple lighted indicia onto a first section of the installation surface, and wherein identifying a correct projected-light distance includes using a distancing device to measure an actual projected-light distance from the light module to the installation surface.

* * * * *